US009998465B2

(12) United States Patent
Sato

(10) Patent No.: US 9,998,465 B2
(45) Date of Patent: Jun. 12, 2018

(54) WIRELESS COMMUNICATION APPARATUS, INFORMATION PROCESSING APPARATUS, COMMUNICATION SYSTEM, AND METHOD OF CONTROLLING WIRELESS COMMUNICATION APPARATUS

(71) Applicant: SONY CORPORATION, Tokyo (JP)

(72) Inventor: Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/157,899

(22) Filed: May 18, 2016

(65) Prior Publication Data

US 2016/0269414 A1 Sep. 15, 2016

Related U.S. Application Data

(63) Continuation of application No. 14/232,431, filed as application No. PCT/JP2012/065383 on Jun. 15, 2012, now Pat. No. 9,363,666.

(30) Foreign Application Priority Data

Jul. 22, 2011 (JP) .................................. 2011-160938

(51) Int. Cl.
*H04L 29/06* (2006.01)
*H04W 8/18* (2009.01)
(Continued)

(52) U.S. Cl.
CPC ............ *H04L 63/10* (2013.01); *H04L 63/104* (2013.01); *H04W 8/183* (2013.01); *H04W 8/24* (2013.01);
(Continued)

(58) Field of Classification Search
CPC ...... H04L 63/10; H04L 63/104; H04W 8/183; H04W 8/24; H04W 12/06; H04W 48/18;
(Continued)

(56) References Cited

U.S. PATENT DOCUMENTS 6,611,684 B1 8/2003 Franks
2003/0204734 A1 10/2003 Wheeler
(Continued)

FOREIGN PATENT DOCUMENTS

CN 101663903 A 3/2010
JP 2001-298773 A 10/2001
(Continued)

OTHER PUBLICATIONS

Office Action received for Japanese Patent Application No. 2011-160938, dated Sep. 8, 2015, 4 Sages.
(Continued)

*Primary Examiner* — Mong-Thuy Tran
(74) *Attorney, Agent, or Firm* — Chip Law Group

(57) ABSTRACT

Provided is a wireless communication apparatus including an accepting unit that accepts a transfer operation to transfer a connection right from a first wireless communication apparatus to which the connection right to connect to a predetermined network using wireless communication is set to a second wireless communication apparatus to which the connection right is not set, and a control unit that, when the transfer operation is accepted, transmits a transfer request that requests the connection right to be transferred from the first wireless communication apparatus to the second wireless communication apparatus with information included in the transfer request, the information being used for synchronizing data in the second wireless communication apparatus with predetermined data in the first wireless communication apparatus.

8 Claims, 41 Drawing Sheets

(a)

(b)

(51) Int. Cl.
| | |
|---|---|
| *H04W 48/18* | (2009.01) |
| *H04W 12/06* | (2009.01) |
| *H04W 8/24* | (2009.01) |
| *H04W 60/00* | (2009.01) |
| *H04W 76/02* | (2009.01) |
| *H04W 4/00* | (2018.01) |
| *H04W 84/04* | (2009.01) |

(52) U.S. Cl.
CPC ........... *H04W 12/06* (2013.01); *H04W 48/18* (2013.01); *H04W 60/00* (2013.01); *H04W 76/021* (2013.01); *H04W 4/005* (2013.01); *H04W 84/042* (2013.01)

(58) Field of Classification Search
CPC ... H04W 60/00; H04W 76/021; H04W 4/005; H04W 84/042
USPC ...... 455/551, 433, 435.2, 435.1, 550.1, 419, 455/557; 370/331; 726/4
See application file for complete search history.

(56) References Cited

U.S. PATENT DOCUMENTS

| | | | |
|---|---|---|---|
| 2004/0141500 A1 | 7/2004 | Pavlak et al. | |
| 2004/0142684 A1* | 7/2004 | Ratert | H04W 8/205 455/420 |
| 2005/0266883 A1* | 12/2005 | Chatrath | H04B 1/3816 455/558 |
| 2006/0111039 A1* | 5/2006 | Whittington | H04B 3/36 455/8 |
| 2007/0112944 A1 | 5/2007 | Zapata et al. | |
| 2007/0191057 A1 | 8/2007 | Kamada | |
| 2008/0261561 A1* | 10/2008 | Gehrmann | H04W 12/04 455/411 |
| 2008/0320153 A1 | 12/2008 | Douville et al. | |
| 2010/0093342 A1* | 4/2010 | Ramachandra Rao | H04M 15/00 455/432.1 |
| 2010/0257239 A1* | 10/2010 | Roberts | G06Q 10/10 709/204 |
| 2010/0287219 A1* | 11/2010 | Caso | G06F 17/30094 707/827 |
| 2010/0312897 A1 | 12/2010 | Allen et al. | |
| 2011/0028126 A1* | 2/2011 | Lim | H04L 63/0853 455/411 |
| 2012/0084361 A1 | 4/2012 | De Foy et al. | |
| 2012/0281835 A1* | 11/2012 | Tysowski | H04M 1/7253 380/270 |
| 2012/0310991 A1* | 12/2012 | Frantz | G06F 17/30306 707/799 |
| 2014/0099951 A1 | 4/2014 | Tsiatis et al. | |
| 2014/0162622 A1 | 6/2014 | Oda et al. | |

FOREIGN PATENT DOCUMENTS

| | | |
|---|---|---|
| JP | 2005-130009 A | 5/2005 |
| JP | 2006-019896 A | 1/2006 |
| JP | 2006-074103 A | 3/2006 |
| JP | 2006-148422 A | 6/2006 |
| JP | 2006-190200 A | 7/2006 |
| JP | 2007-235257 A | 9/2007 |
| JP | 2009-157583 A | 7/2009 |
| JP | 2010-532107 A | 9/2010 |
| JP | 2011-509575 A | 3/2011 |

OTHER PUBLICATIONS

European Search report received for European Patent Application No. 12817698.9, dated Feb. 18, 2015, 10 pages.
Harikrishna Vasanta et al., "Distributed Management of OMA DRM Domains", Information Security Applications, Berlin, Aug. 28, 2006, pp. 237-251.
"3rd Generation Partnership Project; Technical Specification Group Services and System Aspects; Feasibility study on the security aspects of remote provisioning and change of subscription for Machine to Machine (M2M) equipment", Release 9, 3GPP TR 31812 V9.2.0 (Jun. 2010) Technical Report, Jun. 22, 2010, 87 pages.
Office Action for CN Patent Application No. 201280035124.2, dated Dec. 1, 2016, 6 pages of Office Action and 7 pages of English Translation.
Office Action for JP Patent Application No. 2016-095131, dated Mar. 28, 2017, 04 pages office action with 03 pages English translation.

* cited by examiner

FIG. 1
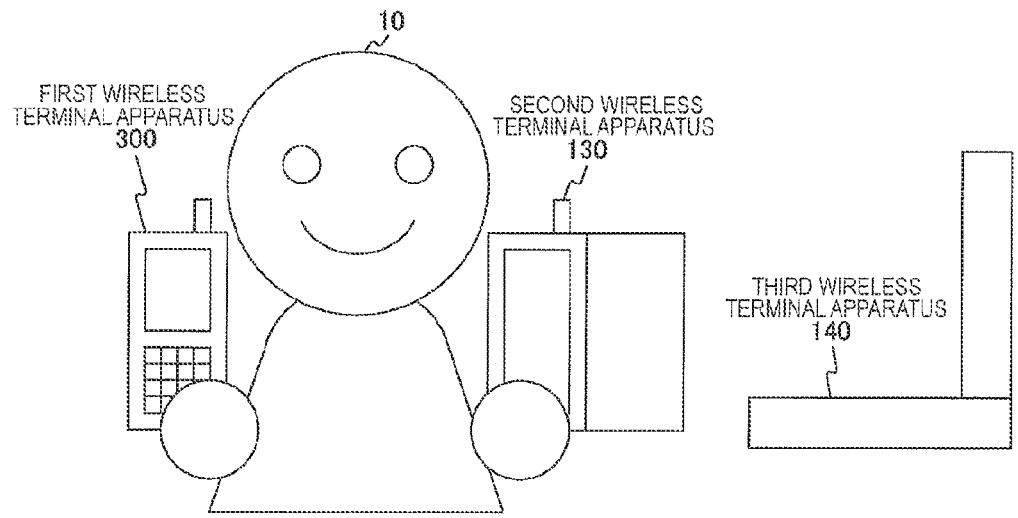
(a)
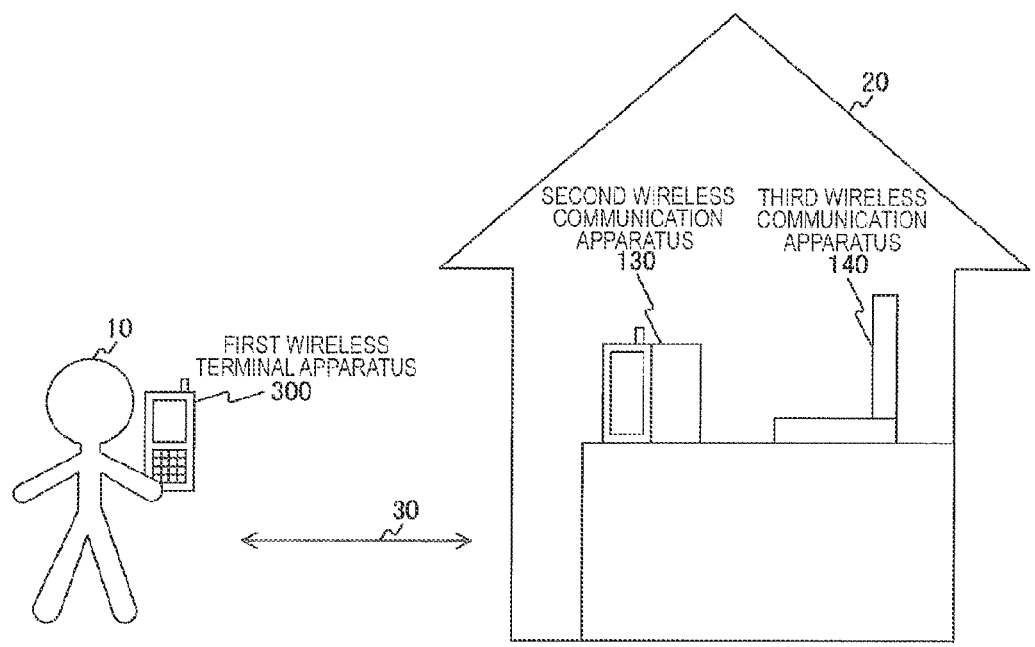
(b)

FIG. 4

GROUP MANAGEMENT DATABASE
220

| | GROUP NAME 221 | GROUP ID 222 | GROUP PASSWORD 223 | DEVICE NAME 224 | TERMINAL IDENTIFICATION INFORMATION 225 | VALID/INVALID INFORMATION 226 | SYNCHRONOUS DATA 227 |
|---|---|---|---|---|---|---|---|
| 1 | GROUP AB | 1234567 | poiuytr | MY MOBILE PHONE | PCID#1 | VALID | YUDAI |
| | | | | MY BOOK | PCID#2 | INVALID | ... |
| | | | | MY COMPUTER | PCID#3 | INVALID | ... |
| 2 | ... | ... | ... | ... | ... | ... | ... |
| ... | ... | ... | ... | ... | ... | ... | ... |
| M | ... | ... | ... | ... | ... | ... | ... |

FIG. 6
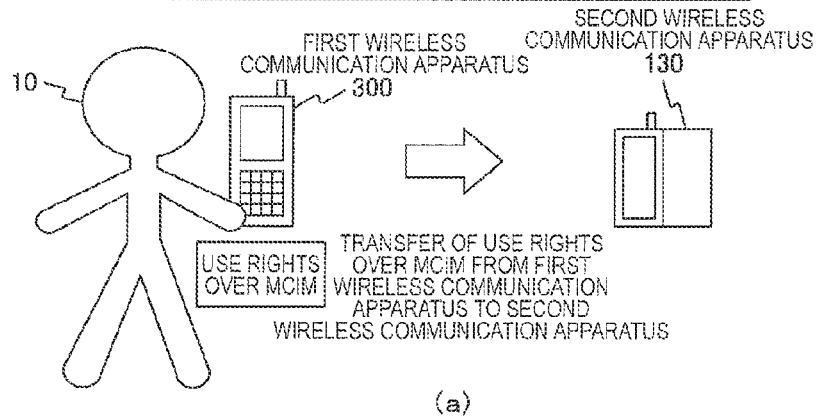
(a)
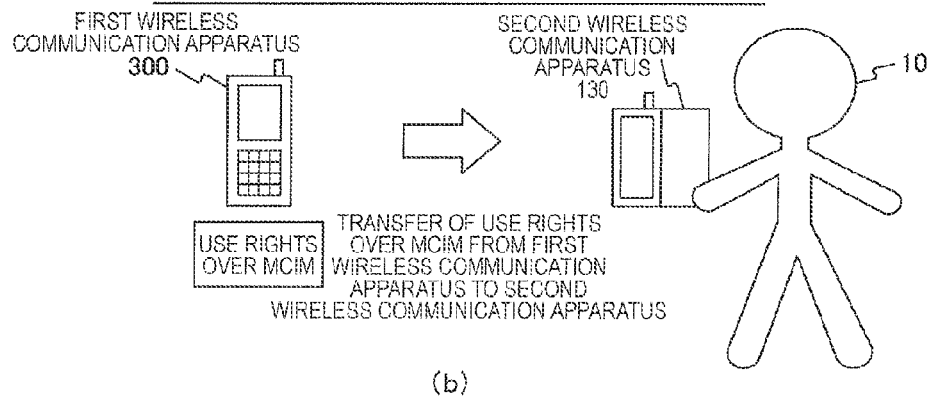
(b)
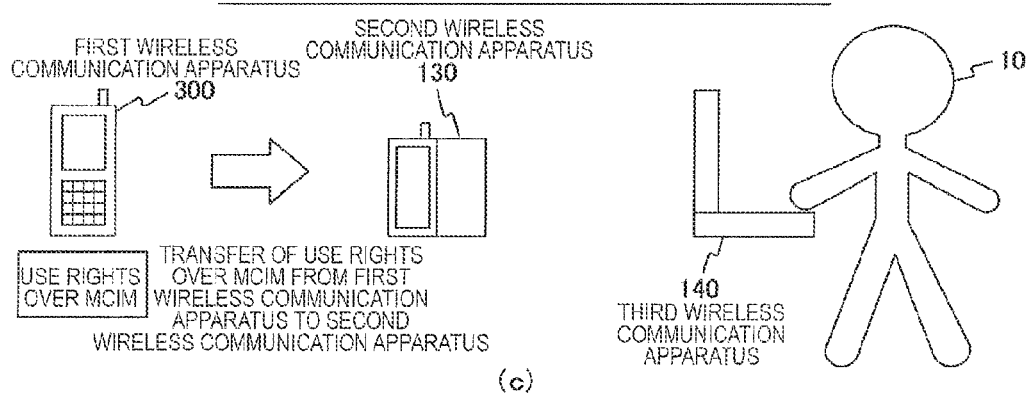
(c)

USE RIGHTS OVER MCIM HAVE BEEN TRANSFERRED TO
FOLLOWING WIRELESS COMMUNICATION APPARATUS.
CONNECTION BASED ON MCIM CAN NO LONGER BE ESTABLISHED.

DATA OF FOLLOWING WIRELESS COMMUNICATION
APPARATUS HAS BEEN SYNCHRONIZED.

DEVICE NAME : MY BOOK  — 521

TERMINAL
IDENTIFICATION : PCID#2
INFORMATION

522

CONFIRM (a)

530

USE RIGHTS OVER MCIM HAVE BEEN TRANSFERRED FROM
FOLLOWING WIRELESS COMMUNICATION APPARATUS.
CONNECTION BASED ON MCIM CAN NOW BE ESTABLISHED.

TO SYNCHRONIZE WITH DATA OF FOLLOWING
WIRELESS COMMUNICATION APPARATUS, DATA OF APPARATUS
HAS BEEN UPDATED.

DEVICE NAME : MY MOBILE PHONE  — 531

TERMINAL
IDENTIFICATION : PCID#1
INFORMATION

532

CONFIRM (b)

OPERATION EXAMPLE OF RO
(TRANSFER OPERATION IN OTHER THAN TRANSFER SOURCE AND TRANSFER DESTINATION)

OPERATION EXAMPLE OF TRANSFER DESTINATION
(TRANSFER OPERATION IN TRANSFER DESTINATION)

US 9,998,465 B2

WIRELESS COMMUNICATION APPARATUS, INFORMATION PROCESSING APPARATUS, COMMUNICATION SYSTEM, AND METHOD OF CONTROLLING WIRELESS COMMUNICATION APPARATUS

CROSS REFERENCE TO RELATED APPLICATIONS

The present application is a continuation application of U.S. patent application Ser. No. 14/232,431, filed Jan. 13, 2014, which is a national stage application of PCT/JP2012/065383, filed Jun. 15, 2012, and claims the priority from prior Japanese Priority Patent Application JP 2011-160938 filed in the Japan Patent Office on Jul. 22, 2011, the entire content of which is hereby incorporated by reference.

TECHNICAL FIELD

The present technology relates to a wireless communication apparatus. In particular, the present technology relates to a wireless communication apparatus connected to a network, an information processing apparatus, a communication system including the wireless communication apparatus and the information processing apparatus, and a method of controlling the wireless communication apparatus.

BACKGROUND ART

An expanded functionality is being considered for the 3rd Generation Partnership Project (i.e., 3GPP) that decides the technical specification of public wireless communication networks (see, for example, Non-Patent Literature 1).

Using such an expanded functionality, known as "Machine to Machine Equipment," it will become possible to flexibly use information showing what services can be utilized. Such information may be referred to as a Machine Communication Identity Module (MCIM), which is one example of contact authentication information. As an example, it may possible to download an MCIM from a network, and additionally or alternatively, to temporarily invalidate and then revalidate an MCIM within a network. At present, information corresponding to an MCIM needs to be stored in a physical device called a SIM (Subscriber Identity Module) card. However, if an MCIM could be handled as software, the method of storage could be made more flexible.

CITATION LIST

Non-Patent Literature

NON-PATENT LITERATURE 1: 3GPP TR 33.812 V9.2.0 (2010-06)

SUMMARY OF INVENTION

Technical Problem

By using the expanded functionality described above, it is possible to conceive new methods of using an MCIM that differ to the past.

For example, sharing an MCIM among a plurality of wireless communication apparatuses can be supposed. Thus, it is convenient if relevant data (for example, an address book or a schedule book) used among a plurality of wireless communication apparatuses can easily be shared.

The present technology is produced in view of such circumstances and an object thereof is to share data used among a plurality of wireless communication apparatuses easily.

Solution to Problem

The present technology is produced in order to solve the above-mentioned problem, and according to a first embodiment the present technology, there are provided a wireless communication apparatus, a method of controlling the wireless communication apparatus, and a program causing a computer to execute the method, the wireless communication apparatus including an accepting unit that accepts a transfer operation to transfer a connection right from a first wireless communication apparatus to which the connection right to connect to a predetermined network using wireless communication is set to a second wireless communication apparatus to which the connection right is not set, and a control unit that, when the transfer operation is accepted, transmits a transfer request that requests the connection right to be transferred from the first wireless communication apparatus to the second wireless communication apparatus with information included in the transfer request, the information being used for synchronizing data in the second wireless communication apparatus with predetermined data in the first wireless communication apparatus. Accordingly, if the transfer operation is accepted, an operation of transmitting the transfer request that requests a transfer of the connection rights from the first wireless communication apparatus to the second wireless communication apparatus with information included in the transfer request, the information being used for synchronizing data in the second wireless communication apparatus with predetermined data in the first wireless communication apparatus is caused.

According to the first embodiment, the wireless communication apparatus may be the first wireless communication apparatus. A group sharing the connection right may be constituted of a plurality of wireless communication apparatuses including the first wireless communication apparatus and the second wireless communication apparatus. When the transfer operation is accepted, the control unit may transmit the transfer request and the predetermined data to a management system that manages the group. When the transfer request and the predetermined data are received, the management system may transmit setting information to set the connection right to the second wireless communication apparatus to cause the second wireless communication apparatus to set the connection right and transmits the predetermined data to the second wireless communication apparatus to exercise control to synchronize the data in the second wireless communication apparatus with the predetermined data. Accordingly, an operation of transmitting the transfer request and the predetermined data to a management system if the transfer operation is accepted and the management system causes an operation of setting the connection rights to the second wireless communication apparatus and synchronizing the data in the second wireless communication apparatus with the predetermined data when the transfer request and the predetermined data are received.

According to the first embodiment, the control unit may transmit the transfer request including the predetermined data to the management system as the information for synchronization. The management system may transmit the setting information to the second wireless communication apparatus with the predetermined data included in the setting information. Accordingly, an operation of transmitting the transfer request including the predetermined data to the management system as the information for synchronization is caused and the management system causes an operation of transmitting the setting information to the second wireless communication apparatus with the predetermined data included in the setting information.

According to the first embodiment, the management system may be an RO (Registration Operator). When the predetermined data is received from the first wireless communication apparatus, the RO may hold the predetermined data and transmits the held predetermined data to the second wireless communication apparatus. Accordingly, the RO causes an operation of holding the predetermined data when the predetermined data is received from the first wireless communication apparatus and transmitting the held predetermined data to the second wireless communication apparatus.

According to the first embodiment, when the predetermined data is held, the RO may notify the second wireless communication apparatus that the predetermined data is held. Accordingly, the RO causes an operation of notifying the second wireless communication apparatus that the predetermined data is held when the predetermined data is held.

According to the first embodiment, the RO may delete the held predetermined data after the held predetermined data is transmitted to the second wireless communication apparatus. Accordingly, the RO causes an operation of deleting the held predetermined data after transmission thereof to the second wireless communication apparatus.

According to the first embodiment, when the predetermined data is not transmitted to the second wireless communication apparatus for a predetermined time or longer after the predetermined data is held, the RO may delete the predetermined data and does not transmit the predetermined data to the second wireless communication apparatus. Accordingly, the RO causes an operation of deleting the predetermined data and not transmitting the predetermined data to the second wireless communication apparatus if the predetermined data is not transmitted to the second wireless communication apparatus for a predetermined time or longer after the predetermined data is held.

According to the first embodiment, the accepting unit may accept a specifying operation to specify the predetermined time. When the specifying operation is accepted, the control unit may transmit, to the RO, time information about the specified predetermined time in association with the predetermined data. The RO may delete the predetermined data using the predetermined time related to the time information transmitted in association with the predetermined data. Accordingly, an operation of transmitting time information about the specified predetermined time in association with the predetermined data is caused if the specifying operation to specify the predetermined time is accepted and the RO causes an operation of deleting the predetermined data using the predetermined time related to the time information transmitted by being associated with the predetermined data.

According to the first embodiment, the wireless communication apparatus to which the connection right is set among the plurality of wireless communication apparatuses constituting the group may be connectable to an SHO (Selected Home Operator) based on the connection right. The wireless communication apparatus to which the connection right is not set among the plurality of wireless communication apparatuses constituting the group may be connectable only to the RO. Accordingly, an operation of connecting the wireless communication apparatus to which the connection rights are set to the SHO and the wireless communication apparatus to which the connection rights are not set to the RO.

According to the first embodiment, the wireless communication apparatus may be the second wireless communication apparatus. A group sharing the connection right may be constituted of a plurality of wireless communication apparatuses including the first wireless communication apparatus and the second wireless communication apparatus. When the transfer operation is accepted, the control unit may transmit the transfer request to a management system that manages the group. When the transfer request is received, the management system may transmit a transfer confirmation request to request permission of transfer concerning the transfer request to the first wireless communication apparatus, and when transfer confirmation information permitting the transfer concerning the transfer confirmation request and the predetermined data are transmitted from the first wireless communication apparatus, the management system may transmit setting information to set the connection right to the second wireless communication apparatus to cause the second wireless communication apparatus to set the connection right and transmits the predetermined data to the second wireless communication apparatus to exercise control to synchronize the data in the second wireless communication apparatus with the predetermined data. Accordingly, an operation of transmitting the transfer request to the management system is caused if the transfer operation is accepted and the management system causes an operation of transmitting a transfer confirmation request to request permission of the transfer concerning the transfer request to the first wireless communication apparatus when the transfer request is received and setting the connection rights to the second wireless communication apparatus and synchronizing the data in the second wireless communication apparatus with the predetermined data when transfer confirmation information permitting the transfer concerning the transfer confirmation request and the predetermined data are transmitted and received from the first wireless communication apparatus.

According to the first embodiment, the first wireless communication apparatus may transmit the transfer confirmation information to the management system with the predetermined data included in the transfer confirmation information. The management system may transmit the setting information to the second wireless communication apparatus with the predetermined data included in the setting information. Accordingly, the first wireless communication apparatus causes an operation of transmitting the transfer confirmation information to the management system with the predetermined data included in the transfer confirmation information and the management system causes an operation of transmitting the setting information to the second wireless communication apparatus with the predetermined data included in the setting information.

According to the first embodiment, the predetermined data may be content intended for a data synchronization process between the first wireless communication apparatus and the second wireless communication apparatus. Accordingly, an operation of setting content intended for a data synchronization process between the first wireless communication apparatus and the second wireless communication apparatus as the predetermined data is caused.

According to the first embodiment, the control unit may transmit the transfer request including the information to synchronize the content in the second wireless communication apparatus with newly updated content in the first wireless communication apparatus. Accordingly, an operation of transmitting the transfer request including the information to synchronize the content in the second wireless communication apparatus with newly updated content in the first wireless communication apparatus is caused.

According to the first embodiment, the accepting unit may accept the transfer operation and a synchronization instruction operation to synchronize the data in the second wireless communication apparatus with the predetermined data. The control unit may transmit the transfer request when the transfer operation and the synchronization instruction operation are accepted, and the control unit may transmit the transfer request without including the information for synchronization in the transfer request when only the transfer operation is accepted. Accordingly, an operation of transmitting the transfer request if the transfer operation and the synchronization instruction operation are accepted and transmitting the transfer request without including the information for synchronization in the transfer request if only the transfer operation is accepted is caused.

According to the first embodiment, the connection right may be a right to connect to a base station based on contract authentication information to connect to the base station operated by a communication operator. Accordingly, an operation of setting rights to connect to a base station based on contract authentication information to connect to the base station operated by a communication operator as the connection rights is caused.

According to a second embodiment of the present technology, there are provided an information processing apparatus, a method of controlling the information processing apparatus, and a program causing a computer to execute the method, the information processing apparatus including a receiving unit that receives a transfer request that requests a connection right to be transferred from a first wireless communication apparatus to which the connection right to connect to a predetermined network using wireless communication is set to a second wireless communication apparatus to which the connection right is not set, the transfer request including information used for synchronizing data in the second wireless communication apparatus with predetermined data in the first wireless communication apparatus, and a control unit that, when the transfer request is received, transmits setting information to set the connection right to the second wireless communication apparatus to cause the second wireless communication apparatus to set the connection right and transmits the predetermined data to the second wireless communication apparatus to exercise control to synchronize the data in the second wireless communication apparatus with the predetermined data. Accordingly, an operation of setting the connection rights to the second wireless communication apparatus and synchronizing the data in the second wireless communication apparatus with the predetermined data when the transfer request is received is caused.

According to a third embodiment of the present technology, there are provided a communication system, a method of controlling the communication system, and a program causing a computer to execute the method, the communication system including a wireless communication apparatus including an accepting unit that accepts a transfer operation to transfer a connection right from a first wireless communication apparatus to which the connection right to connect to a predetermined network using wireless communication is set to a second wireless communication apparatus to which the connection right is not set and a control unit that, when the transfer operation is accepted, transmits a transfer request that requests the connection right to be transferred from the first wireless communication apparatus to the second wireless communication apparatus with information included in the transfer request, the information being used for synchronizing data in the second wireless communication apparatus with predetermined data in the first wireless communication apparatus, and an information processing apparatus that, when the transfer request is received, transmits setting information to set the connection right to the second wireless communication apparatus to cause the second wireless communication apparatus to set the connection right and transmits the predetermined data to the second wireless communication apparatus to exercise control to synchronize the data in the second wireless communication apparatus with the predetermined data. Accordingly, the wireless communication apparatus causes an operation of transmitting the transfer request if the transfer operation is accepted and the information processing apparatus causes an operation of setting the connection rights to the second wireless communication apparatus and synchronizing the data in the second wireless communication apparatus with the predetermined data when the transfer request is received.

Advantageous Effects of Invention

According to the present technology, an excellent effect of being able to easily share data used among a plurality of wireless communication apparatuses can be achieved.

BRIEF DESCRIPTION OF DRAWINGS

FIG. 1 is a simplified diagram showing one example usage of a plurality of wireless communication apparatus (devices) according to a first exemplary embodiment.

FIG. 4 is a schematically diagram of a group management database 220, according to the first exemplary embodiment.

FIG. 6 is a simplified diagram showing transfer examples of use rights over MCIM among a plurality of wireless communication apparatuses, according to the first exemplary embodiment.

FIG. 9 is a diagram showing exemplary display screens (transfer result notification screens 520, 530) displayed in the display unit 370 of the wireless communication apparatus, according to the first exemplary embodiment.

DESCRIPTION OF EMBODIMENTS

Figure 2:
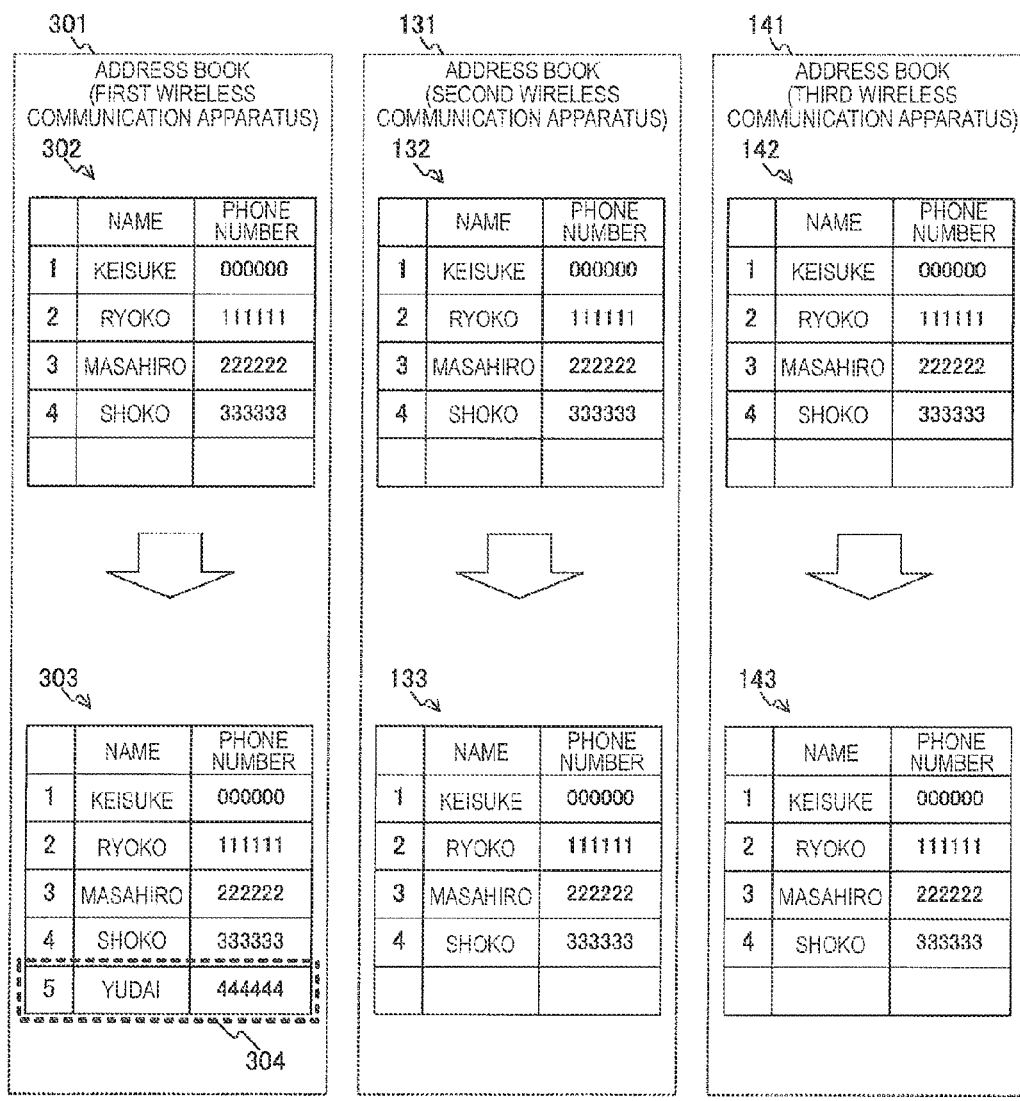
FIG. 2 is a simplified diagram showing transition examples of address books entered in each wireless communication apparatus, according to the first exemplary embodiment.

Forms to carry out the present technology (hereinafter, called embodiments) will be described below. The description will be provided in the following order:

1. First embodiment (data synchronization process control: example of performing a data synchronization process with synchronous data included in transmission data related to a transfer process of MCIM (Machine Communication Identity Module))

2. Second embodiment (data synchronization process control: example of performing a data synchronization process by transmitting synchronous data separately from transmission data related to a transfer process of MCIM)

3. Modification

1. First Embodiment

Example Usage of Wireless Communication Apparatuses

FIG. 1 is a simplified diagram showing one example usage of a plurality of wireless communication apparatuses (devices) according to the first embodiment of the present technology. More specifically, usage states of three wireless communication apparatuses (a first wireless communication apparatus 300, a second wireless communication apparatus 130, and a third wireless communication apparatus 140) owned by a user 10 are shown.

FIG. 1A shows a state in which the user 10 uses three wireless communication apparatuses (the first wireless communication apparatus 300, the second wireless communication apparatus 130, and the third wireless communication apparatus 140). FIG. 1B shows a state in which the user 10 uses one wireless communication apparatus (the first wireless communication apparatus 300) by holding the apparatus in his (her) hand. Also, a state in which two wireless communication apparatuses (the second wireless communication apparatus 130, and the third wireless communication apparatus 140) are placed in a relatively distant place (a distance indicated by an arrow 30 apart) is shown. For example, a case when the user 10 uses one wireless communication apparatus (the first wireless communication apparatus 300) outside a house 20 and two wireless communication apparatuses (the second wireless communication apparatus 130, and the third wireless communication apparatus 140) are placed in the house 20 is assumed.

The first wireless communication apparatus 300 is, for example, a mobile phone (a smartphone equipped with a calling function and a data communication function, for example) and the second wireless communication apparatus 130 is, for example, an electronic book display apparatus equipped with a wireless communication function. The third wireless communication apparatus 140 is, for example, an information processing apparatus (a notebook PC) equipped with a wireless communication function. It is also assumed that these three wireless communication apparatuses are equipped with a management function to manage an address book or a schedule book.

For example, when, as shown in FIG. 1B, the user 10 uses the first wireless communication apparatus 300 outside the house 20, a case of entering a new contact address in an address book in the first wireless communication apparatus 300 can be assumed. Update examples of the address books in this case are shown in FIG. 2.

[Update Examples of the Address Books]

FIG. 2 is a simplified diagram showing transition examples of address books entered in each wireless communication apparatus according to the first embodiment of the present technology.

In FIG. 2, a case in which a new contact address (contact address surrounded by a frame 304 of a thick broken line) is entered in the address book of the first wireless communication apparatus 300 (lower side of FIG. 2) when the address book of the same content is entered in each wireless communication apparatus (upper side of FIG. 2) is assumed.

Also in FIG. 2, the transition of the address book of the first wireless communication apparatus 300 is shown in a frame 301, the transition of the address book of the second wireless communication apparatus 130 is shown in a frame 131, and the transition of the address book of the third wireless communication apparatus 140 is shown in a frame 141.

In addition, an address book (address book 302) before a new contact address is entered (before the update) in the first wireless communication apparatus 300 and an address book (address book 303) after the entry (after the update) are shown in the frame 301. Similarly, address books (an address book 132 and an address book 142) before a new contact address is entered (before the update) in the first wireless communication apparatus 300 and address books (an address book 133 and an address book 143) after the entry (after the update) are shown in the frame 131 and the frame 141 respectively. In FIG. 2, examples in which only the name and the phone number are entered in the address book are shown to simplify the description. In addition, simplified characters (KEISUKE, RYOKO and so on) are shown for the name and only simplified numeric values (000000, 111111 and so on) are shown for the phone number.

In the address book 303, a newly entered contact address is indicated by the frame (the frame 304) of a thick broken line.

As shown in the frame 304 of the address book 133, when the user 10 enters a new contact address, the entered contact address is entered in the address book of the wireless communication apparatus (the first wireless communication apparatus 300) on which the entry operation is performed. Here, a case when the new contact address entered on the first wireless communication apparatus 300 is entered on the second wireless communication apparatus 130 and the third wireless communication apparatus 140 is assumed. For example, a case when the user 10 performs an entry operation to enter the new contact address on each of the second wireless communication apparatus 130 and the third wireless communication apparatus 140 can be assumed. In this case, however, it is necessary to perform an entry operation on each wireless communication apparatus and the entry operation becomes complicated. Thus, performing data communication (for example, short-distance wireless communication) between each wireless communication apparatus to perform a data synchronization process for each piece of data of the address book can be considered.

However, as shown in FIG. 1B, such data communication cannot be performed when wireless communication apparatuses are widely apart. Thus, causing each wireless communication apparatus to hold contract authentication information before performing a data synchronization process by data communication via a predetermined network can be considered. In this case, it is necessary to cause each wireless communication apparatus to hold contract authentication information and thus, the cost for the contract is needed. Therefore, in the first embodiment, an example in which a contact address newly entered on the first wireless communication apparatus 300 is easily synchronized (shared) with the second wireless communication apparatus 130 and the third wireless communication apparatus 140 is shown.

[Example Configuration of Communication System]

Figure 3:
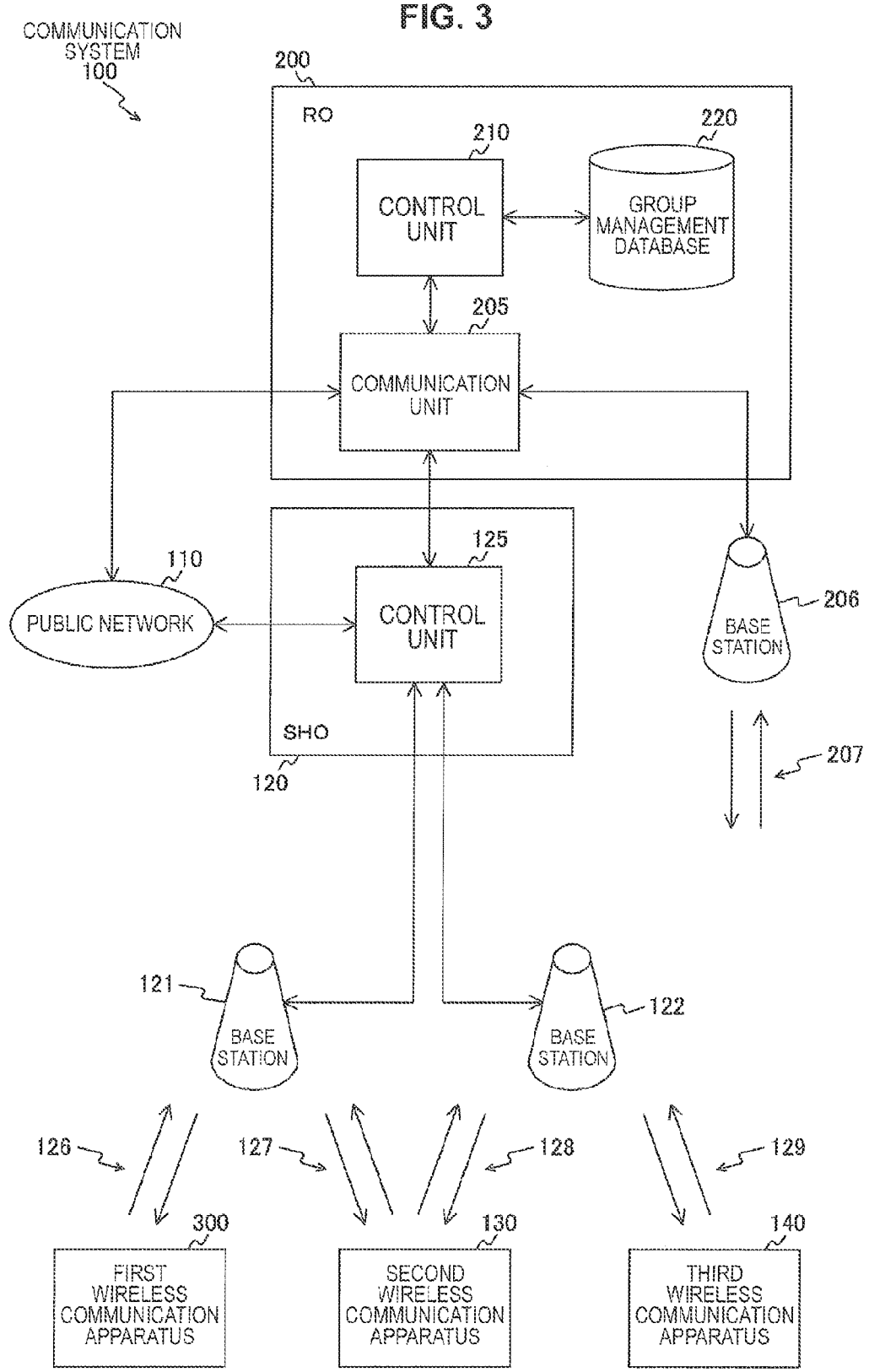
FIG. 3 is a block diagram showing an exemplary system configuration of a communication system 100, according to the first exemplary embodiment.

FIG. 3 is a block diagram showing an exemplary system configuration of a communication system 100 according to the first embodiment of the present disclosure. The communication system 100 includes a public network 110, base stations 121, 122, 206, the first wireless communication apparatus 300, the second wireless communication apparatus 130, and the third wireless communication apparatus 140. The communication system 100 also includes an SHO (Selected Home Operator) 120 and an RO (Registration Operator) 200. Thus, in the first embodiment of the present technology, a network configuration example constituted of the SHO 120 and the RO 200 is shown (see, for example, Non-Patent Literature 1).

Here, RO and SHO show logical roles and a case in which RO and SHO are operated by different operators can be assumed, but also a case in which RO and SHO are operated by the same operator can be assumed. In addition, a case in which a plurality of RO or a plurality of SHO is present can be assumed. Each of RO and SHO may be configured integrally as an information processing apparatus or constituted of a plurality of apparatuses. Here, RO and SHO mean relative roles when a wireless communication apparatus having a valid MCIM (Machine Communication Identity Module) is used as a reference. Thus, there is a possibility that RO for one wireless communication apparatus corresponds SHO for another wireless communication apparatus.

For example, a case when the first wireless communication apparatus 300 holds a valid MCIM (use rights over MCIM) and the second wireless communication apparatus 130 and the third wireless communication apparatus 140 hold no valid MCIM is assumed. In this case, only the first wireless communication apparatus 300 can connect to the SHO 120. In contrast, the second wireless communication apparatus 130 and the third wireless communication apparatus 140 holding no MCIM can connected to the RO 200 based on PCID (Provisional Connectivity Identity).

The MCIM is an example of contract authentication information and the contract authentication information is information including subscriber information of the telephone and information of authentication. The MCIM is contract authentication information (so-called soft SIM (Subscriber Identity Module)) that is not limited to a specific communication operator when, for example, a device is purchased and allows the user to flexibly set the communication operator after the purchase. A case when no valid MCIM is held means, for example a case when MCIM itself is not held or only MCIM invalidated by an invalidation process of MCIM is held.

PCID is an identifier (for example, terminal identification information 225 in a network shown in FIG. 4) to connect to RO and is attached to all wireless communication apparatuses (devices).

By transferring use rights over MCIM (rights of using an MCIM) between a plurality of wireless communication apparatuses, MCIM can be shaped among the plurality of wireless communication apparatuses. In this case, the plurality of wireless communication apparatuses related to the sharing can be set as a group. The group can be managed by a group management database 220.

The public network 110 is a public network such as a telephone network, the Internet and the like. The public network 110 and the SHO 120 are connected via a gateway (not shown). Similarly, the public network 110 and the RO 200 are connected via a gateway (not shown).

The SHO 120 is a communication control apparatus managed by a wireless operator providing wireless connection services. The SHO 120 provides Internet services and the like and corresponds to, for example, a wireless operator (for example, a mobile phone operator) providing wireless connection services. The SHO 120 includes a control unit 125.

The control unit 125 carries out authentication control of wireless communication apparatuses connected via the base stations 121, 122. For example, among wireless communication apparatuses connected via the base stations 121, 122, the control unit 125 authenticates wireless communication apparatuses having valid MCIM (contract authentication information) of the SHO 120. Then, the SHO 120 connects authenticated wireless communication apparatuses to the public network 110 via a gateway (not shown).

The control unit 125 is connected to RO 200 to exchange various kinds of information with the RO 200. A wireless communication apparatus holding no valid MCIM (contract authentication information) can be connected (limited connection) to the RO 200 via the SHO 120 based on PCID of the wireless communication apparatus. When a transfer request of MCIM is received from a wireless communication apparatus, the control unit 125 transmits the transfer request to the RO 200.

The base stations 121, 122 are mobile communication base stations (Node B) that connect the first wireless communication apparatus 300, the second wireless communication apparatus 130, and the third wireless communication apparatus 140, and the SHO 120 via wireless lines 126 to 129.

For example, in the communication system 100, a wireless communication apparatus holding valid MCIM is connected to the base stations 121, 122 via the wireless lines 126 to 129 before being connected to the SHO 120 via the base stations 121, 122. When a wireless communication apparatus holding a valid MCIM is connected to the RO 200, the wireless communication apparatus is connected to the RO 200 via the SHO 120.

A wireless communication apparatus holding no valid MCIM can be connected (limited connection) to the RO 200 via a wireless line 207 and the base station 206 based on PCID of the wireless communication apparatus. A wireless communication apparatus holding no valid MCIM can be connected to any of the base stations 121, 122, 206 depending on the position of use and can be connected to the RO 200 via these base stations.

The RO 200 provides services such as initial connection registration and includes a communication unit 205, a control unit 210, and the group management database 220. The RO 200 is an example of a management system and an information processing apparatus described in claims.

The communication unit 205 transmits and receives various kinds of information based on the control of the control unit 210. The communication unit 205 is connected to the SHO 120 and the base station 206 to transmit and receive various kinds of information to/from each wireless communication apparatus connected via these units.

The control unit 210 carries out control of a wireless communication apparatus connected via the communication unit 205 (or via the communication unit 205 and the SHO 120). For example, the control unit 210 acquires information (group information) about a group constituted of a plurality of wireless communication apparatuses sharing an MCIM from the group management database 220 and supplies the group information to the wireless communication apparatuses via the communication unit 205 and the SHO 120.

Here, the above group will be described. The group is a group that shares network connection rights. The network connection rights (connection rights) are rights to connect to a predetermined network (for example, the public network 110) using wireless communication and corresponds to, for example, MCIM use rights. That is, network connection rights are rights to connect to a base station based on MCIM (contract authentication information) to connect to the base station operated by a communication operator. In addition, presence/absence of network connection rights corresponds to presence/absence of use rights over MCIM.

The group management database 220 is a database to manage groups constituted of a plurality of wireless communication apparatuses sharing MCIM. The group management database 220 will be described in detail with reference to FIG. 4.

For example, the communication unit 205 receives a transfer request of MCIM from the first wireless communication apparatus 300. The transfer request of MCIM requests, for example, the transfer of use rights over MCIM from the first wireless communication apparatus 300 to which use rights over MCIM (connection rights) are set to the second wireless communication apparatus 130 to which use rights over MCIM are not set. The transfer request of MCIM includes information to synchronize data (for example, an address book) in the second wireless communication apparatus 130 with predetermined data (for example, an address book) in the first wireless communication apparatus 300 during a transfer process. If, for example, the transmission source of the transfer request of MCIM is the transfer source of use rights over MCIM, the information for synchronization is predetermined data of the transfer source. If the transmission source of the transfer request of MCIM is the transfer destination of use rights over MCIM, the information for synchronization is information to request predetermined data in the transfer source. The RO 200 acquires predetermined data in the transfer source based on the information. The communication unit 205 is an example of a receiving unit described in claims.

When the transfer request of MCIM is received, the control unit 210 transmits setting information to set use rights over MCIM to the second wireless communication apparatus 130 to allow the second wireless communication apparatus 130 to set use rights over MCIM. When the transfer request of MCIM is received, the control unit 210 also transmits the predetermined data to the second wireless communication apparatus 130 to carry out control to synchronize data in the second wireless communication apparatus 130 with the predetermined data. Whether use rights over MCIM are set to a wireless communication apparatus can be determined based on content (for example, valid/invalid information 226 shown in FIG. 4) of the group management database 220.

An example of transferring use rights over MCIM (transfer example of network connection rights) in the communication system 100 will be described. For example, each wireless communication apparatus is caused to hold an MCIM. Then, use rights over MCIM can be transferred by MCIM held by each wireless communication apparatus being validated/invalidated by the SHO 120 based on instructions from the control unit 210. Incidentally, an MCIM held by each wireless communication apparatus can also be validated/invalidated on the side of the RO 200. Thus, use rights over MCIM may be transferred by an MCIM held by each wireless communication apparatus being validated/invalidated by the control unit 210.

Instead of causing each wireless communication apparatus to hold an MCIM, use rights over MCIM may be transferred by transferring the MCIM itself. For example, a case when use rights over MCIM are transferred from the first wireless communication apparatus 300 to the second wireless communication apparatus 130 is assumed. For example, a transfer request of MCIM is transmitted from the first wireless communication apparatus 300 to the control unit 210. In this case, an MCIM held by the first wireless communication apparatus 300 is invalidated (deleted) by the SHO 120 based on instructions from the control unit 210. In addition, transfer information (setting information including the MCIM) is transmitted from the SHO 120 to the second wireless communication apparatus 130 via the control unit 210. By causing the second wireless communication apparatus 130 to hold the MCIM included in the transfer information, the valid MCIM is set to the second wireless communication apparatus 130.

[Example Configuration of Group Management Database]

FIG. 4 is a schematically diagram of a group management database 220, according to the first exemplary embodiment.

FIG. 4 shows a case when the first wireless communication apparatus 300, the second wireless communication apparatus 130, and the third wireless communication apparatus 140 are entered in a group AB.

In the group management database 220, a group name 221, a group ID 222, a group password 223, a device name 224, terminal identification information 225, valid/invalid information 226, and a synchronous data 227 are stored so as to be associated with one another in group units. Such information is successively updated by the control unit 210 based on requests (group addition requests, group deletion requests) from the respective wireless communication apparatuses, for example.

A name assigned to a group is stored in the group name 221. Such name is stored for example when a group is generated.

A group ID assigned to a group is stored in the group ID 222. A password assigned to a group is stored in the group password 223. A group addition request for adding a new wireless communication apparatus to the group is made using such ID and password. The respective wireless communication apparatuses belonging to a group may store in advance the ID and password assigned to such group (for example, storage in a memory 340 shown in FIG. 5). Alternatively, an arrangement may be used where the ID and password are not stored in a wireless communication apparatus and are inputted each time by the user.

Names assigned to the wireless communication apparatus are stored in the device name 224. As one example, such names are stored when devices are newly added to a group of wireless communication apparatuses.

Terminal identification numbers of wireless communication apparatuses are stored in the terminal identification information 225. Terminal identification information is identification information for identifying a wireless communication apparatus, and as one example a PCID is stored. In FIGS. 4(a) and 4(b), "PCID#1" in the terminal identification information 225 corresponds to the first wireless communication apparatus 300. In the same way, "PCID#2" in the terminal identification information 225 corresponds to the second wireless communication apparatus 130 and "PCID#3" in the terminal identification information 225 corresponds to the third wireless communication apparatus 140.

Information showing whether the MCIM at the wireless communication apparatus is valid or invalid (or an MCIM is yet to be stored) is stored in the valid/invalid information 226. Note that in FIG. 4(a), for ease of explanation, a wireless communication apparatus where the MCIM is valid is shown as "valid" and a wireless communication apparatus where the MCIM is invalid is shown as "invalid".

Data (synchronous data) used for a data synchronization process when the data synchronization process is performed between wireless communication apparatuses belonging to the group is temporarily stored in the synchronous data 227. For example, synchronous data transmitted from the transfer source of use rights over MCIM is stored in the synchronous data 227 and the synchronous data stored in the synchronous data 227 is transmitted to the transfer destination of the use rights over MCIM. Regarding synchronous data transmitted to the transfer destination of the use rights over MCIM in this manner, deletion processes are successively performed thereon by the control unit 210.

In this manner, groups constituted of a plurality of wireless communication apparatuses sharing an MCIM are managed in the group management database 220. In the first embodiment of the present technology, the description is provided by assuming that a data synchronization process is performed between wireless communication apparatuses belonging to the same group.

[Example Configuration of Wireless Communication Apparatus]

Figure 5:
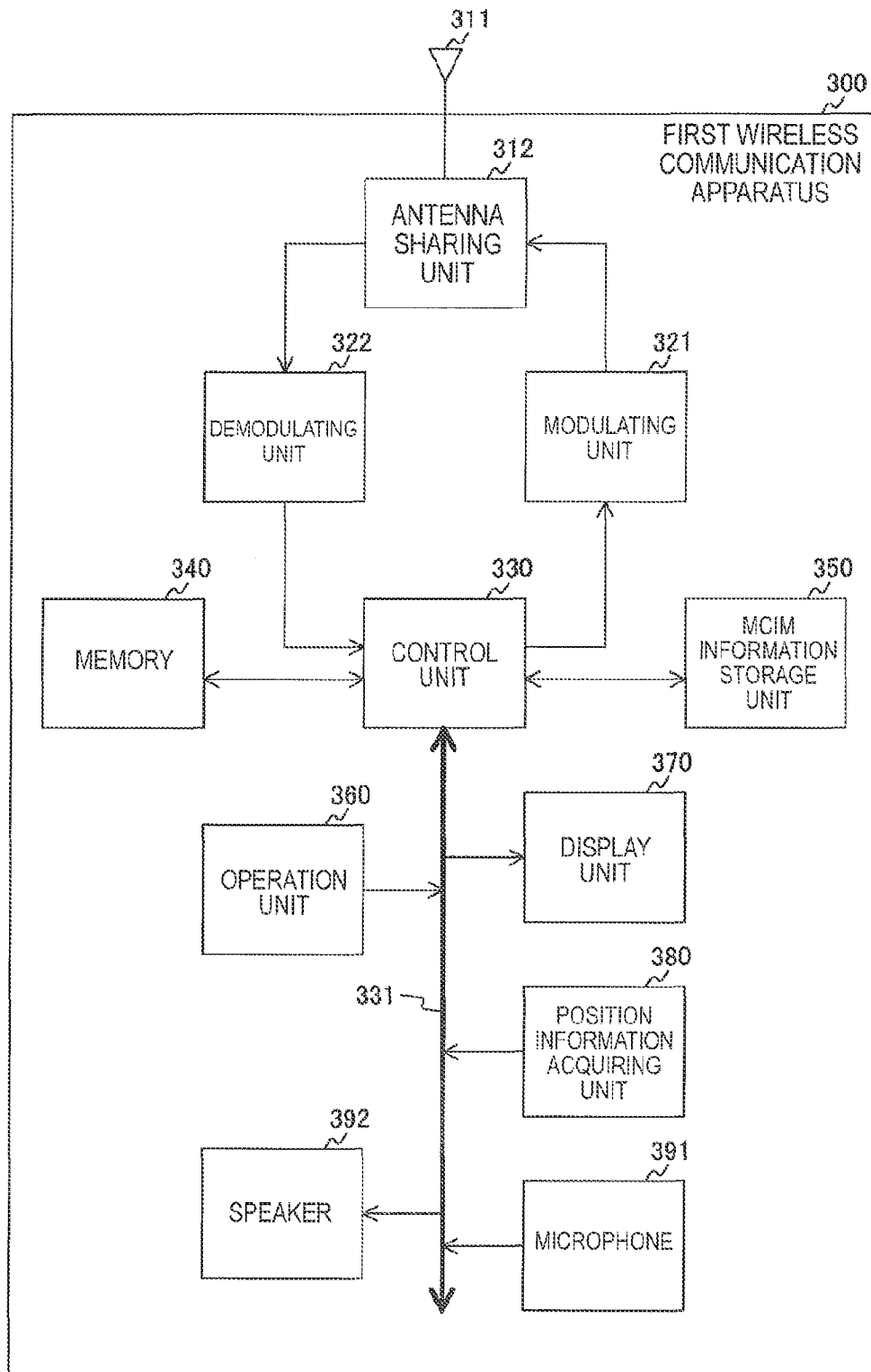
FIG. 5 is a block diagram showing an example of an internal configuration of a first wireless communication apparatus, according to the first exemplary embodiment.

FIG. 5 is a block diagram showing an example of the internal configuration of the first wireless communication apparatus 300 according to the first embodiment of the present disclosure. Note that since the internal configurations of the second wireless communication apparatus 130 and the third wireless communication apparatus 140 are the same as that of the first wireless communication apparatus 300, description thereof is omitted here. Also, in FIG. 6 onwards, when describing the second wireless communication apparatus 130 or the third wireless communication apparatus 140, names and reference numerals corresponding to the first wireless communication apparatus 300 are used.

The first wireless communication apparatus 300 includes an antenna 311, an antenna sharing unit 312, a modulating unit 321, a demodulating unit 322, a control unit 330, a memory 340, and the MCIM information storage unit 350. The first wireless communication apparatus 300 also includes an operation unit 360, a display unit 370, a location information acquiring unit 380, a microphone 391, and a speaker 392. Such components are connected by a bus 331. As one example, the first wireless communication apparatus 300 is realized by a mobile telephone apparatus capable of telephone calls and data communication.

For example, when a reception process is carried out, radio waves received by the antenna 311 are demodulated via the antenna sharing unit 312 by the demodulating unit 322 and demodulated reception data is supplied to the control unit 330. When the reception process is an incoming call process, the demodulated reception data (audio data) is outputted via the control unit 330 from the speaker 392 as sound.

When, for example, a transmission process is carried out, the transmission data outputted by the control unit 330 is modulated by the modulating unit 321 and the modulated transmission data is transmitted via the antenna sharing unit 312 from the antenna 311. When the transmission process is an outgoing call process, audio data inputted from the microphone 391 is modulated via the control unit 330 by the modulating unit 321 and modulated transmission data (audio data) is transmitted via the antenna sharing unit 312 from the antenna 311.

The control unit 330 carries out various control based on a control program stored in the memory 340. As one example, the control unit 330 is constructed of a microprocessor. For example, the control unit 330 is connected to the modulating unit 321 and the demodulating unit 322 and transmits and receives various data to and from the SHO 120 connected via the base stations 121, 122. The control unit 330 also carries out a connection process that connects to the RO 200 (with a limited connection) via a wireless connection based on the PCID, for example, without using the MCIM.

The memory 340 is a memory storing a control program for enabling the control unit 330 to carry out various controls, in addition to transmission data, reception data, and the like. As examples, the memory 340 is constructed of ROM (Read Only Memory) and/or RAM (Random Access Memory). Terminal identification information (PCID#1) for specifying the first wireless communication apparatus 300 and a device name (for example, the device name 224 shown in FIG. 4(*a*)) of the first wireless communication apparatus 300 are also stored in the memory 340. Such device name is registered for example by a user operation. The ID and password assigned to the group AB to which the first wireless communication apparatus 300 belongs (as one example, the group ID 222 and the group password 223 shown in FIG. 4(*a*)) are also stored in the memory 340. As one example, such group ID and password are included in a group addition authentication result given in response to a group addition request, transmitted from the RO 200, and stored in the memory 340.

In addition, content of the address book (for example, the address book 302 shown in FIG. 2) and schedule book is recorded in the memory 340.

The MCIM information storage unit 350 is a memory storing an MCIM (contract authentication information). As the MCIM information storage unit 350, as examples it is possible to use a UICC (Universal Integrated Circuit) card or a dedicated memory for securely storing an MCIM. Note that when a UICC card is used as the MCIM information storage unit 350, instead of the MCIM being permanently written, a card capable of a validation process and an invalidation process for the MCIM is used. That is, a device that enables the control unit 330 to carry out a validation process and an invalidation process for an MCIM based on transfer information that has been received from the antenna 311 and demodulated is used. Also, a device that allows the MCIM to be rewritten is used. Note that the validation process and invalidation process for the MCIM can be carried out according to the validation process and invalidation process defined by 3GPP (Third Generation Partnership Project). Also, by providing a secure region in the memory 340, the MCIM information storage unit 350 may be provided inside the memory 340.

The operation unit 360 is an operation accepting unit accepting operation input operated by the user and outputs a signal to a control unit 330 in accordance with the accepted operation input. The operation unit 360 includes various keys such as numeric keys and alphabetical keys. The operation unit 360 accepts a transfer operation (transfer instruction operation of an MCIM) to transfer use rights over MCIM. The operation unit 360 is an example of an accepting unit described in claims.

The display unit 370 is a display unit displaying various kinds of information (character information, time information and the like) based on the control of the control unit 330. The display unit 370 displays information (for example, display screens shown in FIGS. 7 to 9) to transfer use rights over MCIM. As the display unit 370, for example, a display panel such as an organic EL (Electro Luminescence) panel, an LCD (Liquid Crystal Display) panel or the like can be used. The operation unit 360 and the display unit 370 can integrally be configured by using a touch panel on which the user can do operation input by touching a display surface with a user's finger or bringing a user's finger closer to the display surface.

When, for example, a transfer instruction operation of MCIM is accepted by the operation unit 360, the control unit 330 carries out control to transmit a transfer request of MCIM to the RO 200. The transfer request of MCIM requests the transfer of use rights over MCIM from the transfer source to the transfer destination. In addition, as described above, the transfer request of MCIM includes information to synchronize data in the transfer destination with predetermined data in the transfer source during a transfer process.

If, for example, the first wireless communication apparatus 300 holds use rights over MCIM, the control unit 330 transmits predetermined data (synchronous data for the data synchronization process) stored in the memory 340 to the RO 200 as the information for synchronization. The predetermined data is, for example, content (for example, an address book and a schedule book) for a data synchronization process between the transfer source and the transfer destination of MCIM. That is, the transfer request of MCIM includes information to synchronize content in the transfer destination of MCIM with content newly updated in the transfer source of MCIM.

A synchronization instruction operation to perform a data synchronization process between the transfer source and the transfer destination of MCIM may be separated from a synchronization instruction operation of MCIM. In this case, when a synchronization instruction operation of MCIM and a synchronization instruction operation are accepted, the control unit 330 transmits a transfer request of the MCIM and predetermined data to the RO 200. On the other hand, only a synchronization instruction operation of MCIM is received, the control unit 330 does not transmit predetermined data and transmits only a transfer request to transfer use rights over MCIM.

When, for example, predetermined data (synchronous data) is received from the first wireless communication apparatus 300, the RO 200 holds the predetermined data in the group management database 220. The RO 200 transmits the predetermined data held in the group management database 220 to the transfer destination of the MCIM. After the predetermined data is transmitted to the transfer destination of the MCIM, the RO 200 deletes the predetermined data held in the group management database 220. If the predetermined data is not transmitted to the transfer destination of MCIM after being held in a predetermined time (for example, 10 min) or longer, the RO 200 may delete the predetermined data without transmitting the data. The predetermined time can be made changeable by a user operation. That is, the user performs a transfer instruction operation of MCIM and also a specification operation to specify the predetermined time through the operation unit 360. If the specification operation is accepted, the control unit 330 transmits time information of the specified predetermined time (for example, 5 min) to the RO 200 in association with the predetermined data. The RO 200 also deletes the predetermined data using the predetermined time (for example, 5 min) related to the time information transmitted in association with the predetermined data.

When, for example, predetermined data (synchronous data) from the first wireless communication apparatus 300 is held by the group management database 220, the RO 200 may notify the transfer destination of MCIM of the above information. In this case, the information is displayed in the display unit 370 of the transfer destination.

If the first wireless communication apparatus 300 does not hold use rights over MCIM, the control unit 330 transmits only a transfer request of MCIM without transmitting predetermined data (synchronous data for the data synchronization process) stored in the memory 340 to the RO 200. That is, the transfer request of MCIM includes information to synchronize data in the transfer destination with predetermined data in the transfer source (for example, information to request predetermined data from the transfer source), but does not include the predetermined data. In this case, when a transfer request of MCIM is received from the first wireless communication apparatus 300, the RO 200 transmits a transfer confirmation request to request permission of the transfer related to the transfer request to the wireless communication apparatus of the transfer source. Then, if transfer confirmation information permitting the transfer related to the transfer confirmation request and the predetermined data are transmitted from the transfer source, the RO 200 transmits setting information to set use rights over MCIM to the transfer destination to cause the transfer destination to set use rights over MCIM. The RO 200 also transmits predetermined data to the transfer destination to carry out control to synchronize data in the transfer destination with the predetermined data.

The location information acquiring unit 380 acquires location information showing the location where the first wireless communication apparatus 300 is present and outputs the acquired location information to the control unit 330. As one example, the location information acquiring unit 380 can be realized by a GPS (Global Positioning System) unit that calculates the location information using GPS signals received by a GPS signal reception antenna (not shown). The calculated location information includes various data relating to location, such as latitude, longitude, and altitude, at the time the GPS signals were received. It is also possible to use a location information acquiring apparatus acquiring location information according to a different method of acquiring location information. For example, it is possible to derive location information using access point information according to a wireless LAN (Local Area Network) present in the periphery and to use a location information acquiring apparatus that acquires such location information.

[Transfer Examples of Use Rights Over MCIM]

FIG. 6 is a simplified diagram showing transfer examples of use rights over MCIM among a plurality of wireless communication apparatuses according to the first embodiment of the present technology.

FIG. 6A shows a transfer example when use rights over MCIM are transferred from the first wireless communication apparatus 300 holding MCIM use rights to the second wireless communication apparatus 130 by the first wireless communication apparatus 300 being operated by the user 10. The first wireless communication apparatus 300 (transfer source) holds use rights over MCIM in a state before the transfer of use rights over MCIM and so the first wireless communication apparatus 300 is connected to the SHO 120. On the other hand, the second wireless communication apparatus 130 (transfer destination) does not hold use rights over MCIM and so the second wireless communication apparatus 130 is connected to the RO 200. The data synchronization process when the transfer process shown in FIG. 6A is performed will be described in detail with reference to FIGS. 10, 11, 24, and 25.

FIG. 6B shows a transfer example when use rights over MCIM are transferred from the first wireless communication apparatus 300 to the second wireless communication apparatus 130 holding no MCIM use rights by the second wireless communication apparatus 130 being operated by the user 10. In a state before the transfer of use rights over MCIM, like in FIG. 6A, the first wireless communication apparatus 300 (transfer source) is connected to the SHO 120 and the second wireless communication apparatus 130 (transfer destination) is connected to the RO 200. Data sharing when the transfer process shown in FIG. 6B is performed will be described in detail with reference to FIGS. 12, 13, 26, and 27.

FIG. 6C shows a transfer example when use rights over MCIM are transferred from the first wireless communication apparatus 300 to the second wireless communication apparatus 130 by the third wireless communication apparatus 140 holding no MCIM use rights being operated by the user 10. That is, in FIG. 6C, an example in which use rights over MCIM are transferred by a wireless communication apparatus (the third wireless communication apparatus 140) other than the transfer source and the transfer destination of use rights over MCIM being operated by the user 10. In a state before the transfer of use rights over MCIM, like in FIG. 6A, the first wireless communication apparatus 300 (transfer source) is connected to the SHO 120 and the second wireless communication apparatus 130 (transfer destination) is connected to the RO 200. The third wireless communication apparatus 140 used for a transfer instruction operation of MCIM holds no use rights over MCIM and so the third wireless communication apparatus 140 is not connected to the RO 200. Data sharing when the transfer process shown in FIG. 6C is performed will be described in detail with reference to FIGS. 14 to 16 and 28 to 30.

[Display Example of the Group List Display Screen]

Figure 7:
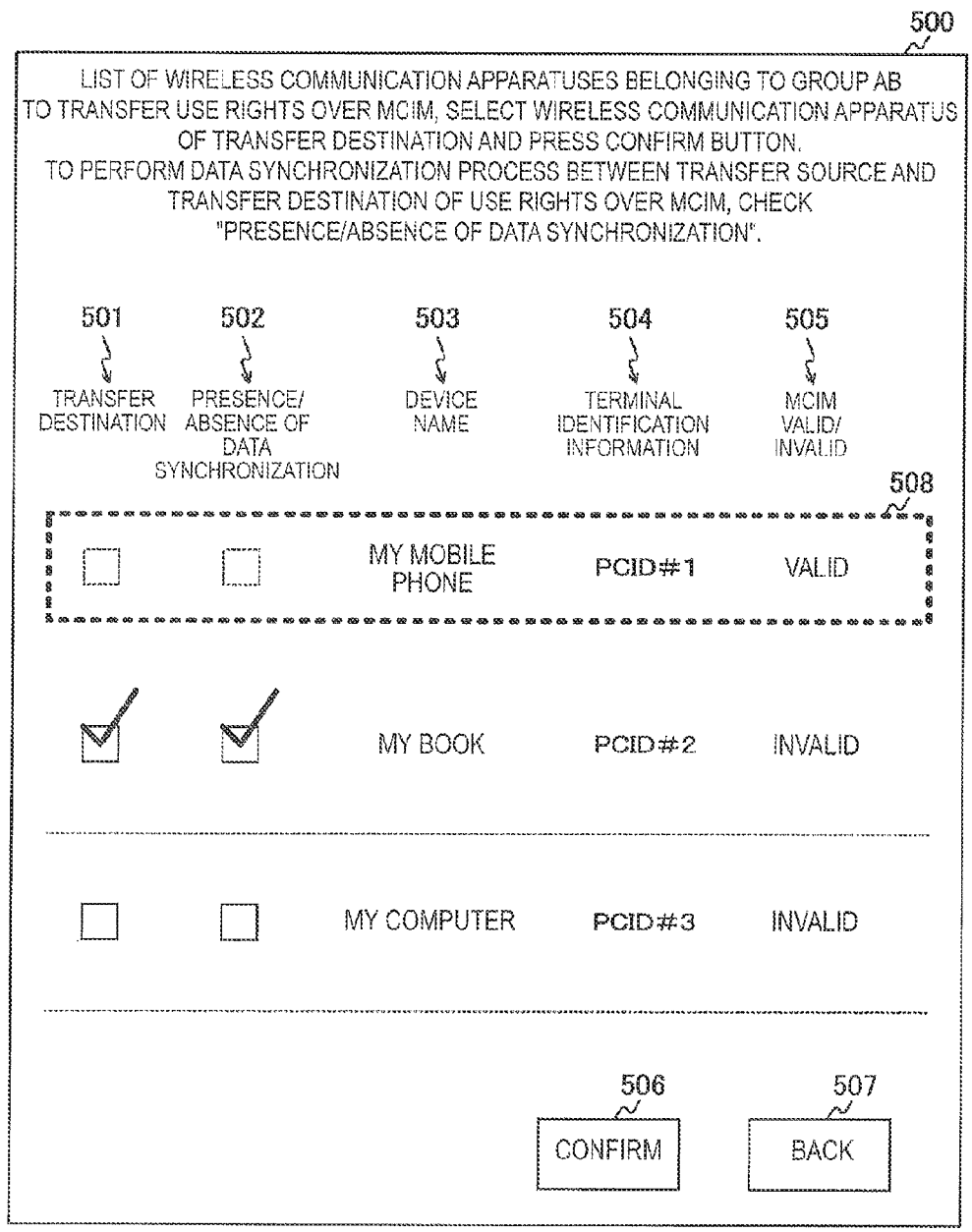
FIG. 7 is a diagram showing an exemplary display screen (group list display screen 500) displayed in a display unit 370 of the first wireless communication apparatus 300, according to the first exemplary embodiment.

FIG. 7 is a diagram showing an exemplary display screen (the group list display screen 500) displayed in the display unit 370 of the first wireless communication apparatus 300 according to the first embodiment of the present technology.

The group list display screen 500 is a display screen to list information (group information) about each wireless communication apparatus belonging to a group and a display screen to allow the transfer of use rights over MCIM. The group list display screen 500 is displayed, for example, in accordance with a selection operation in a display screen (for example, a menu screen) to select the function the first wireless communication apparatus 300 is caused to execute. The group list display screen 500 is also displayed based on content of the group management database 220 of the RO 200.

More specifically, a transfer destination selection area 501, a presence/absence selection area 502 of data synchronization, a device name display area 503, a terminal identification information display area 504, and an MCIM valid/invalid information display area 505 are provided in the group list display screen 500. In addition, a confirm button 506 and a back button 507 are provided in the group list display screen 500.

In the transfer destination selection area 501, a check box to select the wireless communication apparatus of the transfer destination when use rights over MCIM are transferred between each wireless communication apparatus belonging to a group is displayed. For example, when a selection operation of the wireless communication apparatus of the transfer destination is performed, a "✓" mark is attached to the transfer destination selection area 501 corresponding to the selected wireless communication apparatus.

In the presence/absence selection area 502 of data synchronization, a check box to select whether to perform a data synchronization process between the transfer source and the transfer destination of use rights over MCIM is displayed. Incidentally, only if the wireless communication apparatus of the transfer destination is selected from the transfer destination selection area 501, the presence/absence selection area 502 of data synchronization corresponding to the selected wireless communication apparatus is made selectable. If, for example, a selection operation (synchronization instruction operation) selecting to perform a data synchronization process between the transfer source and transfer destination of use rights over MCIM is performed, a "✓" mark is attached to the presence/absence selection area 502 of data synchronization corresponding to the selected wireless communication apparatus. That is, a "✓" mark is attached to the same wireless communication apparatus in the transfer destination selection area 501 and the presence/absence selection area 502 of data synchronization.

In the device name display area 503, the name (device name) representing each wireless communication apparatus belonging to a group is displayed. For example, the device name (device name 224 shown in FIG. 4) stored in the group management database 220 is displayed.

In the terminal identification information display area 504, terminal identification information representing each wireless communication apparatus belonging to a group is displayed. For example, terminal identification information (terminal identification information 225 shown in FIG. 4) stored in the group management database 220 is displayed.

In the MCIM valid/invalid information display area 505, valid/invalid information of MCIM of each wireless communication apparatus belonging to a group is displayed. For example, valid/invalid information (valid/invalid information 226 shown in FIG. 4) stored in the group management database 220 is displayed. That is, the user can grasp wireless communication apparatuses holding valid MCIM visually and easily by viewing "valid" and "invalid" displayed in the MCIM valid/invalid information display area 505. To enable the user to grasp wireless communication apparatuses holding valid MCIM more easily, information about wireless communication apparatuses holding valid MCIM is surrounded by a rectangle 508 of a dotted line and displayed.

The confirm button 506 is a button pressed to determine an operation after the operation to transfer use rights over MCIM is performed on the group list display screen 500.

The back button 507 is a button pressed to, for example, return to the display screen displayed immediately before.

A time specification area to perform a specification operation to specify the time (predetermined time) between the storage and deletion of synchronous data in the group management database 220 of RO 200 may be provided in the group list display screen 500. If a time is specified in the time specification area, the control unit 330 transmits time information of the specified predetermined time (for example, 5 min) to the RO 200 in association with the synchronous data.

In addition, a target content selection area to select content (for example, an address book and a schedule book) intended for a data synchronization process may be provided in the group list display screen 500. In this case, the data synchronization process can be performed on only content selected in the target content selection area.

[Display Example of the Transfer Confirmation Screen]

Figure 8:
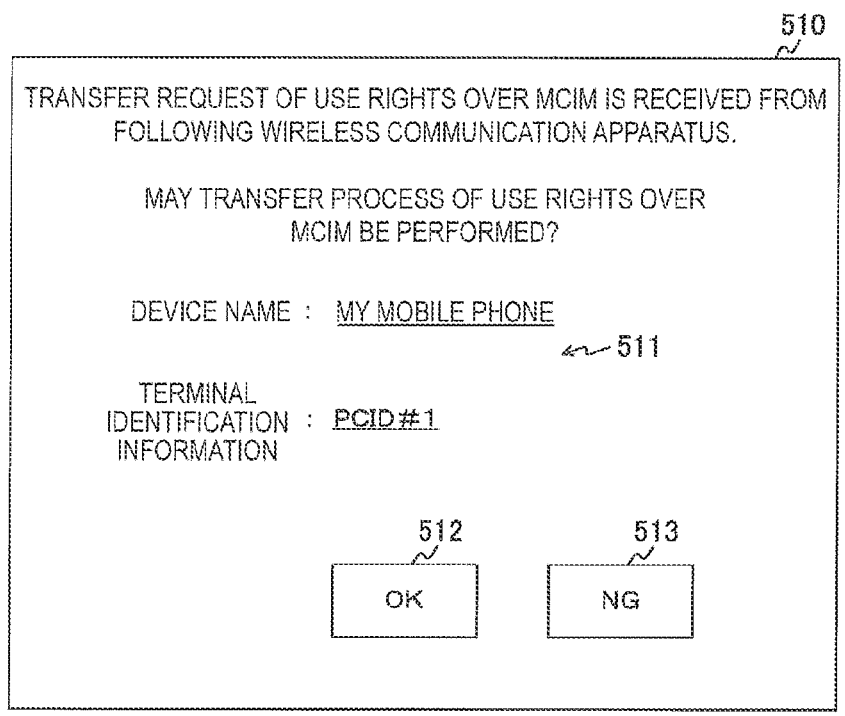
FIG. 8 is a diagram showing an exemplary display screen (transfer confirmation screen 510) displayed in the display unit 370 of a second wireless communication apparatus 130, according to the first exemplary embodiment.

FIG. 8 is a diagram showing an exemplary display screen (transfer confirmation screen 510) displayed in the display unit 370 of the second wireless communication apparatus 130 according to the first embodiment of the present technology.

The transfer confirmation screen 510 is a display screen causing the user to confirm the transfer of use rights over MCIM. The transfer confirmation screen 510 is a display screen for the user to confirm the transfer of use rights over MCIM by displaying information to identify the wireless communication apparatus of the transfer source or transfer destination of use rights over MCIM. More specifically, the transfer confirmation screen 510 is provided with a remote device display field 511, an OK button 512, and an NG button 513.

In the remote device display field 511, information about the wireless communication apparatus of the transfer source or transfer destination of use rights over MCIM. As information about the wireless communication apparatus of the transfer source or transfer destination, for example, the device name and terminal identification information are displayed.

In this example, the device name and terminal identification information are displayed as information about the wireless communication apparatus of the transfer source or transfer destination to notify the user of the wireless communication apparatus. Incidentally, the transfer confirmation screen 510 may be caused to display other information (for example, an image (device icon) in which a wireless communication apparatus is depicted as a graphic) included in a transfer confirmation request (shown, for example, in FIG. 10) transmitted from the control unit 210 of the RO 200. In addition, the transfer confirmation screen may be caused to display other information (for example, a device icon) about the remote wireless communication apparatus based on, for example, registration information (for example, device icon information) held by the second wireless communication apparatus 130 together with the device name and terminal identification information.

The OK button 512 is a button pressed after the user confirms that a transfer process of use rights over MCIM is performed to/from the wireless communication apparatus displayed in the remote device display field 511.

The NG button 513 is a button pressed when the user does not approve of a transfer process of use rights over MCIM being performed to/from the wireless communication apparatus displayed in the remote device display field 511.

This example shows an example of determining that the user confirms that a transfer process of MCIM user rights is performed if the OK button 512 is pressed on the transfer confirmation screen 510. However, in addition to pressing of the OK button 512, for example, a determination that the user confirms that a transfer process of MCIM user rights is performed may be made on condition that a predetermined password (for example, a group password) is input.

[Display Example of the Transfer Result Notification Screen]

FIG. 9 is a diagram showing exemplary display screens (transfer result notification screens 520, 530) displayed in the display unit 370 of the wireless communication apparatus according to the first embodiment of the present technology. The transfer result notification screens 520, 530 are display screens displayed in the wireless communication apparatuses of the transfer destination and the transfer source after the transfer process of use rights over MCIM is performed respectively.

In FIG. 9A, the transfer result notification screen 520 displayed in the wireless communication apparatus of the transfer source (for example, the first wireless communication apparatus 300) after the transfer process of use rights over MCIM is performed is shown. In the transfer result notification screen 520, a notification that the transfer process of use rights over MCIM has been performed and a notification that data held by the wireless communication apparatus of the transfer destination has been synchronized with data of the transfer source are displayed and also a transfer destination device display area 521 and a confirm button 522 are displayed.

In the transfer destination device display area 521, information about the wireless communication apparatus of the transfer destination to which use rights over MCIM have been transferred. As information about the wireless communication apparatus of the transfer destination, for example, the device name and terminal identification information are displayed.

The confirm button 522 is a button pressed when a transition to another display screen (for example, an initial screen) occurs after content of the transfer result notification screen 520 is confirmed.

In FIG. 9B, the transfer result notification screen 530 displayed in the wireless communication apparatus of the transfer destination (for example, the second wireless communication apparatus 130) after the transfer process of use rights over MCIM is performed is shown. In the transfer result notification screen 530, a notification that the use rights over MCIM have been transferred and a notification that data held by the wireless communication apparatus of has been synchronized with data of the transfer source are displayed and also a transfer source device display area 531 and a confirm button 532 are displayed.

The transfer source device display area 531 is an area where information about the wireless communication apparatus of the transfer source when use rights over MCIM have been transferred. As information about the wireless communication apparatus of the transfer source, for example, the device name and terminal identification information are displayed.

The confirm button 532 is a button pressed when a transition to another display screen (for example, an initial screen) occurs after content of the transfer result notification screen 530 is confirmed.

FIGS. 7 to 9 show only display screen examples displayed in the first wireless communication apparatus 300 and the second wireless communication apparatus 130, but display screens displayed in other wireless communication apparatuses are assumed to be substantially the same.

[Communication Example when a Data Synchronization Process is Performed During a Transfer Process of Use Rights Over MCIM]

Figure 10:
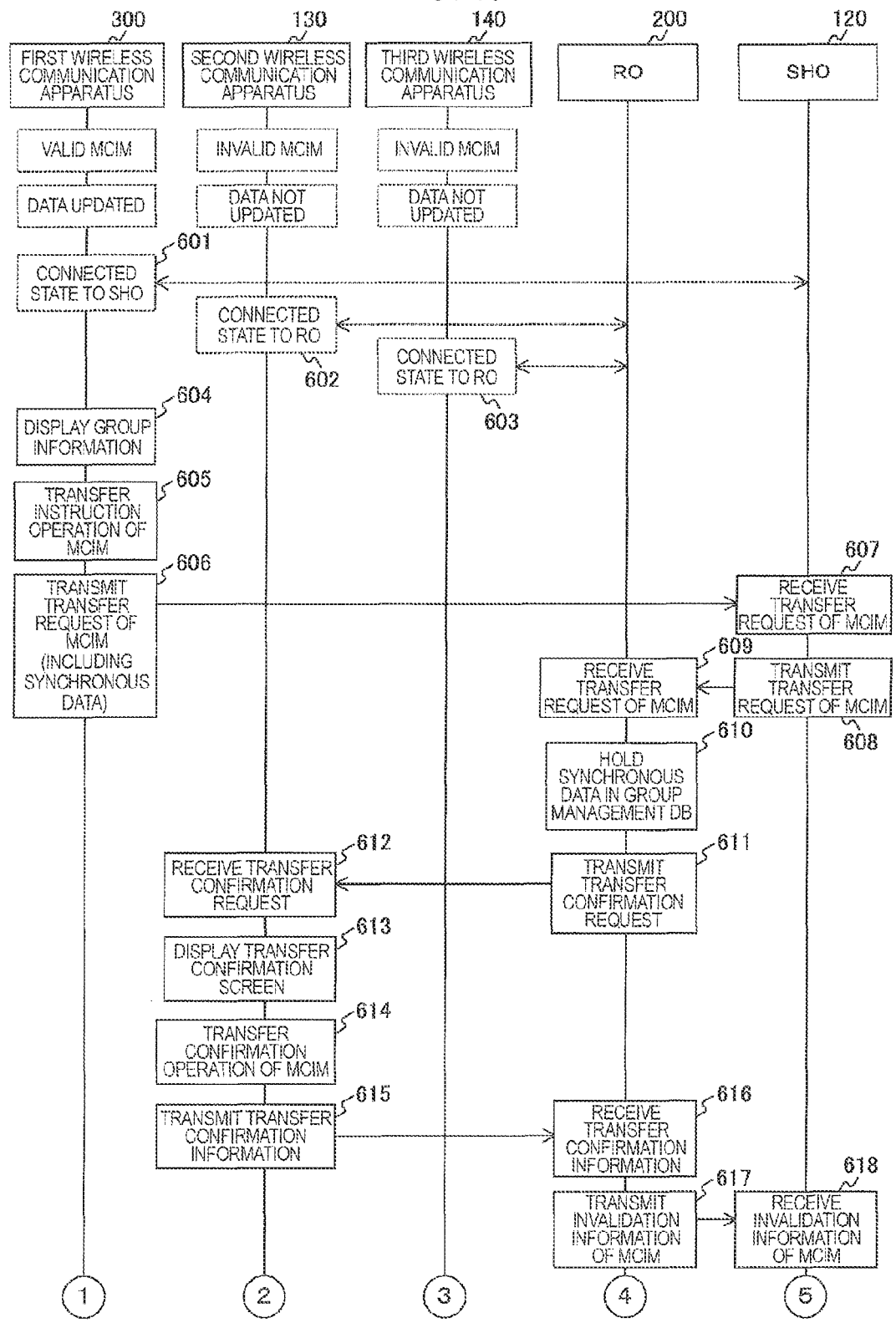
FIG. 10 is a sequence chart of an exemplary communication process performed by various apparatuses of the communication system 100, according to the first exemplary embodiment.
Figure 11:
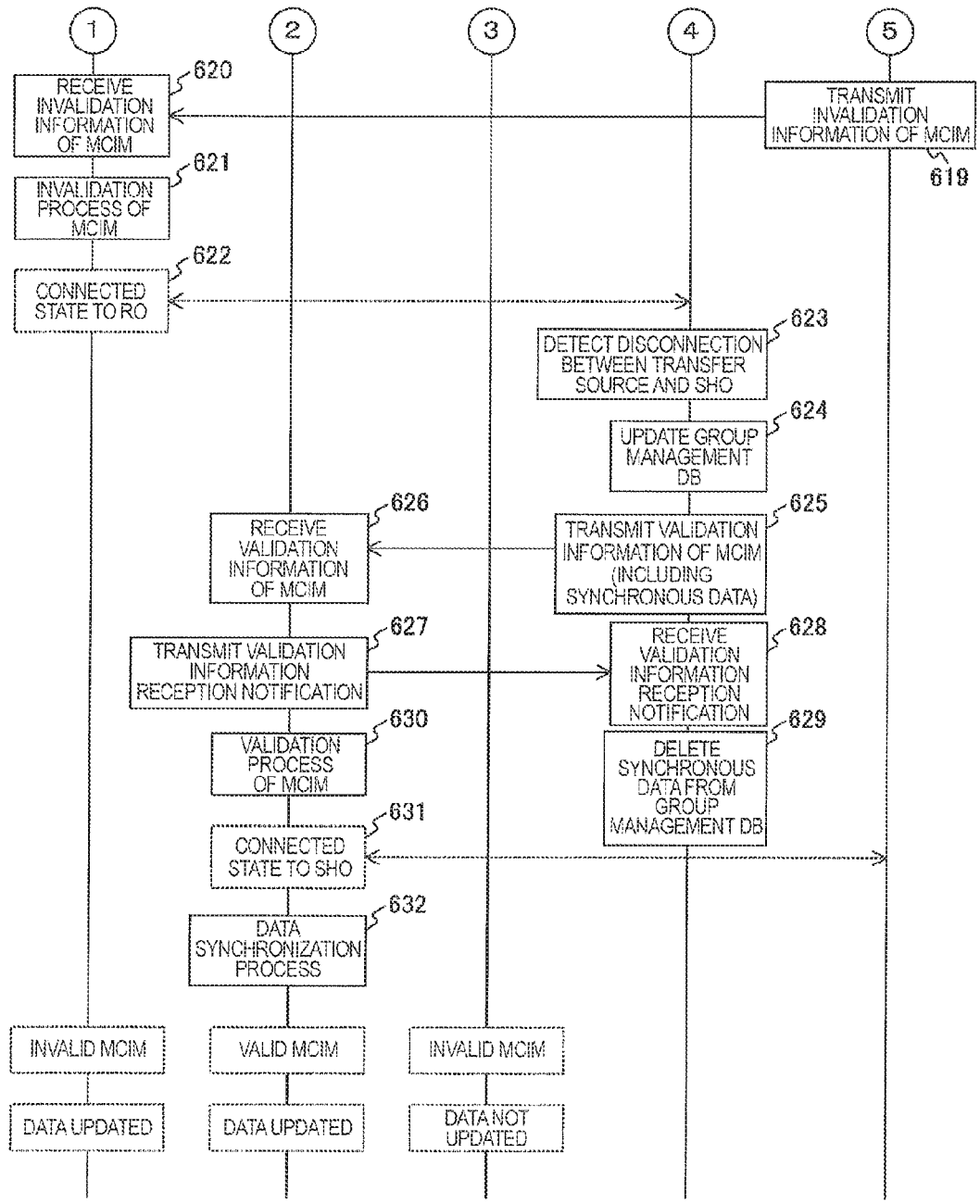
FIG. 11 is a sequence chart of an exemplary communication process performed by various apparatuses of the communication system 100, according to the first exemplary embodiment.

FIGS. 10 and 11 are a sequence chart showing an exemplary communication process between each apparatus constituting the communication system 100 according to the first embodiment of the present technology.

In FIGS. 10 and 11, it is assumed that the first wireless communication apparatus 300 holds use rights over MCIM when the group AB is constituted of the first wireless communication apparatus 300, the second wireless communication apparatus 130, and the third wireless communication apparatus 140. FIGS. 10 and 11 show a communication process example when use rights over MCIIVI are transferred from the first wireless communication apparatus 300 to the second wireless communication apparatus 130 by operating the first wireless communication apparatus 300. It is assumed in FIGS. 10 and 11 that the first wireless communication apparatus 300 is in a connected state (601) to the SHO 120 and the second wireless communication apparatus 130 and the third wireless communication apparatus 140 are in connected states (602, 603) to the RO 200.

First, the display unit 370 of the first wireless communication apparatus 300 is caused to display the display screen to perform an operation to transfer use rights over MCIM (transfer instruction operation of MCIM) by a user operation (604). For example, the group list display screen 500 shown in FIG. 7 is displayed in the display unit 370 of the first wireless communication apparatus 300.

The control unit 330 of the first wireless communication apparatus 300 can acquire, for example, group information from the group management database 220 of the RO 200 via the SHO 120 periodically or non-periodically and store the acquired group information in the memory 340. The control unit 330 can, as described above, cause the display unit 370 to display the group list display screen 500 shown in FIG. 7 based on group information stored in the memory 340. The control unit 330 may also acquire group information from the RO 200 via the SHO 120 each time a user operation for the display of the group list display screen 500 is accepted. In this case, the control unit 330 can cause the display unit 370 to display the group list display screen 500 based on the acquired group information.

When the group list display screen 500 shown in FIG. 7 is displayed in the display unit 370 as described above (604), a "✓" mark is attached to the check box (the transfer destination selection area 501) of the transfer destination to which use rights over MCIM are transferred (605). In this example, a data synchronization process is performed between the transfer source and transfer destination of use rights over MCIM and so a "−q" mark is attached also to the presence/absence selection area 502 of data synchronization (605).

As shown, for example, FIG. 7, the second wireless communication apparatus 130 is set as the transfer destination and so a "−q" mark is attached to the check box (the transfer destination selection area 501) thereof. In addition, a data synchronization process is performed between the transfer source (the first wireless communication apparatus 300) and the transfer destination (the second wireless communication apparatus 130) and so a "q" mark is attached to the check box (the presence/absence selection area 502 of data synchronization) thereof. After "−q" marks are attached to the check boxes (the transfer destination selection area 501, the presence/absence selection area 502 of data synchronization) as described above, the confirm button 506 is pressed (605). When a transfer instruction operation of MCIM is received by the first wireless communication apparatus 300 (605), a transfer request of MCIM is transmitted from the first wireless communication apparatus 300 to the RO 200 (606 to 609). In this case, the first wireless communication apparatus 300 and the SHO 120 are in a connected state (601) and thus, the transfer request of MCIM is transmitted from the first wireless communication apparatus 300 to the RO 200 via the SHO 120 (606 to 609).

The transfer request of MCIM includes terminal identification information (PCID#1, PCID#2) of the transfer source and transfer destination and synchronous data. As the terminal identification information (PCID#1) of the transfer source (the first wireless communication apparatus 300), for example, terminal identification information (for example, the terminal identification information 225 shown in FIG. 4) stored in the memory 340 can be used. As the terminal identification information (PCID#2) of the transfer destination (the second wireless communication apparatus 130), for example, terminal identification information (for example, the terminal identification information 225 shown in FIG. 4) included in group information can be used.

The synchronous data (predetermined data) is data (for example, each piece of data of the address book 303 shown in FIG. 2) used for a data synchronization process. All data intended for a data synchronization process may be included in a transfer request of MCIM as synchronous data or a portion (for example, differential data) of data intended for a data synchronization process may be included in a transfer request of MCIM as synchronous data. The differential data is, for example, data (update data) as a difference from the data used for the data synchronization process immediately before. A case when, for example, the data used for the data synchronization process immediately before is the address book 302 shown in FIG. 2 and the data is changed to the address book 303 shown in FIG. 2 by the update of the address book is assumed. The differential data in this case is data (data shown in the frame 304) added by the update. Incidentally, the group ID and password may be included in a transfer request of MCIM so as to be used for an authentication process by the RO 200.

When the RO 200 receives the transfer request of MCIM (609), the control unit 210 of the RO 200 extracts the group to which the wireless communication apparatus that has transmitted the transfer request of MCIM belongs based on terminal identification information of the transfer source included in the received transfer request of MCIM. That is, terminal identification information matching the terminal identification information of the transfer source included in the received transfer request of MCIM is extracted from the group management database 220 and the group related to the extracted terminal identification information is extracted. When, for example, a transfer request of MCIM is transmitted from the first wireless communication apparatus 300, the "group AB (shown in FIG. 4)" is extracted as a group to which the first wireless communication apparatus 300 belongs.

Then, the control unit 210 of the RO 200 causes the group management database 220 to hold synchronous data included in the received transfer request of MCIM in association with the extracted group (610). For example, as shown in FIG. 4, synchronous data (YUDAI and so on) included in the received transfer request of MCIM is recorded in the synchronous data 227 related to the group AB of the group management database 220 (610).

The control unit 210 of the RO 200 checks whether, for example, the wireless communication apparatus identified based on terminal identification information of the transfer source included in the received transfer request of MCIM holds use rights over MCIM by using the group management database 220. In addition, the control unit 210 acquires information (the device name, terminal identification information and the like) about the transfer source (the first wireless communication apparatus 300) the transfer destination (the second wireless communication apparatus 130) is caused to display from the group management database 220.

Subsequently, the control unit 210 of the RO 200 transmits a transfer confirmation request including various kinds of acquired information about the transfer source (the first wireless communication apparatus 300) to the wireless communication apparatus identified based on terminal identification information of the transfer destination included in the received transfer request of MCIM (611, 612).

When the second wireless communication apparatus 130 receives the transfer confirmation request (612), the control unit 330 of the second wireless communication apparatus 130 causes the display unit 370 of the second wireless communication apparatus 130 to display a transfer confirmation screen to cause the user to confirm the transfer of use rights over MCIM (613). For example, the transfer confirmation screen 510 shown in FIG. 8 is displayed in the display unit 370.

It is assumed here that the OK button 512 is pressed on the transfer confirmation screen 510 shown in FIG. 8 (614). If the OK button 512 is pressed after the transfer of use rights over MCIM is confirmed as described above (614), transfer confirmation information that permits the transfer of use rights over MCIM is transmitted from the second wireless communication apparatus 130 to the RO 200 (615, 616). If the NG button 513 is pressed (614), transfer confirmation information disapproving the transfer of use rights over MCIM is transmitted from the second wireless communication apparatus 130 to the RO 200 (615, 616). If the NG button 513 is pressed as described above, the subsequent transfer process of use rights over MCIM is not performed. In addition, a notification of disapproval is displayed in the transfer source (the first wireless communication apparatus 300).

Here, an example in which the transfer of use rights over MCIM is permitted by a pressing operation of the OK button 512 in the transfer confirmation screen 510 is shown. However, for example, after the pressing operation of the OK button 512, the transfer of use rights over MCIM may be permitted if, after an input operation of a password or the like is prompted, the input is correct.

Subsequently, when the transfer confirmation information is received (616), the control unit 210 of the RO 200 transmits invalidation information of MCIM to invalidate the MCIM of the wireless communication apparatus that has transmitted the transfer request of MCIM to the first wireless communication apparatus 300 (617 to 620). The invalidation information of MCIM is information to invalidate the MCIM when the wireless communication apparatus holds use rights over MCIM. The invalidation information of MCIM may include a confirmation result notification to notify the transfer source (operation source of the transfer request) of a result of the transfer confirmation by the transfer destination.

When the first wireless communication apparatus 300 receives the invalidation information of MCIM (620), the control unit 330 of the first wireless communication apparatus 300 performs an invalidation process of the MCIM stored in an MCIM information storage unit 350 (621). Accordingly, the MCIM held by the first wireless communication apparatus 300 is invalidated and the first wireless communication apparatus 300 can no longer establish connection with the SHO 120 based on the MCIM. Thus, the first wireless communication apparatus 300 is in a connected state connected to the RO 200 by a limited connection based on PCID (622).

When the invalidation process of MCIM in the transfer source (the first wireless communication apparatus 300) is performed (621) and the connection between the transfer source and the SHO 120 is cut, the disconnection is detected by the control unit 210 of the RO 200 (623). For example, the control unit 210 can detect the disconnection by information about the disconnection being transmitted from the transfer source (the first wireless communication apparatus 300) to the RO 200 after the invalidation process of MCIM is performed (623). Alternatively, the control unit 210 can detect the disconnection by a state (connected state) in which the transfer source (the first wireless communication apparatus 300) is connected to the RO 200 by a limited connection based on PCID being detected by the control unit 210 (623).

When the control unit 210 detects the disconnection between the transfer source and the SHO 120 as described above (623), the control unit 210 updates content of the group management database 220 (624). For example, in the valid/invalid information 226 shown in FIG. 4, the first wireless communication apparatus 300 (the terminal identification information 225 "PCID#1") is changed from "valid" to "invalid". On the other hand, the second wireless communication apparatus 130 (the terminal identification information 225 "PCID#2") is changed from "invalid" to "valid".

Also when the control unit 210 of the RO 200 detects the disconnection between the transfer source and the SHO 120 (623), the control unit 210 transmits validation information of MCIM to the second wireless communication apparatus 130 (625, 626). The validation information of MCIM is information (setting information) to set use rights over MCIM to the wireless communication apparatus. The validation information of MCIM includes synchronous data (data stored in the synchronous data 227 related to the group AB) held in the group management database 220. Because the second wireless communication apparatus 130 and the RO 200 are in a connected state (602), the validation information of MCIM is directly transmitted from the RO 200 to the second wireless communication apparatus 130 (625, 626).

When the validation information of MCIM is received by the second wireless communication apparatus 130 (626), the control unit 330 of the second wireless communication apparatus 130 transmits a validation information reception notification to notify that the validation information of MCIM has been received to the RO 200 (627, 628).

When the RO 200 receives the validation information reception notification (628), the control unit 210 of the RO 200 deletes the synchronous data (synchronous data transmitted by being included in the validation information of MCIM) transmitted to the second wireless communication apparatus 130 from the group management database 220 (629).

Also when the second wireless communication apparatus 130 receives the validation information of MCIM (626), the control unit 330 of the second wireless communication apparatus 130 performs a validation process of the MCIM stored in the MCIM information storage unit 350 (630). Use rights over MCIM are thereby set to the second wireless communication apparatus 130 and thus, the second wireless communication apparatus 130 can establish connection with the SHO 120 based on the MCIM. Therefore, the second wireless communication apparatus 130 is in a connected state connected to the SHO 120 by a connection based on the MCIM (631).

The control unit 330 of the second wireless communication apparatus 130 performs a data synchronization process to synchronize data in the second wireless communication apparatus 130 with data in the first wireless communication apparatus 300 (632). In the data synchronization process, for example, a data synchronization process to synchronize update data generated by an update in the first wireless communication apparatus 300 with the second wireless communication apparatus 130 is performed.

For example, a case when all data intended for a data synchronization process is transmitted as synchronous data is assumed. In this case, the control unit 330 of the second wireless communication apparatus 130 compares data (data intended for the data synchronization process) stored in the memory 340 of the second wireless communication apparatus 130 with the received synchronous data. Then, based on the comparison result, the control unit 330 of the second wireless communication apparatus 130 extracts update data (differential data) generated by the update in the first wireless communication apparatus 300. For example, a newly entered contact address in the address book (for example, the contact address in the frame 304 shown in FIG. 2) is extracted as update data. Based on the differential data extracted as described above, the data synchronization process is performed by data (for example, the address book) intended for the data synchronization process being updated by the control unit 330 of the second wireless communication apparatus 130 (632).

For example, a case when a portion (for example, differential data only) of data intended for the data synchronization process is transmitted as synchronous data is assumed. In this case, the control unit 330 of the second wireless communication apparatus 130 performs the data synchronization process by updating (for example, additionally entering) data (for example, the address book) intended for the data synchronization process based on the received synchronous data (differential data) (632).

In this example, an example in which use rights over MCIM are transferred by validating/invalidating the MCIM is shown, but use rights over MCIM may be transferred by transferring the MCIM itself. In this case, when invalidation information of MCIM is transmitted to the first wireless communication apparatus 300, the MCIM held by the first wireless communication apparatus 300 is invalidated (deleted). On the other hand, when validation information (including setting information to set the MCIM) of MCIM is transmitted to the second wireless communication apparatus 130, the valid MCIM is recorded in the MCIM information storage unit 350 of the second wireless communication apparatus 130 based on the setting information. Accordingly, use rights over MCIM are set to the second wireless communication apparatus 130.

FIGS. 10 and 11 show an example in which a transfer request of MCIM is made by using the first wireless communication apparatus 300 holding use rights over MCIM is shown, but such a request may also be made from a wireless communication apparatus holding no use rights over MCIM. Such an example is shown in FIGS. 12 to 16.

In FIGS. 10 and 11, an example in which the user manually performs a confirmation process of the transfer of use rights over MCIM from the second wireless communication apparatus 130 is shown (614). However, when the transfer confirmation request is received (612), for example, the second wireless communication apparatus 130 may automatically transmit transfer confirmation information (615). Alternatively, for example, the RO 200 may automatically perform a transfer process of MCIM after confirming content of the group management database 220 without transmitting a transfer confirmation request to the second wireless communication apparatus 130. When each process is performed automatically as described above, it is assumed that, for example, the user makes such settings in advance. By performing each process automatically as described above, even if, for example, the wireless communication apparatus used for operation and the wireless communication apparatus intended for a data synchronization process are relatively apart, data can be shared relatively easily among a plurality of wireless communication apparatuses sharing the MCIM.

[Communication Example when a Transfer Request is Made from the Transfer Destination of Use Rights Over MCIM]

Figure 12:
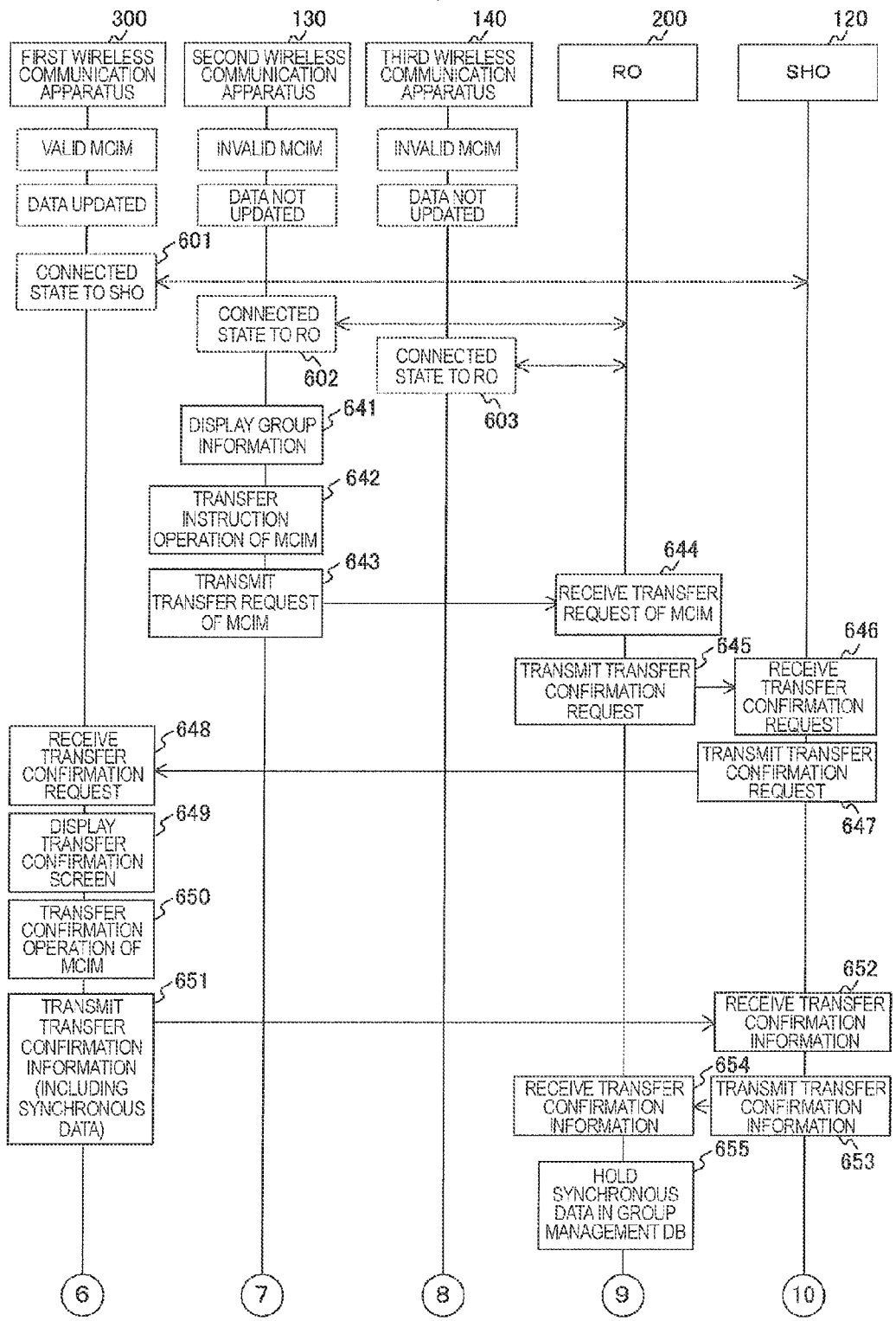
FIG. 12 is a sequence chart of an exemplary communication process performed by various apparatuses of the communication system 100, according to the first exemplary embodiment.
Figure 13:
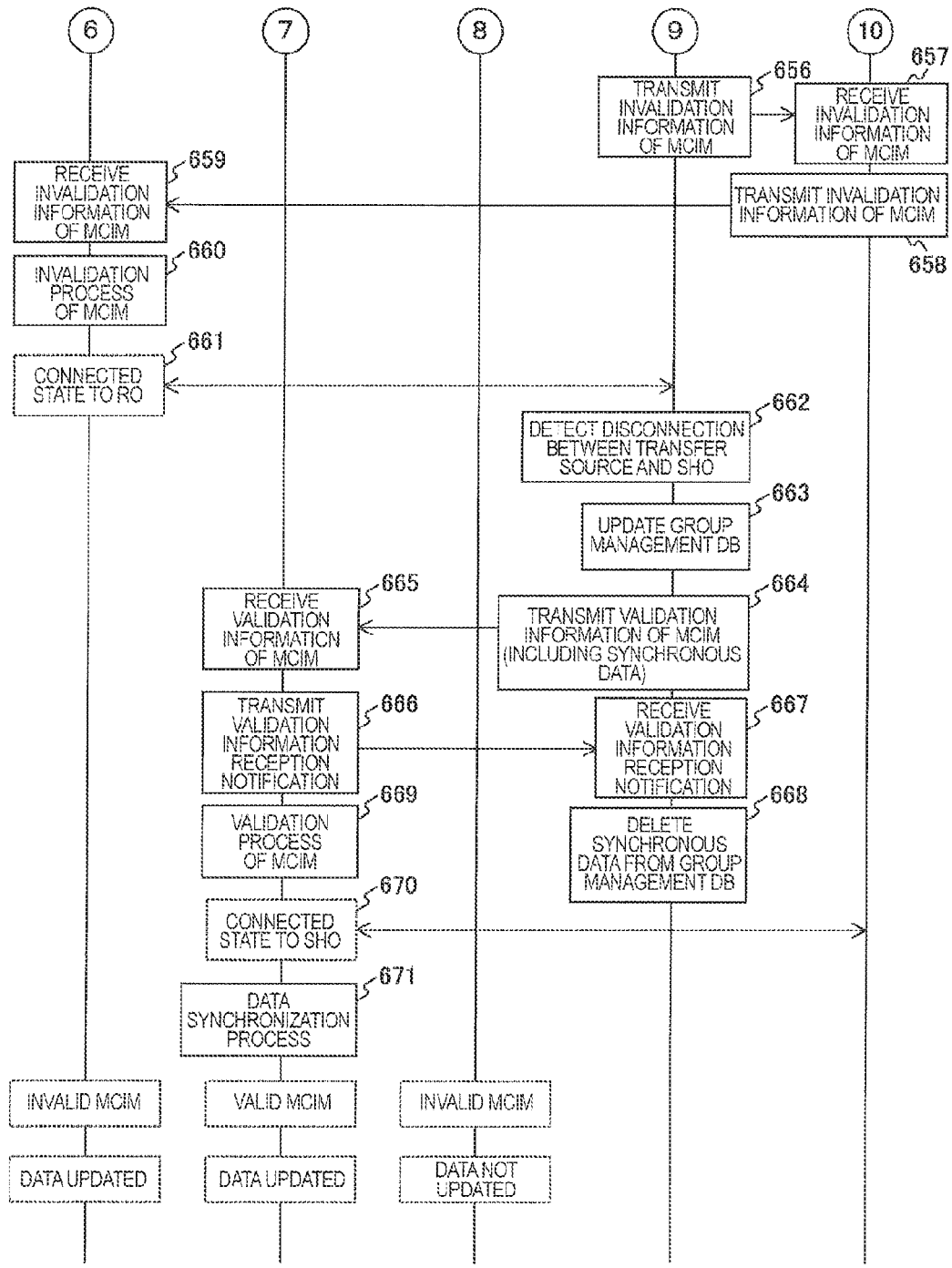
FIG. 13 is a sequence chart of an exemplary communication process performed by various apparatuses of the communication system 100, according to the first exemplary embodiment.

FIGS. 12 and 13 are a sequence chart showing an exemplary communication process between each apparatus constituting the communication system 100 according to the first embodiment of the present technology. The sequence chart shown in FIGS. 12 and 13 is a modification of the sequence chart shown in FIGS. 10 and 11 and thus, a portion of the description common to that of FIGS. 10 and 11 is omitted. In FIGS. 12 and 13, an example in which a transfer request is made by using the second wireless communication apparatus 130 holding no use rights over MCIM will be described.

Each process (641 to 644) shown in FIG. 12 corresponds to each process (604 to 609) shown in FIG. 10. However, as described above, the second wireless communication apparatus 130 is in a connected state (602) to the RO 200. Thus, the present example is different in that information exchange between the second wireless communication apparatus 130 and the RO 200 is not made by going through the SHO 150 and is made directly between the second wireless communication apparatus 130 and the RO 200. The present example is also different in that a transfer request of MCIM transmitted from the second wireless communication apparatus 130 includes no synchronous data.

Each process (645 to 654) shown in FIG. 12 corresponds to each process (611 to 616) shown in FIG. 10. However, as described above, the first wireless communication apparatus 300 is in a connected state (601) to the SHO 120. Thus, the present example is different in that information exchange between the first wireless communication apparatus 300 and the RO 200 is made via the SHO 150. The present example is also different in that transfer confirmation information transmitted from the first wireless communication apparatus 300 includes synchronous data.

That is, when, as shown in FIGS. 10 and 11, a transfer request is made by using the first wireless communication apparatus 300 holding use rights over MCIM, the transfer request of MCIM is transmitted to the RO 200 with synchronous data included in the transfer request of MCIM (606 to 609). When a transfer request is made by using the second wireless communication apparatus 130 holding no use rights over MCIM, by contrast, transfer confirmation information is transmitted to the RO 200 with synchronous data included in the transfer confirmation information (651 to 654).

When the RO 200 receives the transfer confirmation information (654), the control unit 210 extracts the group to which the wireless communication apparatus that has transmitted the transfer request of MCIM belongs based on terminal identification information of the transfer source included in the received transfer confirmation information. Then, the control unit 210 causes the group management database 220 to hold synchronous data included in the received transfer confirmation information in association with the extracted group (655).

Each process (656 to 671) shown in FIG. 13 corresponds to each process (617 to 632) shown in FIGS. 10 and 11.

[Communication Example when a Transfer Request is Made from a Wireless Communication Apparatus Other and the Transfer Source and the Transfer Destination of Use Rights Over MCIM]

Figure 14:
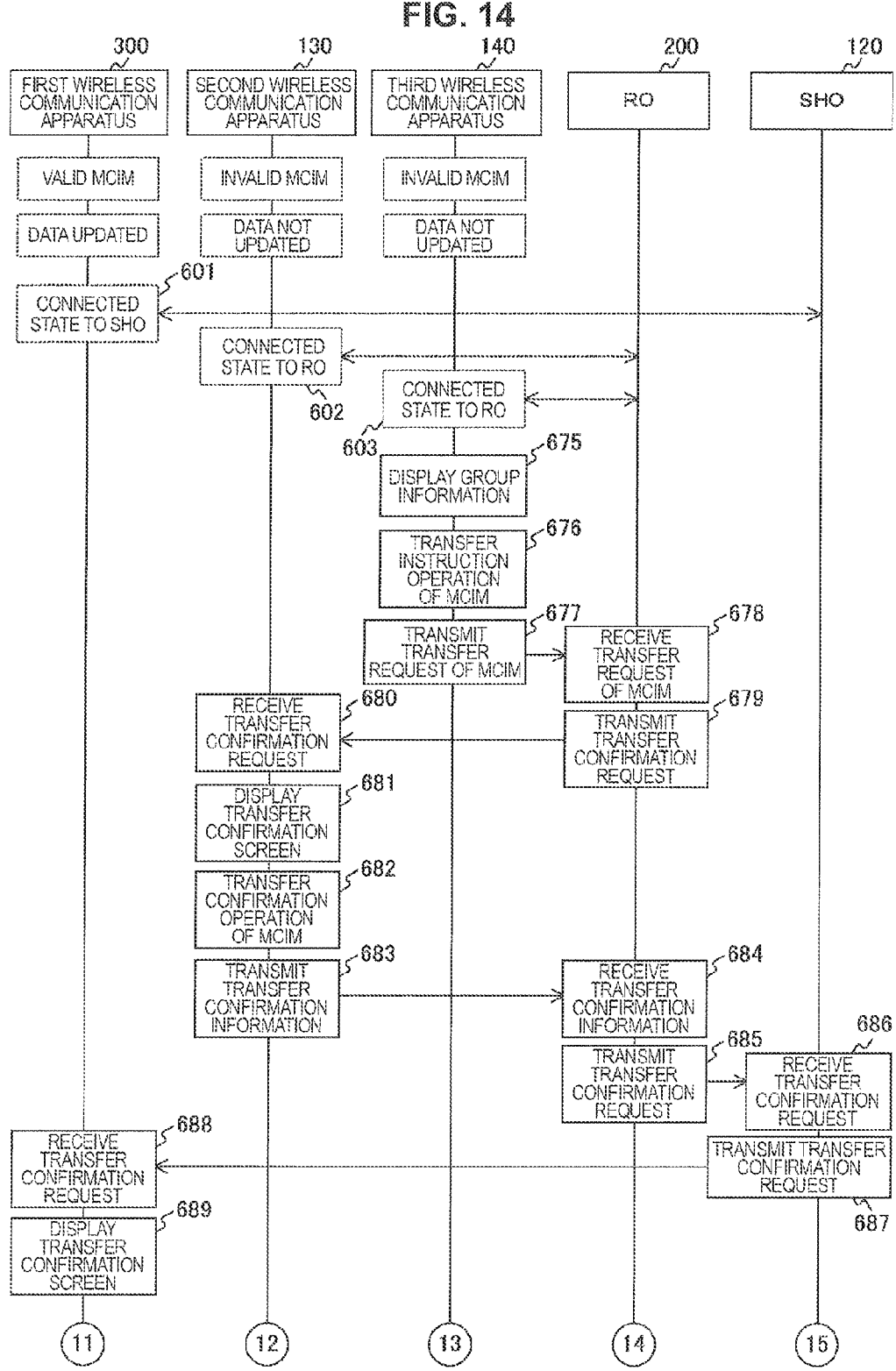
FIG. 14 is a sequence chart of an exemplary communication process performed by various apparatuses of the communication system 100, according to the first exemplary embodiment.
Figure 15:
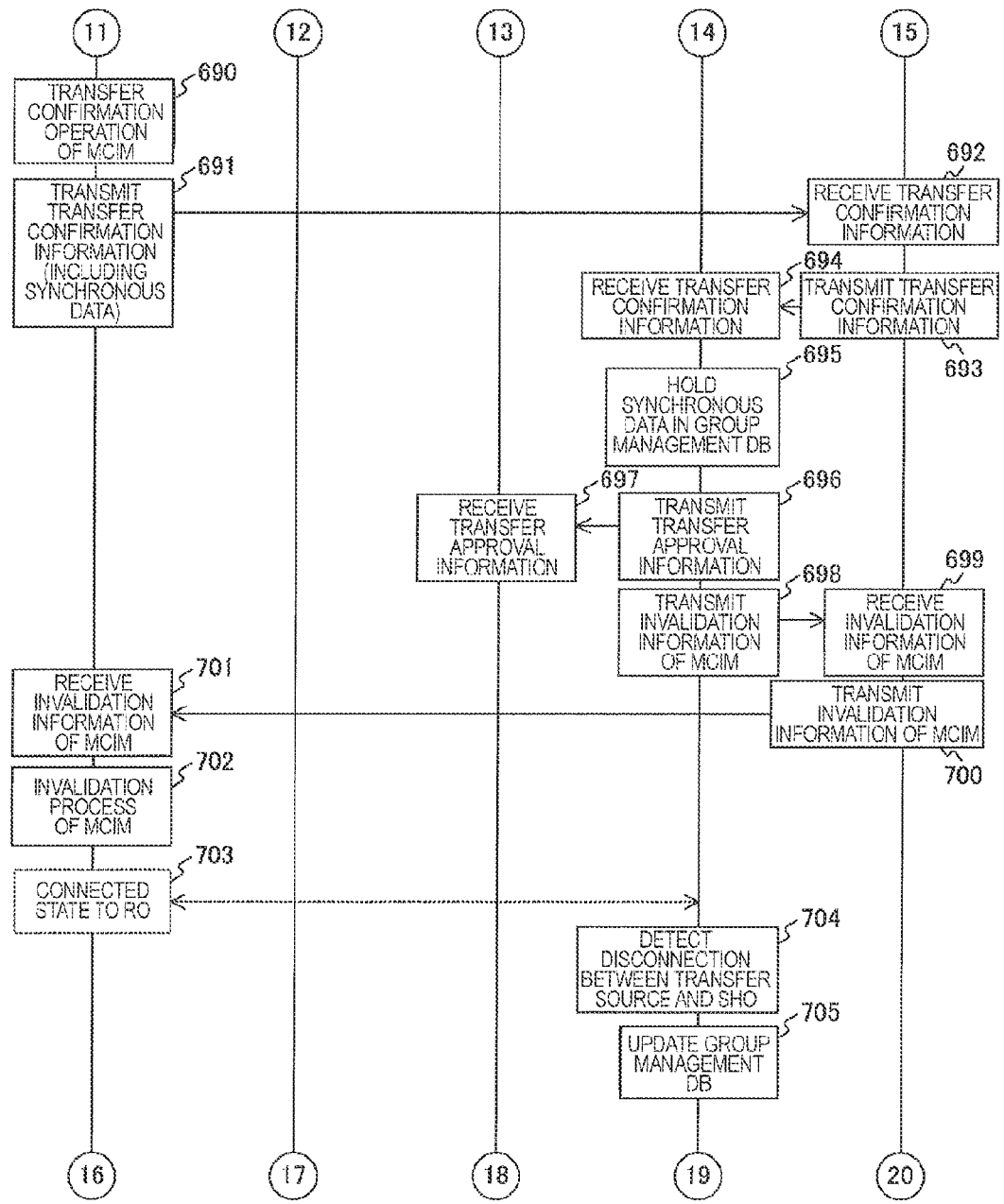
FIG. 15 is a sequence chart of an exemplary communication process performed by various apparatuses of the communication system 100, according to the first exemplary embodiment.
Figure 16:
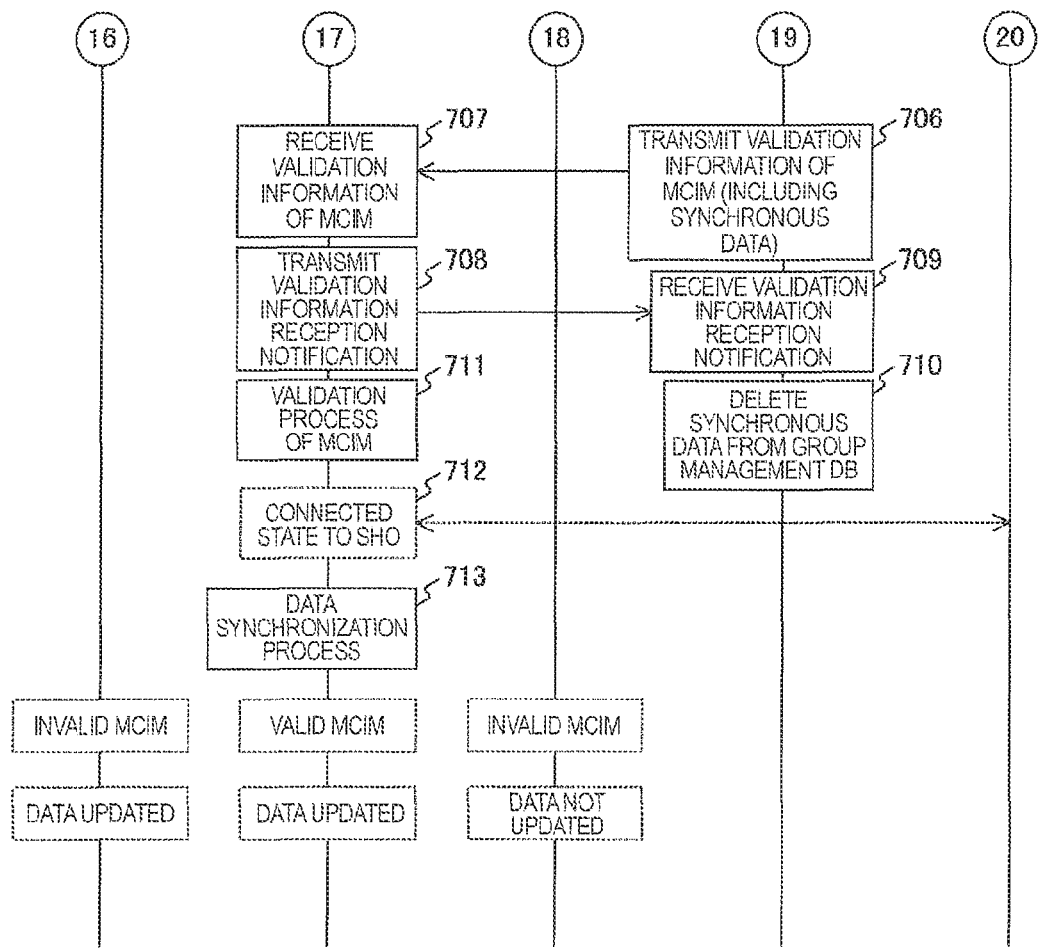
FIG. 16 is a sequence chart of an exemplary communication process performed by various apparatuses of the communication system 100, according to the first exemplary embodiment.

FIGS. 14 and 16 are a sequence chart showing an exemplary communication process between each apparatus constituting the communication system 100 according to the first embodiment of the present technology. The sequence chart shown in FIGS. 14 to 16 is a modification of the sequence chart shown in FIGS. 12 and 13 and thus, a portion of the description common to that of FIGS. 12 and 13 is omitted. In FIGS. 14 to 16, an example in which a transfer request is made by using the third wireless communication apparatus 140 other than the transfer source and transfer destination of use rights over MCIM will be described.

Each process (675 to 678) shown in FIG. 14 corresponds to each process (641 to 644) shown in FIG. 12.

Each process (679 to 684, 685 to 694) shown in FIGS. 14 and 15 corresponds to each process (645 to 654) shown in FIG. 12. A transfer request is made by using the third wireless communication apparatus 140 other than the transfer source and transfer destination of use rights over MCIM and thus, the present example is different in that a transfer confirmation request and transfer confirmation information are exchanged between both of the transfer source and transfer destination and the RO 200. In this case, synchronous data is included only in transfer confirmation information transmitted from the first wireless communication apparatus 300 (691 to 694).

When the RO 200 receives the transfer confirmation information (694), the control unit 210 causes the group management database 220 to hold synchronous data included in the received transfer confirmation information in association with the extracted group (695). Subsequently, the control unit 210 transmits transfer approval information indicating that approval of the transfer of use rights over MCIM has been obtained from both of the transfer source and transfer destination to the third wireless communication apparatus 140 that has transmitted the transfer request of MCIM (696, 697). When the transfer approval information is received (697), the third wireless communication apparatus 140 may cause the display unit 370 to display that the transfer approval information has been received.

If transfer confirmation information disapproving the transfer of use rights over MCIM is received from at least one of the transfer source and transfer destination of use rights over MCIM, the subsequent transfer process of use rights over MCIM is not performed. In addition, a notification of disapproval is displayed in the transfer source (the third wireless communication apparatus 140).

Each process (698 to 713) shown in FIGS. 15 and 16 corresponds to each process (656 to 671) shown in FIG. 13.

Thus, in FIGS. 14 to 16, an example in which after a transfer confirmation request is transmitted to the second wireless communication apparatus 130, a transfer confirmation request is transmitted to the first wireless communication apparatus 300 is shown. As shown in FIGS. 14 to 16, it is more efficient to first transmit a transfer confirmation request to the second wireless communication apparatus 130 holding no use rights over MCIM. For example, a case in which a transfer confirmation request is first transmitted to the first wireless communication apparatus 300 is assumed. In this case, when transfer confirmation information permitting the transfer of use rights over MCIM is transmitted from the first wireless communication apparatus 300 holding use rights over MCIM to the RO 200, an invalidation process of the MCIM of the first wireless communication apparatus 300 is performed. If, after the invalidation process, for example, transfer confirmation information disapproving the transfer of use rights over MCIM is transmitted from the second wireless communication apparatus 130 to the RO 200, approval is not obtained from both of the transfer source and transfer destination of use rights over MCIM. In this case, the transfer process of use rights over MCIM cannot be performed. Thus, a validation process of the MCIM needs to be performed to validate the MCIM for the first wireless communication apparatus 300 whose MCIM has been invalidated. Therefore, it is more efficient to transmit a transfer confirmation request first to the second wireless communication apparatus 130.

However, after a transfer confirmation request being transmitted to the first wireless communication apparatus 300, a transfer confirmation request may be transmitted to the second wireless communication apparatus 130. Alternatively, a transfer confirmation request may be transmitted to simultaneously to the first wireless communication apparatus 300 and the second wireless communication apparatus 130.

Therefore, according to the first embodiment of the present technology, when use rights over MCIM (connection rights) are transferred among a plurality of wireless communication apparatuses, a data synchronization process can be performed between the transfer source and the transfer destination. That is, when a transfer process of use rights over MCIM is performed, transmission information concerning the transfer process (transfer request of MCIM, transfer confirmation information) can be transmitted from the transfer source to the RO with synchronous data included in the transmission information. In addition, MCIM validation information concerning the transfer process can be transmitted from the RO to the transfer destination with synchronous data included in the MCIM validation information. Therefore, even if, for example, at least one wireless communication apparatus of the transfer source and transfer destination does not hold use rights over MCIM, a data synchronization process between the transfer source and transfer destination can easily be performed. Even if, as shown in FIG. 1B, the first wireless communication apparatus 300 and the second wireless communication apparatus 130 are relatively apart, a data synchronization process can easily be performed when, for example, use rights over MCIM are transferred. That is, data used among a plurality of wireless communication apparatuses can easily be shared.

It is assumed that when, for example, the user holding a plurality of wireless communication apparatuses uses data (for example, an address book) intended for a data synchronization process, the data is frequently used by a wireless communication apparatus holding a valid MCIM. Therefore, a data synchronization process is performed between the transfer source and transfer destination simultaneously with the transfer process of use rights over MCIM (connection rights). Accordingly, the wireless communication apparatus assumed to be mainly used by the user (that is, the wireless communication apparatus holding a valid MCIM) can use the latest data (for example, an address book).

Synchronous data held by the RO 200 can be deleted after a fixed time passes (that is, the timing to validate the MCIM of the second wireless communication apparatus 130). Thus, there is no need to hold the synchronous data in the RO 200 for a long time.

[Operation Example of the Communication System]

Next, the operation of the communication system 100 according to the first embodiment of the present technology will be described with reference to drawings.

[Operation Example of the Wireless Communication Apparatus (Transfer Source) (Example in which a Transfer Operation is Performed in the Transfer Source)]

Figure 17:
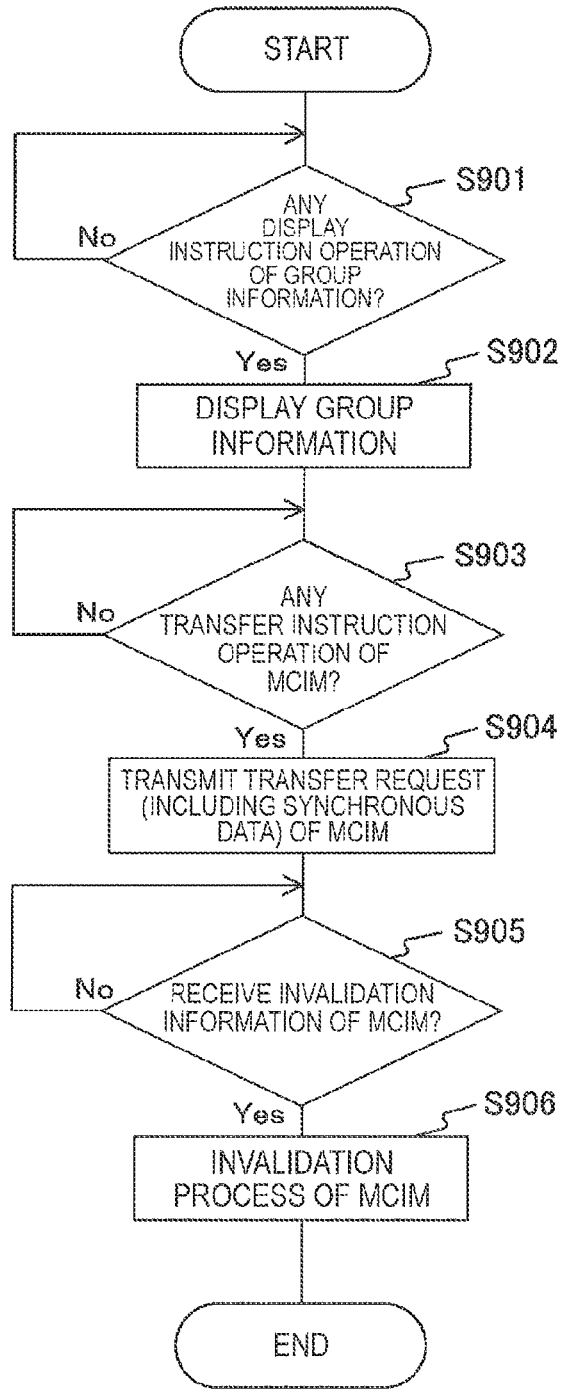
FIG. 17 is a flowchart of an exemplary communication process performed by a first wireless communication apparatus 300, according to the first exemplary embodiment.

FIG. 17 is a flowchart of an exemplary communication process by the first wireless communication apparatus 300 according to the first embodiment of the present technology. FIG. 17 shows an operation example of the transfer source (the first wireless communication apparatus 300) when the first wireless communication apparatus 300 holding use rights over MCIM makes a transfer request of use rights over MCIM. FIG. 17 shows an operation example of only the first wireless communication apparatus 300, but similarly applies to other wireless communication apparatuses.

First, the control unit 330 determines whether any display instruction operation of group information is performed (step S901) and if no display instruction operation is performed, monitoring continues. If the display instruction operation has been performed (step S901), the control unit 330 causes the display unit 370 to display group information (for example, the group list display screen 500 shown in FIG. 7) (step S902).

Subsequently, the control unit 330 determines whether any transfer instruction operation of MCIM is performed on the display screen displayed in the display unit 370 (step S903) and if no transfer instruction operation is performed, monitoring continues. If the transfer instruction operation has been performed (step S903), the control unit 330 transmits a transfer request of MCIM (including terminal identification information of the transfer source and transfer destination and synchronous data) to the RO 200 (step S904). In this case, the first wireless communication apparatus 300 holds use rights over MCIM and thus, the transfer request of MCIM is transmitted to the RO 200 via the SHO 120. Incidentally, step S903 is an example of an acceptance procedure described in claims. Step S904 is an example of a transmission procedure described in claims.

Subsequently, the control unit 330 determines whether invalidation information of MCIM is received (step S905) and if no invalidation information of MCIM is received, monitoring continues. If the invalidation information of MCIM has been received (step S905), the control unit 330 performs an invalidation process of the MCIM stored in the MCIM information storage unit 350 (step S906). Accordingly, the MCIM held by the first wireless communication apparatus 300 is invalidated and the first wireless communication apparatus 300 can no longer establish connection with the SHO 120 based on the MCIM.

[Operation Example of the Wireless Communication Apparatus (Transfer Destination) (Example in which a Transfer Operation is Performed in the Transfer Source)]

Figure 18:
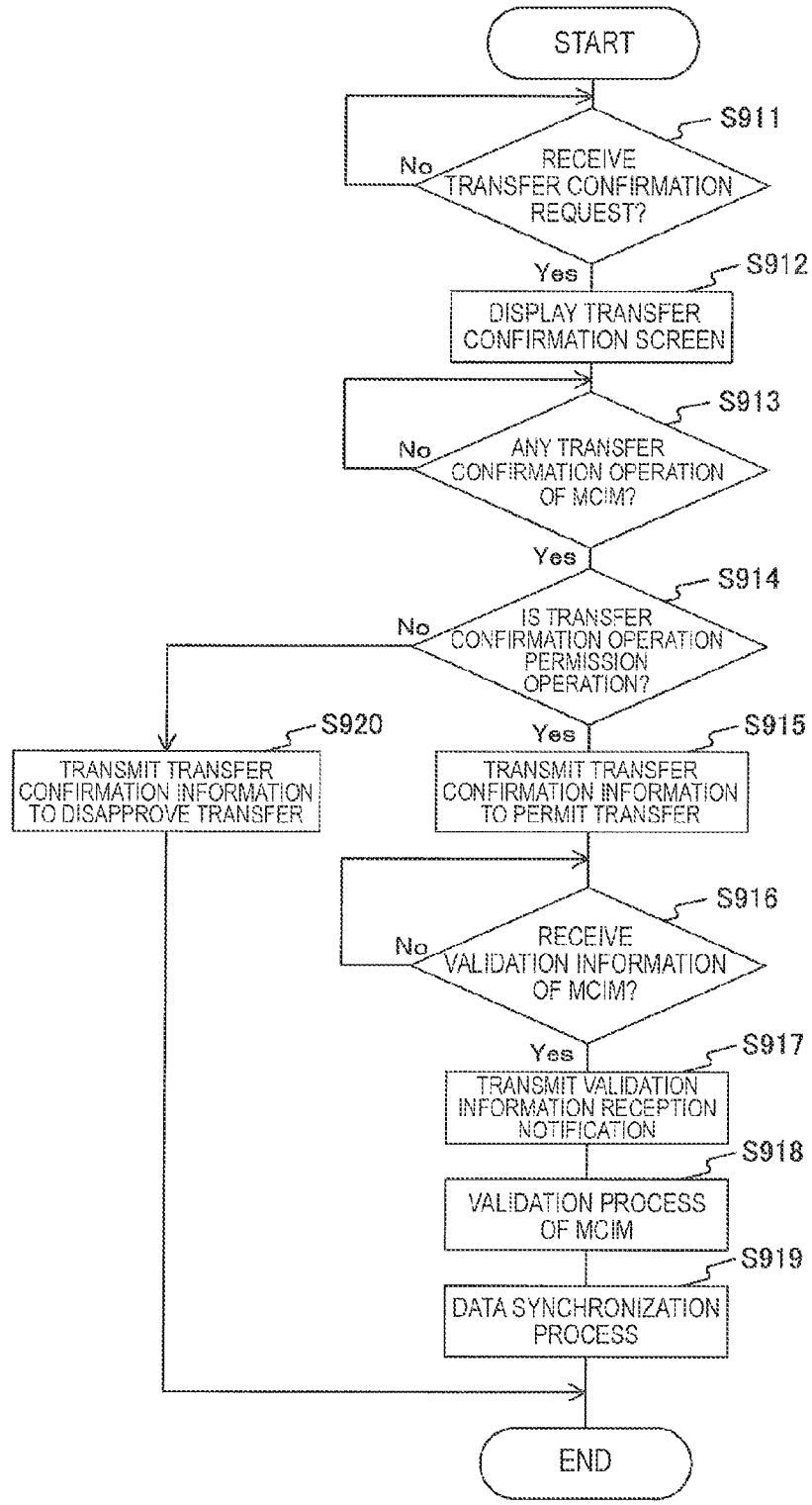
FIG. 18 is a flowchart of an exemplary communication process performed by a second wireless communication apparatus 130, according to the first exemplary embodiment.

FIG. 18 is a flowchart of an exemplary communication process by the second wireless communication apparatus 130 according to the first embodiment of the present technology. FIG. 18 shows an operation example of the transfer destination (the second wireless communication apparatus 130) when the first wireless communication apparatus 300 holding use rights over MCIM makes a transfer request of use rights over MCIM. FIG. 18 shows an operation example of only the second wireless communication apparatus 130, but similarly applies to other wireless communication apparatuses.

The control unit 330 of the second wireless communication apparatus 130 determines whether any transfer confirmation request is received (step S911) and if no transfer confirmation request is received, monitoring continues. If the transfer confirmation request has been received (step S911), the control unit 330 of the second wireless communication apparatus 130 causes the display unit 370 to display a transfer confirmation screen to cause the user to confirm the transfer of use rights over MCIM (step S912). For example, the transfer confirmation screen 510 shown in FIG. 8 is displayed in the display unit 370.

Subsequently, the control unit 330 of the second wireless communication apparatus 130 determines whether any transfer confirmation operation of MCIM is performed (step S913) and if no transfer confirmation operation of MCIM is performed, monitoring continues. If the transfer confirmation operation has been performed (step S913), the control unit 330 of the second wireless communication apparatus 130 determines whether the transfer confirmation operation is an operation to permit the transfer of use rights over MCIM (step S914).

If, for example, the OK button 512 is pressed on the transfer confirmation screen 510 shown in FIG. 8, the transfer confirmation operation is determined to be an operation to permit the transfer of use rights over MCIM. On the other hand, if the NG button 513 is pressed on the transfer confirmation screen 510 shown in FIG. 8, the transfer confirmation operation is determined to be an operation to disapprove the transfer of use rights over MCIM.

If the transfer confirmation operation is an operation to permit the transfer of use rights over MCIM (step S914), the control unit 330 of the second wireless communication apparatus 130 transmits transfer confirmation information permitting the transfer of MCIM use rights to the RO 200 (step S915). In this case, the second wireless communication apparatus 130 holds no use rights over MCIM and thus, the transfer confirmation information is directly transmitted to the RO 200.

Subsequently, the control unit 330 of the second wireless communication apparatus 130 determines whether validation information of MCIM is received (step S916) and if no validation information of MCIM is received, monitoring continues. If the validation information of MCIM has been received (step S916), the control unit 330 of the second wireless communication apparatus 130 transmits a validation information reception notification to notify that validation information of MCIM has been received to the RO 200 (step S917).

Subsequently, the control unit 330 of the second wireless communication apparatus 130 performs a validation process of the MCIM stored in the MCIM information storage unit 350 based on the received validation information of MCIM (step S918). Use rights over MCIM are thereby set to the second wireless communication apparatus 130 and thus, the second wireless communication apparatus 130 can establish connection with the SHO 120 based on the MCIM.

Subsequently, the control unit 330 of the second wireless communication apparatus 130 performs a data synchronization process to synchronize data in the second wireless communication apparatus 130 with data in the first wireless communication apparatus 300 (step S919).

If the transfer confirmation operation is an operation to disapprove the transfer of use rights over MCIM (step S914), the control unit 330 of the second wireless communication apparatus 130 transmits transfer confirmation information disapproving the transfer of MCIM use rights to the RO 200 (step S920). In this case, the subsequent transfer process of use rights over MCIM is not performed and thus, the operation of the communication process ends.

[Operation Example of the Wireless Communication Apparatus (Transfer Source) (Example in which a Transfer Operation is Performed in the Transfer Destination)]

Figure 19:
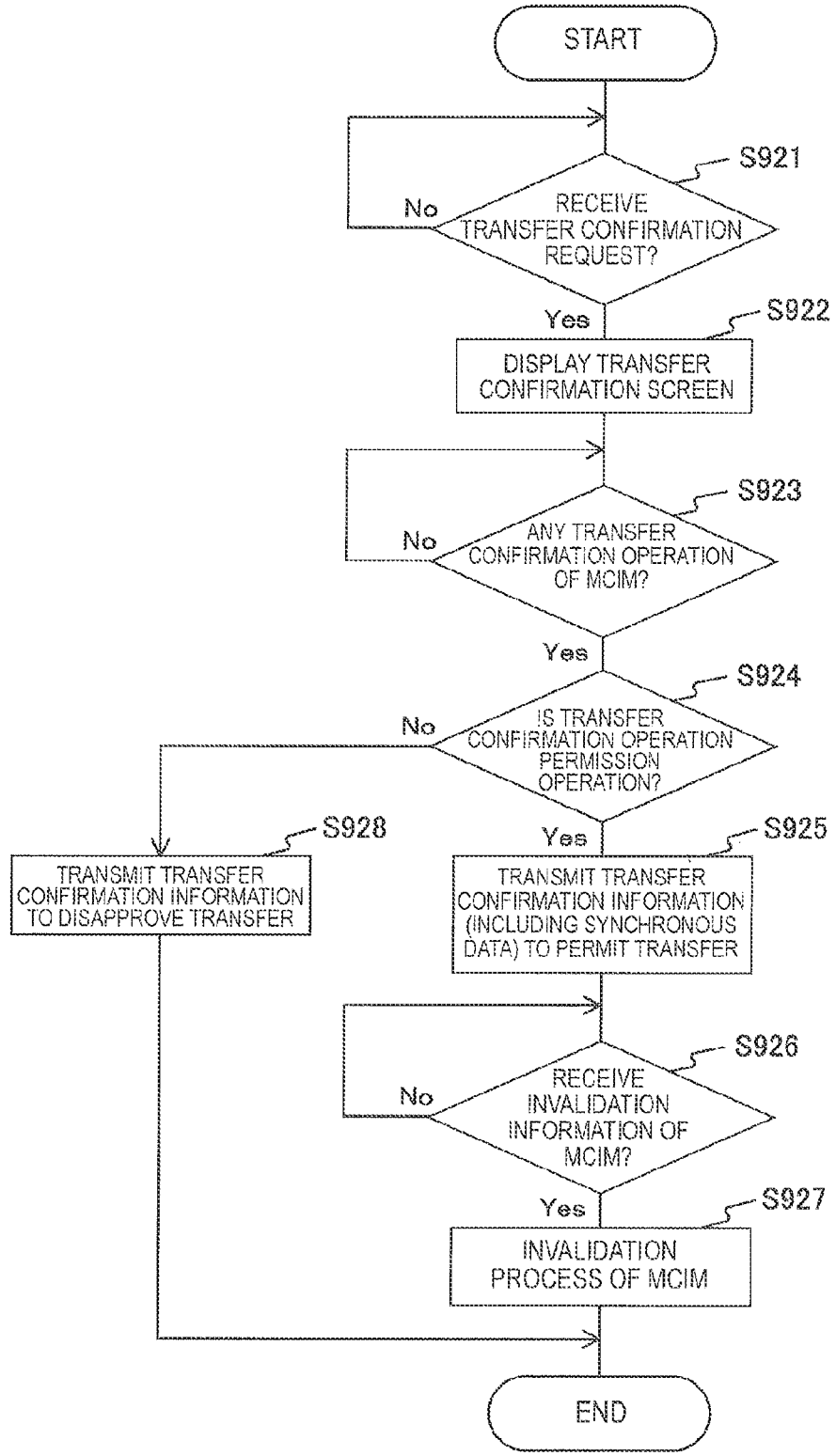
FIG. 19 is a flowchart of an exemplary communication process performed by the first wireless communication apparatus 300, according to the first exemplary embodiment.

FIG. 19 is a flowchart of an exemplary communication process by the first wireless communication apparatus 300 according to the first embodiment of the present technology. FIG. 19 shows an operation example of the transfer source (the first wireless communication apparatus 300) when the second wireless communication apparatus 130 holding no use rights over MCIM makes a transfer request of use rights over MCIM. FIG. 19 shows an operation example of only the first wireless communication apparatus 300, but similarly applies to other wireless communication apparatuses.

The control unit 330 determines whether any transfer confirmation request is received (step S921) and if no transfer confirmation request is received, monitoring continues. If the transfer confirmation request has been received (step S921), the control unit 330 causes the display unit 370 to display a transfer confirmation screen to cause the user to confirm the transfer of use rights over MCIM (step S922). For example, the transfer confirmation screen 510 shown in FIG. 8 is displayed in the display unit 370.

Subsequently, the control unit 330 determines whether any transfer confirmation operation of MCIM is performed (step S923) and if no transfer confirmation operation of MCIM is performed, monitoring continues. If the transfer confirmation operation has been performed (step S923), the control unit 330 determines whether the transfer confirmation operation is an operation to permit the transfer of use rights over MCIM (step S924).

If the transfer confirmation operation is an operation to permit the transfer of use rights over MCIM (step S924), the control unit 330 transmits transfer confirmation information (including synchronous data) permitting the transfer of MCIM use rights to the RO 200 (step S925). In this case, the first wireless communication apparatus 300 holds use rights over MCIM and thus, the transfer confirmation information is transmitted to the RO 200 via the SHO 120.

Subsequently, the control unit 330 determines whether invalidation information of MCIM is received (step S926) and if no invalidation information of MCIM is received, monitoring continues. If the invalidation information of MCIM has been received (step S926), the control unit 330 performs an invalidation process of the MCIM stored in the MCIM information storage unit 350 (step S927). Accordingly, the MCIM held by the first wireless communication apparatus 300 is invalidated and the first wireless communication apparatus 300 can no longer establish connection with the SHO 120 based on the MCIM.

If the transfer confirmation operation is an operation to disapprove the transfer of use rights over MCIM (step S924), the control unit 330 transmits transfer confirmation information disapproving the transfer of MCIM use rights to the RO 200 (step S928). In this case, the subsequent transfer process of use rights over MCIM is not performed and thus, the operation of the communication process ends.

[Operation Example of the Wireless Communication Apparatus (Transfer Destination) (Example in which a Transfer Operation is Performed in the Transfer Destination)]

Figure 20:
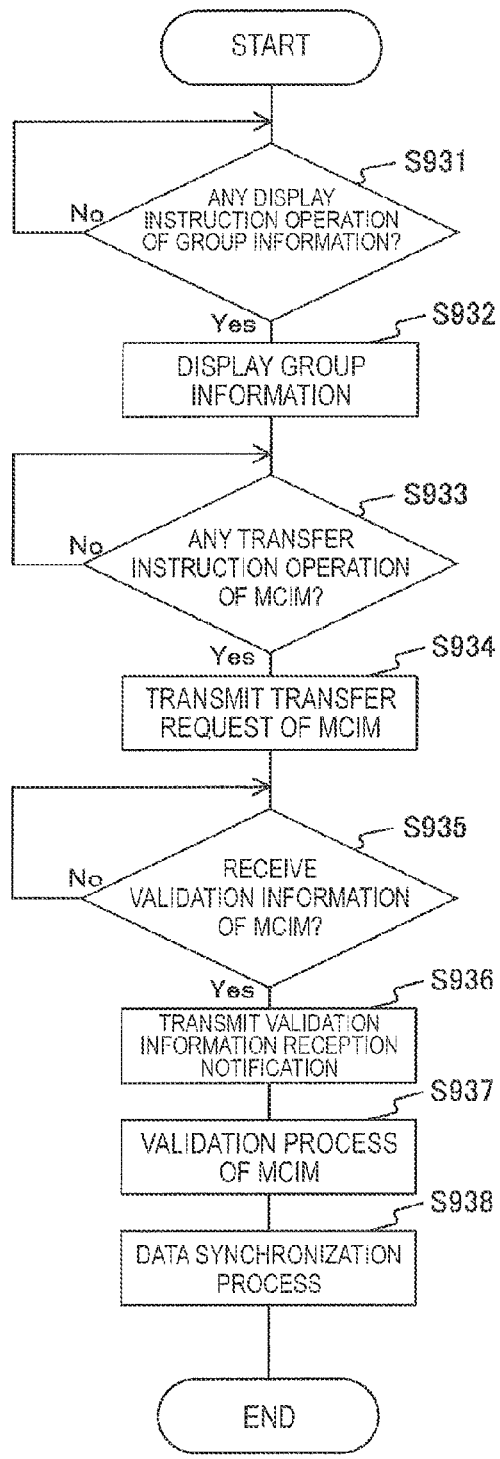
FIG. 20 is a flowchart of an exemplary communication process performed by the second wireless communication apparatus 130, according to the first exemplary embodiment.

FIG. 20 is a flowchart of an exemplary communication process by the second wireless communication apparatus 130 according to the first embodiment of the present technology. FIG. 20 shows an operation example of the transfer destination (the second wireless communication apparatus 130) when the second wireless communication apparatus 130 holding no use rights over MCIM makes a transfer request of use rights over MCIM. FIG. 20 shows an operation example of only the second wireless communication apparatus 130, but similarly applies to other wireless communication apparatuses.

First, the control unit 330 of the second wireless communication apparatus 130 determines whether any display instruction operation of group information is performed (step S931) and if no display instruction operation is performed, monitoring continues. If the display instruction operation has been performed (step S931), the control unit 330 of the second wireless communication apparatus 130 causes the display unit 370 to display group information (for example, the group list display screen 500 shown in FIG. 7) (step S932).

Subsequently, the control unit 330 of the second wireless communication apparatus 130 determines whether any transfer instruction operation of MCIM is performed on the display screen displayed in the display unit 370 (step S933) and if no transfer instruction operation is performed, monitoring continues. If the transfer instruction operation has been performed (step S933), the control unit 330 of the second wireless communication apparatus 130 transmits a transfer request of MCIM (including terminal identification information of the transfer source and transfer destination) to the RO 200 (step S934). In this case, the second wireless communication apparatus 130 holds no use rights over MCIM and thus, the transfer request of MCIM is directly transmitted to the RO 200.

Subsequently, the second wireless communication apparatus 130 determines whether validation information of MCIM is received (step S935) and if no validation information of MCIM is received, monitoring continues. If the validation information of MCIM has been received (step S935), the control unit 330 of the second wireless communication apparatus 130 transmits a validation information reception notification to notify that validation information of MCIM has been received to the RO 200 (step S936).

Subsequently, the control unit 330 of the second wireless communication apparatus 130 performs a validation process of the MCIM stored in the MCIM information storage unit 350 based on the received validation information of MCIM (step S937). Use rights over MCIM are thereby set to the second wireless communication apparatus 130 and thus, the second wireless communication apparatus 130 can establish connection with the SHO 120 based on the MCIM.

Subsequently, the control unit 330 of the second wireless communication apparatus 130 performs a data synchronization process to synchronize data in the second wireless communication apparatus 130 with data in the first wireless communication apparatus 300 (step S938).

[Operation Example of RO (Example in which a Transfer Operation is Performed in the Transfer Source or Transfer Destination)]

Figure 21:
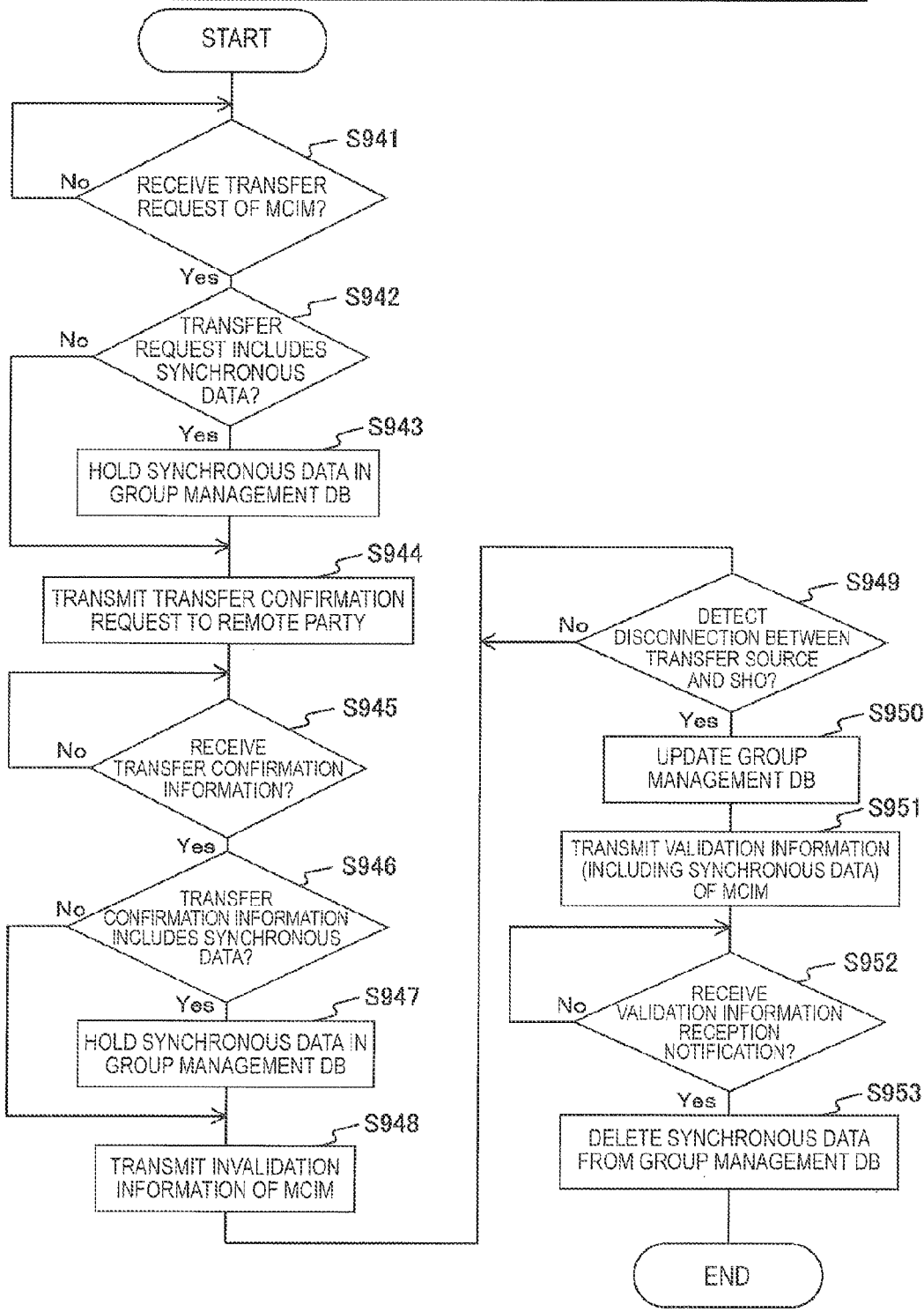
FIG. 21 is a flowchart of an exemplary communication process performed by a RO 200, according to the first exemplary embodiment.

FIG. 21 is a flowchart of an exemplary communication process by the RO 200 according to the first embodiment of the present technology. In FIG. 21, an operation example of the RO 200 when a wireless communication apparatus (the transfer source or transfer destination) belonging to a group makes a transfer request of use rights over MCIM is shown.

The control unit 210 determines whether any transfer request of MCIM is received (step S941) and if no transfer request of MCIM is received, monitoring continues. If the transfer request of MCIM has been received (step S941), the control unit 210 determines whether the received transfer request of MCIM includes synchronous data (step S942). That is, when a transfer request is received from the transfer source of use rights over MCIM, the transfer request includes synchronous data, but when a transfer request is received from the transfer destination of use rights over MCIM, the transfer request does not include synchronous data.

If the transfer request of MCIM includes synchronous data (step S942), the control unit 210 causes the group management database 220 to hold the synchronous data in association with the group to which the wireless communication apparatus that has transmitted the transfer request of MCIM belongs (step S943). If the transfer request of MCIM does not include synchronous data (step S942), the process proceeds to step S944.

Subsequently, the control unit 210 transmits a transfer confirmation request to the wireless communication apparatus identified based on terminal identification information of the remote party (the transfer source or transfer destination) included in the received transfer request of MCIM (step S944).

Subsequently, the control unit 210 determines whether transfer confirmation information is received (step S945) and if no transfer confirmation information is received, monitoring continues. If the transfer confirmation information has been received (step S945), the control unit 210 determines whether the received transfer confirmation information includes synchronous data (step S946). That is, when transfer confirmation information is received from the transfer destination of use rights over MCIM, the transfer confirmation information includes synchronous data, but when transfer confirmation information is received from the transfer source of use rights over MCIM, the transfer confirmation information does not include synchronous data.

In this example, it is assumed that whether transfer confirmation information permitting the transfer of use rights over MCIM is received is determined (step S945). If transfer confirmation information disapproving the transfer of use rights over MCIM is received (step S945), a notification of disapproval is transmitted to the wireless communication apparatus that has transmitted the transfer request of MCIM before the operation of the communication process being terminated. In this case, it is assumed that synchronous data held in the group management database 220 is deleted.

If the transfer confirmation information includes synchronous data (step S946), the control unit 210 causes the group management database 220 to hold the synchronous data in association with the group to which the wireless communication apparatus that has transmitted the transfer confirmation information belongs (step S947). If the transfer confirmation information does not include synchronous data (step S946), the process proceeds to step S948.

Subsequently, the control unit 210 transmits invalidation information of MCIM to invalidate the MCIM of the transfer source (wireless communication apparatus) to the transfer source (step S948).

Subsequently, the control unit 210 determines whether disconnection between the transfer source where an invalidation process of MCIM has been performed and the SHO 120 is detected (step S949) and if no disconnection is detected, monitoring continues. If the disconnection is detected (step S949), the control unit 210 updates content of the group management database 220 (step S950). That is, the content of the group management database 220 is updated so as to be content after the transfer process of use rights over MCIM.

Subsequently, the control unit 210 transmits validation information (including synchronous data) of MCIM to the transfer destination (wireless communication apparatus) (step S951).

Subsequently, the control unit 210 determines whether any validation information reception notification is received (step S952) and if no validation information reception notification is received, monitoring continues. If the validation information reception notification has been received (step S952), the control unit 210 deletes the synchronous data (synchronous data transmitted by being included in the validation information of MCIM) transmitted to the transfer destination from the group management database 220 (step S953).

[Operation Example of the Wireless Communication Apparatus (the Transfer Source or Transfer Destination) (Example in which a Transfer Operation is Performed in a Wireless Communication Apparatus Other than the Transfer Source and Transfer Destination)]

Figure 22:
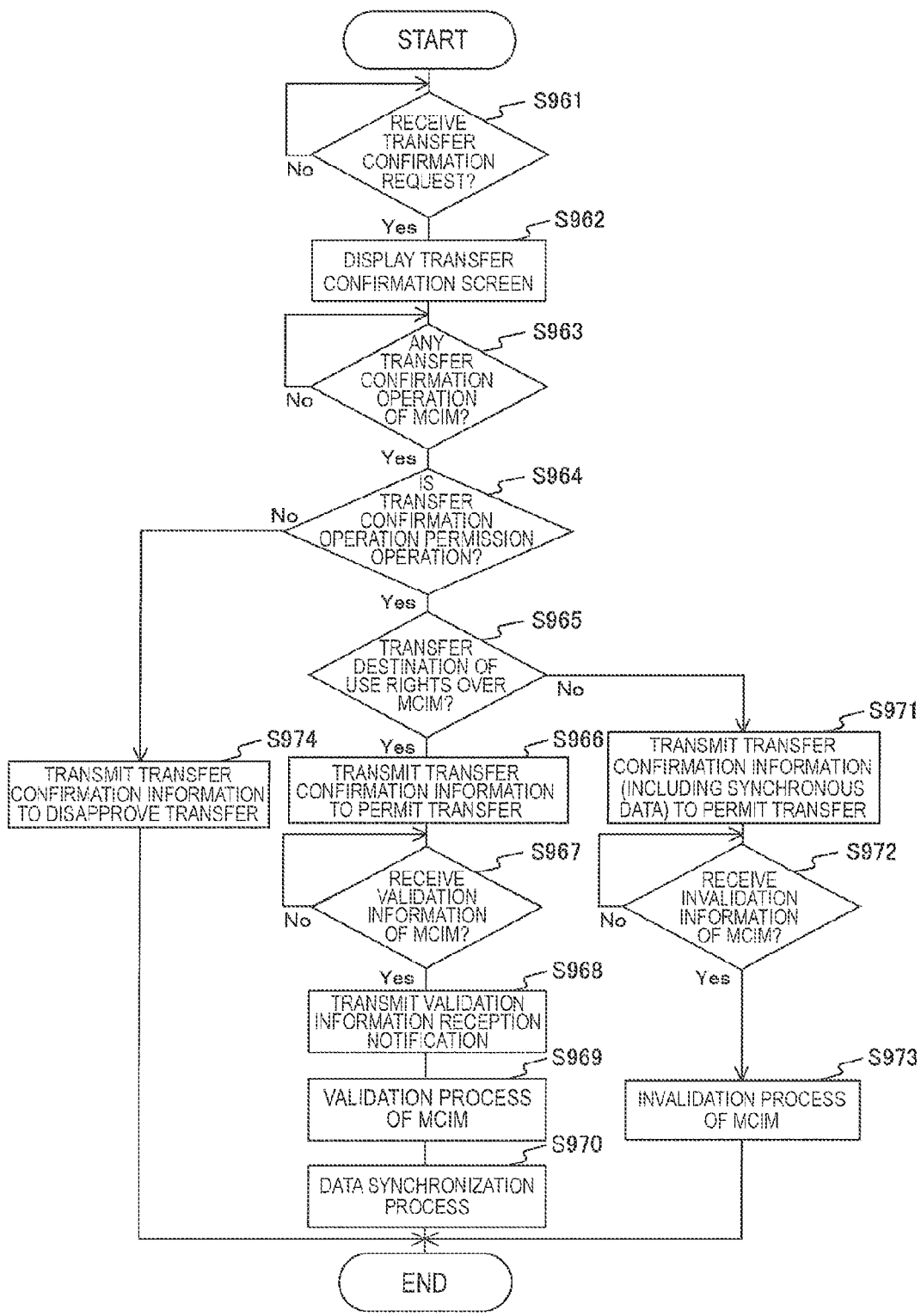
FIG. 22 is a flowchart of an exemplary communication process performed by a wireless communication apparatus, according to the first exemplary embodiment.

FIG. 22 is a flowchart of an exemplary communication process by a wireless communication apparatus according to the first embodiment of the present technology. FIG. 22 shows an operation example of a wireless communication apparatus when a transfer operation is performed by the wireless communication apparatus other than the transfer source and transfer destination.

The control unit 330 determines whether any transfer confirmation request is received (step S961) and if no transfer confirmation request is received, monitoring continues. If the transfer confirmation request has been received (step S961), the control unit 330 causes the display unit 370 to display a transfer confirmation screen to cause the user to confirm the transfer of use rights over MCIM (step S962). For example, the transfer confirmation screen 510 shown in FIG. 8 is displayed in the display unit 370.

Subsequently, the control unit 330 determines whether any transfer confirmation operation of MCIM is performed (step S963) and if no transfer confirmation operation of MCIM is performed, monitoring continues. If the transfer confirmation operation has been performed (step S963), the control unit 330 determines whether the transfer confirmation operation is an operation to permit the transfer of use rights over MCIM (step S964).

If the transfer confirmation operation is an operation to permit the transfer of use rights over MCIM (step S964), the control unit 330 determines whether the local machine is the transfer destination of use rights over MCIM (step S965). If the local machine is the transfer destination of use rights over MCIM (step S965), the control unit 330 transmits transfer confirmation information permitting the transfer of use rights over MCIM to the RO 200 (step S966). In this case, the wireless communication apparatus holds no use rights over MCIM and thus, the transfer confirmation information is directly transmitted to the RO 200.

Subsequently, the control unit 330 determines whether validation information of MCIM is received (step S967) and if no validation information of MCIM is received, monitoring continues. If the validation information of MCIM has been received (step S967), the control unit 330 transmits a validation information reception notification to notify that validation information of MCIM has been received to the RO 200 (step S968).

Subsequently, the control unit 330 performs a validation process of the MCIM stored in the MCIM information storage unit 350 based on the received validation information of MCIM (step S969). Use rights over MCIM are thereby set to the wireless communication apparatus of the transfer destination and thus, the wireless communication apparatus can establish connection with the SHO 120 based on the MCIM.

Subsequently, the control unit 330 performs a data synchronization process to synchronize data on the local machine (transfer destination) with data in the wireless communication apparatus of the transfer source (step S970).

If the local machine is not the transfer destination of use rights over MCIM (step S965), the control unit 330 transmits transfer confirmation information (including synchronous data) permitting the transfer of use rights over MCIM to the RO 200 (step S971). In this case, the wireless communication apparatus holds use rights over MCIM and thus, the transfer confirmation information is transmitted to the RO 200 via the SHO 120.

Subsequently, the control unit 330 determines whether invalidation information of MCIM is received (step S972) and if no invalidation information of MCIM is received, monitoring continues. If the invalidation information of MCIM has been received (step S972), the control unit 330 performs an invalidation process of the MCIM stored in the MCIM information storage unit 350 (step S973). Accordingly, the MCIM held by the wireless communication apparatus is invalidated and the wireless communication apparatus can no longer establish connection with the SHO 120 based on the MCIM.

If the transfer confirmation operation is an operation to disapprove the transfer of use rights over MCIM (step S964), the control unit 330 transmits transfer confirmation information disapproving the transfer of MCIM use rights to the RO 200 (step S974). In this case, the subsequent transfer process of use rights over MCIM is not performed and thus, the operation of the communication process ends.

[Operation Example of RO (Example in which a Transfer Operation is Performed in a Wireless Communication Apparatus Other than the Transfer Source and the Transfer Destination)]

Figure 23:
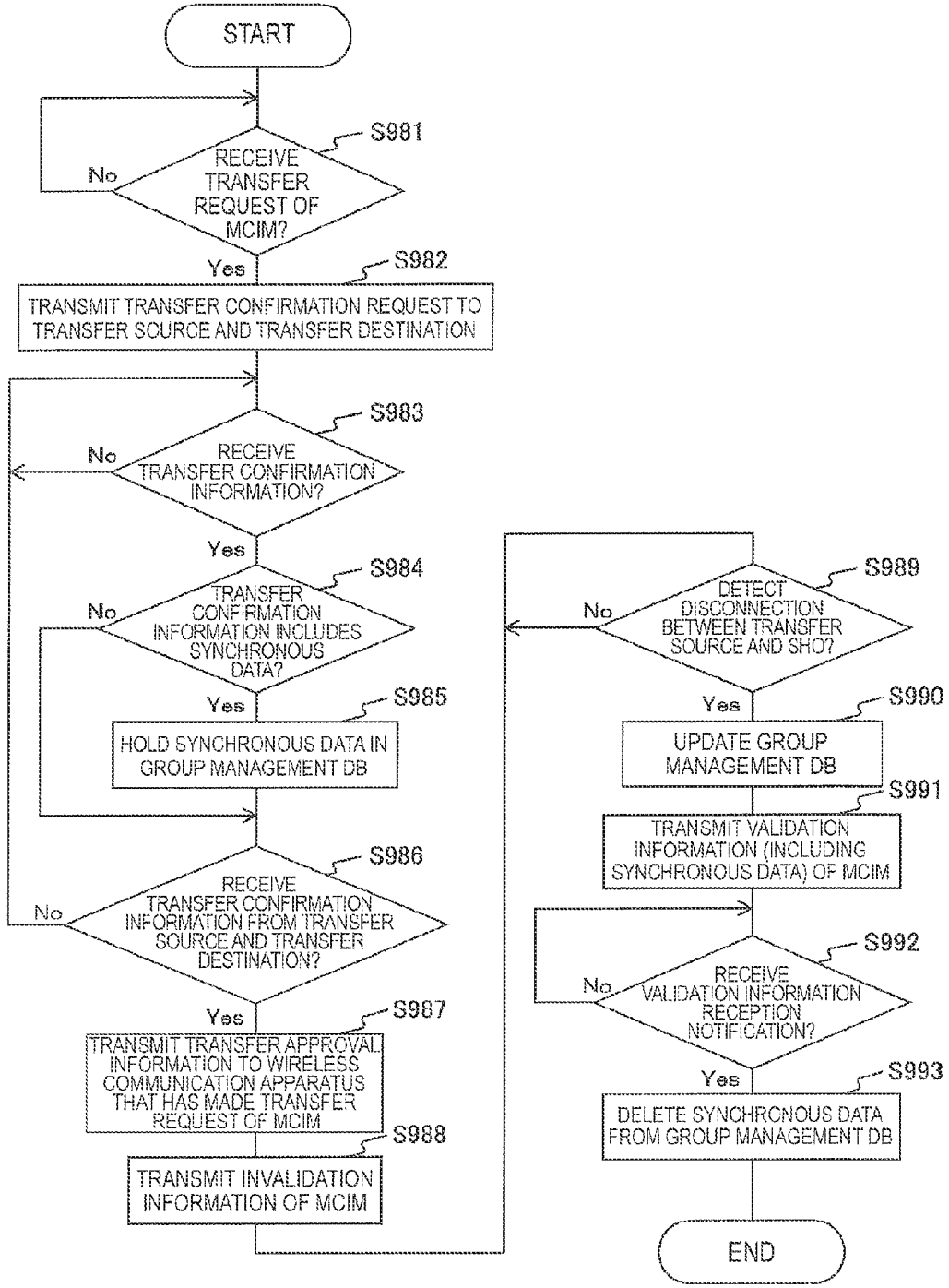
FIG. 23 is a flowchart of an exemplary communication process performed by the RO 200, according to the first exemplary embodiment.

FIG. 23 is a flowchart of an exemplary communication process by the RO 200 according to the first embodiment of the present technology. In FIG. 23, an operation example of the RO 200 when a wireless communication apparatus (other than the transfer source and transfer destination) belonging to a group makes a transfer request of use rights over MCIM is shown.

The control unit 210 determines whether any transfer request of MCIM is received (step S981) and if no transfer request of MCIM is received, monitoring continues. If the transfer request of MCIM has been received (step S981), the control unit 210 transmits a transfer confirmation request to the wireless communication apparatus (the transfer source or transfer destination) identified based on terminal identification information included in the received transfer request of MCIM (step S982).

Subsequently, the control unit 210 determines whether transfer confirmation information is received (step S983) and if no transfer confirmation information is received, monitoring continues. If the transfer confirmation information has been received (step S983), the control unit 210 determines whether the received transfer confirmation information includes synchronous data (step S984). That is, when transfer confirmation information is received from the transfer destination of use rights over MCIM, the transfer confirmation information includes synchronous data, but when transfer confirmation information is received from the transfer source of use rights over MCIM, the transfer confirmation information does not include synchronous data.

If the transfer confirmation information includes synchronous data (step S983), the control unit 210 causes the group management database 220 to hold the synchronous data in association with the group to which the wireless communication apparatus that has transmitted the transfer confirmation information belongs (step S985). If the transfer confirmation information does not include synchronous data (step S984), the process proceeds to step S986.

Subsequently, the control unit 210 determines whether transfer confirmation information is received from both of the transfer source and transfer destination (step S986) and if transfer confirmation information is not received one of both, the process returns to step S983. If the transfer confirmation information has been received from both of the transfer source and transfer destination (step S986), the control unit 210 transmits transfer approval information to the wireless communication apparatus that has transmitted the transfer request of MCIM (step S987).

In this example, it is assumed that whether transfer confirmation information permitting the transfer of use rights over MCIM is received from both of the transfer source and transfer destination is determined (step S986). If transfer confirmation information disapproving the transfer of use rights over MCIM is received from at least one of the transfer source and transfer destination (step S986), a notification of disapproval is transmitted to the wireless communication apparatus that has transmitted the transfer request of MCIM before the operation of the communication process being terminated. In this case, it is assumed that synchronous data held in the group management database 220 is deleted.

Each process (step S988 to step S993) shown in FIG. 23 corresponds to each process (step S948 to step S953) shown in FIG. 21. Thus, the description thereof is omitted here.

2. Second Embodiment

In the first embodiment of the present technology, examples in which a transfer request of MCIM or transfer confirmation information is transmitted to RO with synchronous data of the transfer source included in the transfer request of MCIM or the transfer confirmation information and validation information of MCIM is transmitted to the transfer destination with the synchronous data included in the validation information of MCIM are shown. However, synchronous data of the transfer source may separately be transmitted without being included in transmission information related to the transfer process of MCIM (transfer request of MCIM, transfer confirmation information, and validation information of MCIM).

Thus, in the second embodiment of the present technology, an example in which synchronous data of the transfer source is transmitted separately from transmission information related to the transfer process of MCIM is shown. The configuration of a communication system according to the second embodiment of the present technology is substantially the same as the example shown in FIG. 3. Thus, a portion of the description common to that in the first embodiment of the present technology is omitted.

[Communication Example when a Data Synchronization Process is Performed During a Transfer Process of Use Rights Over MCIM]

Figure 24:
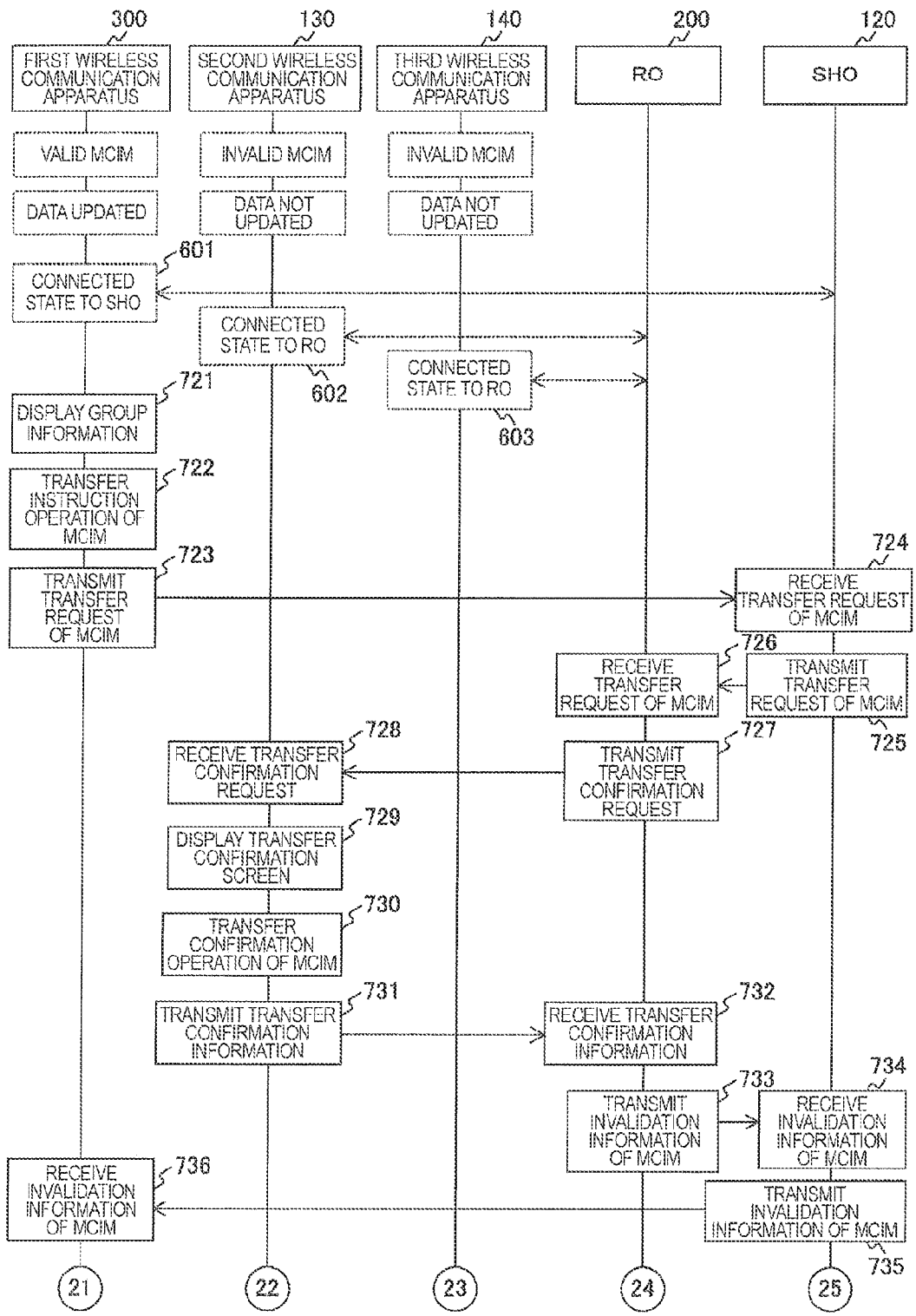
FIG. 24 is a sequence chart of an exemplary communication process performed by various apparatuses of the communication system 100, according to the second exemplary embodiment.
Figure 25:
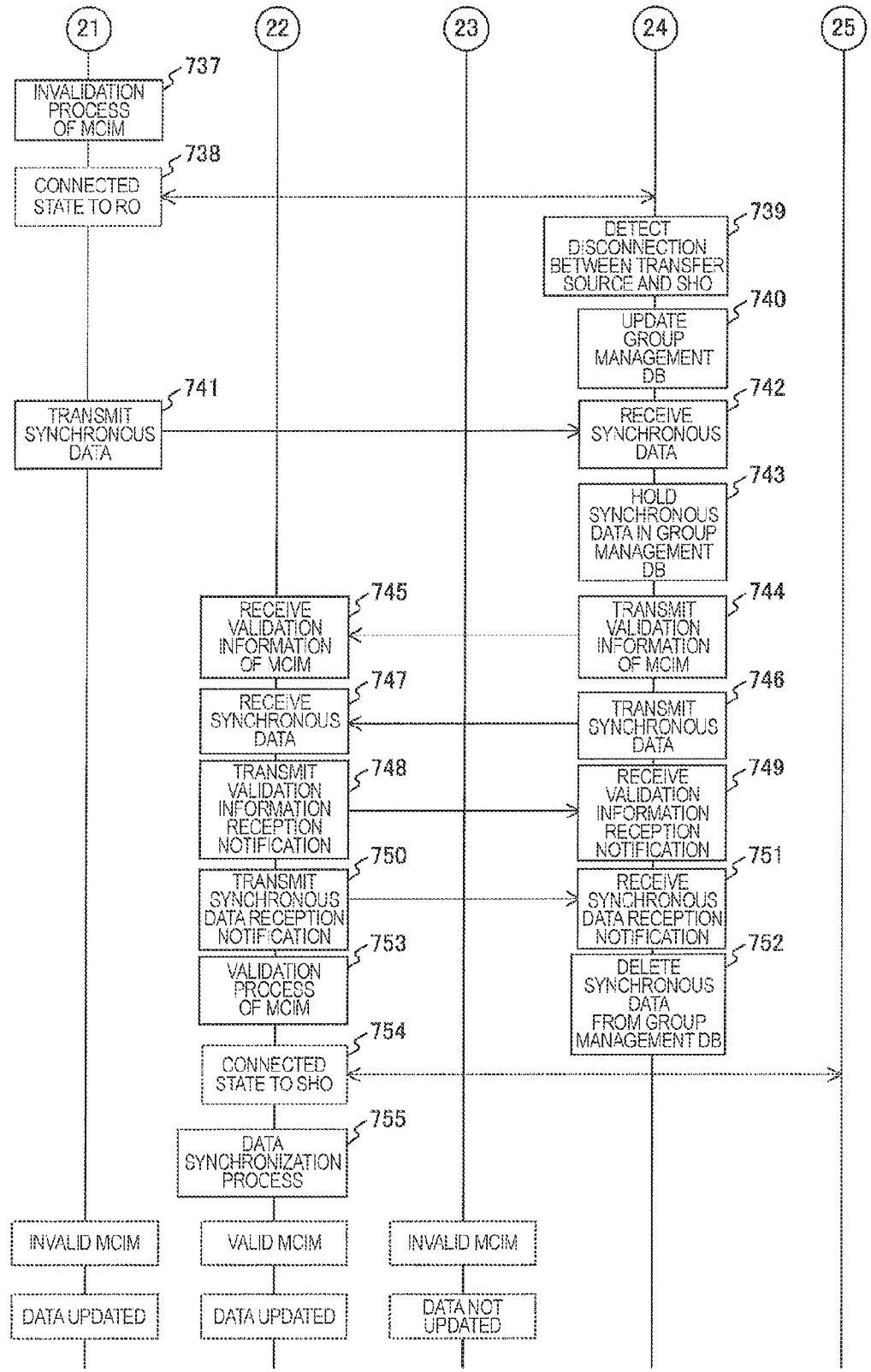
FIG. 25 is a sequence chart of an exemplary communication process performed by various apparatuses of the communication system 100, according to the second exemplary embodiment.

FIGS. 24 and 25 are a sequence chart showing an exemplary communication process between each apparatus constituting the communication system 100 according to the second embodiment of the present technology. The sequence chart shown in FIGS. 24 and 25 is a modification of the sequence chart shown in FIGS. 10 and 11 and thus, a portion of the description common to that of FIGS. 10 and 11 is omitted. In FIGS. 24 and 25, an example in which synchronous data of the transfer source is transmitted separately without being included in a transfer request of MCIM will be described.

Each process (721 to 726) shown in FIGS. 24 and 25 corresponds to each process (604 to 609) shown in FIGS. 10 and 11. However, the present example is different in that a transfer request of MCIM is transmitted without including synchronous data (723) (606).

Each process (727 to 740) shown in FIGS. 24 and 25 corresponds to each process (611 to 624) shown in FIGS. 10 and 11.

In this example, the transfer request of MCIM is transmitted without including synchronous data (723) and thus, synchronous data held by the first wireless communication apparatus 300 needs to be transmitted to the RO 200 separately from the transfer request of MCIM. Thus, after an invalidation process of the MCIM ends in the first wireless communication apparatus 300 and the first wireless communication apparatus 300 is in a connected state (738) to the RO 200, the control unit 330 of the first wireless communication apparatus 300 transmits the synchronous data to the RO 200 (741, 742). In this case, terminal identification information of the first wireless communication apparatus 300 is transmitted to the RO 200 together with the synchronous data.

When the RO 200 receives the synchronous data (742), the control unit 210 extracts the group to which the wireless communication apparatus (the first wireless communication apparatus 300) that has transmitted the synchronous data belongs. That is, terminal identification information matching the terminal identification information transmitted together with the synchronous data is extracted from the group management database 220 and the group related to the extracted terminal identification information is extracted. Then, the control unit 210 causes the group management database 220 to hold the received synchronous data in association with the extracted group (743).

Subsequently, the control unit 210 transmits validation information of MCIM to the second wireless communication apparatus 130 (744, 745). In addition, the control unit 210 transmits the synchronous data held in the group management database 220 to the second wireless communication apparatus 130 (746, 747).

When the second wireless communication apparatus 130 receives the validation information of MCIM (745), the control unit 330 of the second wireless communication apparatus 130 transmits a validation information reception notification to notify that validation information of MCIM has been received to the RO 200 (748, 749). When the second wireless communication apparatus 130 receives the synchronous data (747), the control unit 330 of the second wireless communication apparatus 130 transmits a synchronous data reception notification to notify that synchronous data has been received to the RO 200 (750, 751).

When the RO 200 receives the synchronous data reception notification (751), the control unit 210 of the RO 200 deletes the synchronous data transmitted to the second wireless communication apparatus 130 from the group management database 220 (752).

Each process (753 to 755) shown in FIGS. 24 and 25 corresponds to each process (630 to 632) shown in FIGS. 10 and 11.

FIGS. 24 and 25 show an example in which a transfer request of MCIM is made by using the first wireless communication apparatus 300 holding use rights over MCIM is shown, but such a request may also be made from a wireless communication apparatus holding no use rights over MCIM. Such an example is shown in FIGS. 26 to 30.

[Communication Example when a Transfer Request is Made from the Transfer Destination of Use Rights Over MCIM]

Figure 26:
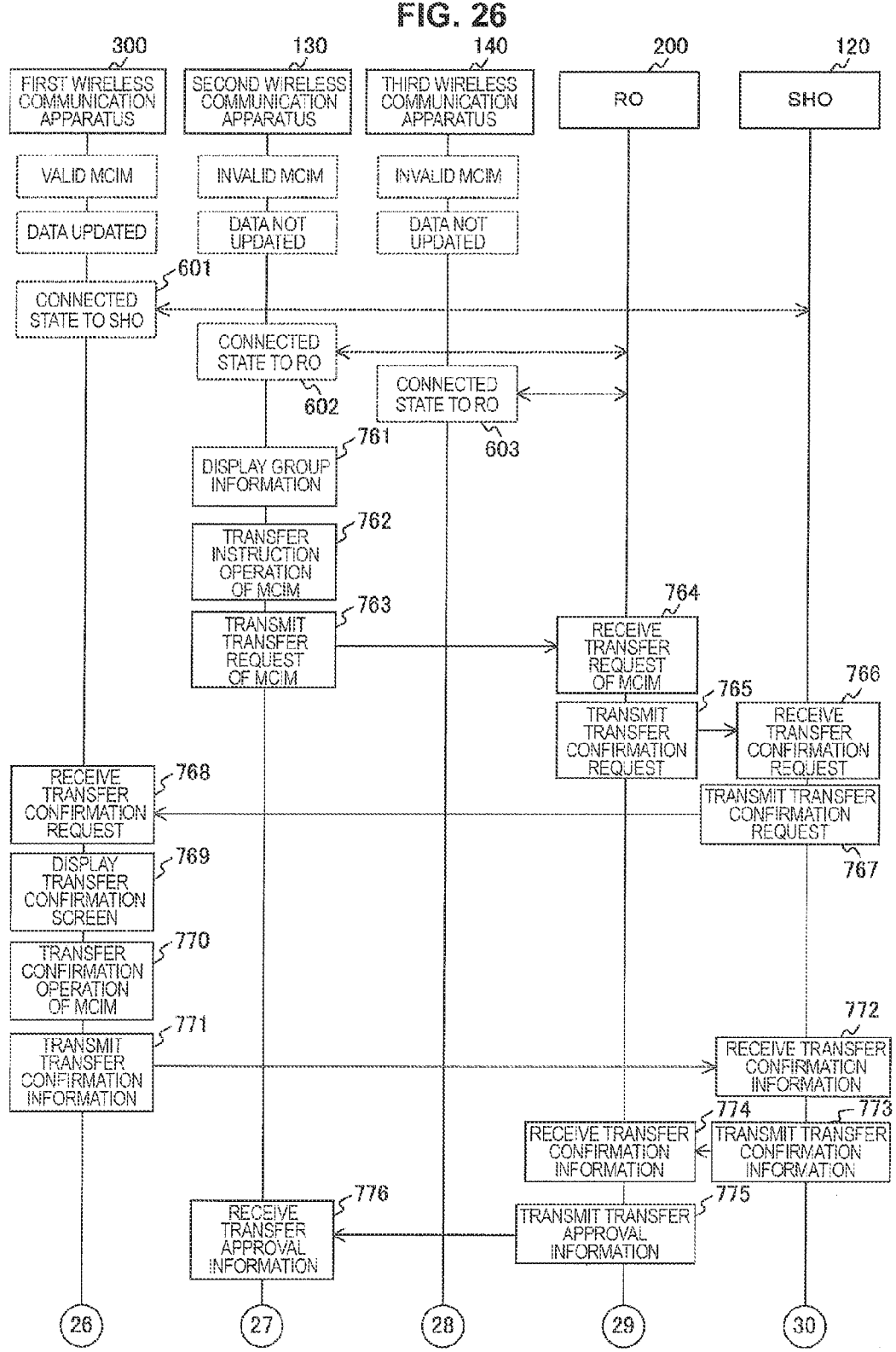
FIG. 26 is a sequence chart of an exemplary communication process performed by various apparatuses of the communication system 100, according to the second exemplary embodiment.
Figure 27:
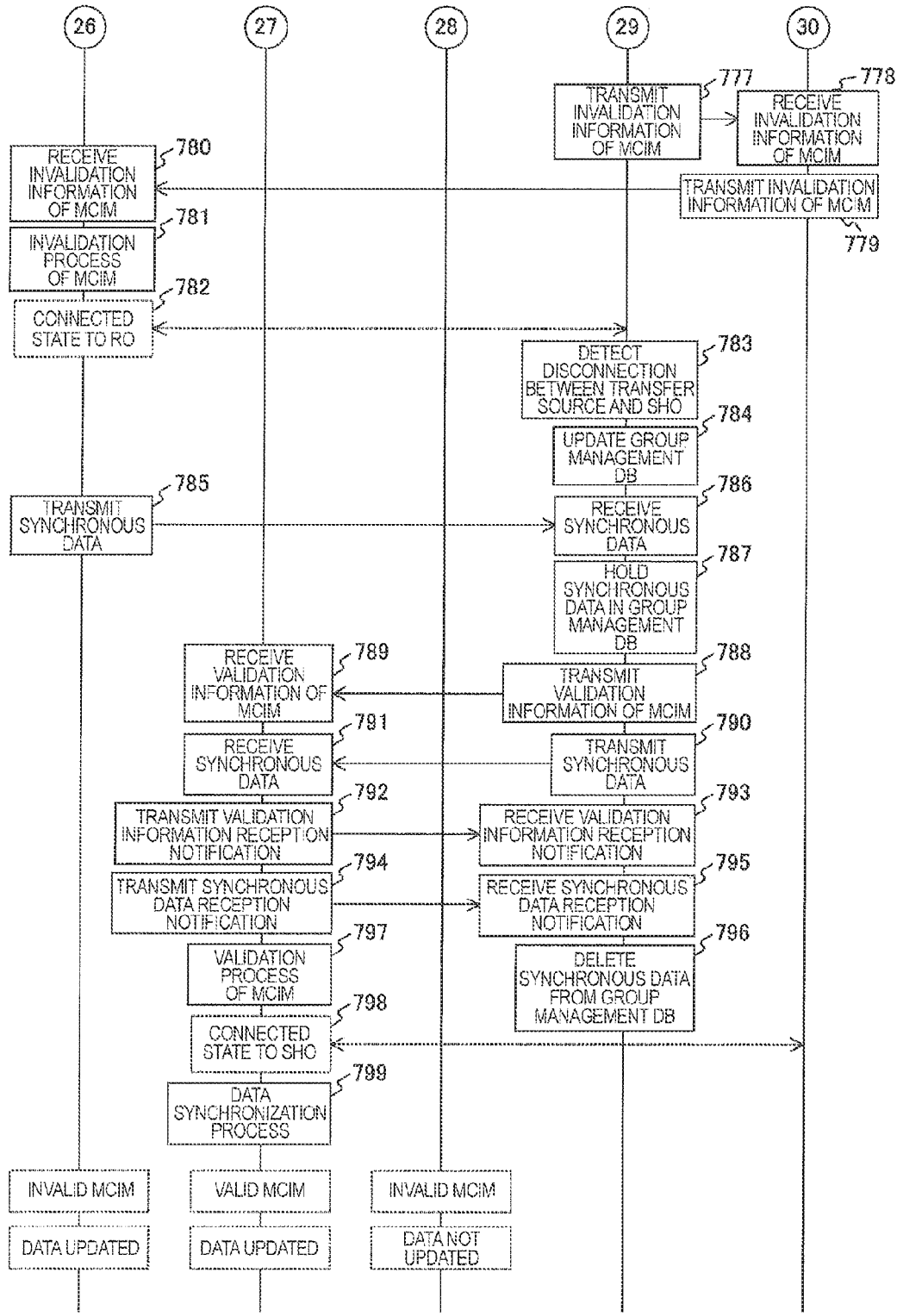
FIG. 27 is a sequence chart of an exemplary communication process performed by various apparatuses of the communication system 100, according to the second exemplary embodiment.

FIGS. 26 and 27 are a sequence chart showing an exemplary communication process between each apparatus constituting the communication system 100 according to the second embodiment of the present technology.

The sequence chart shown in FIGS. 26 to 27 is a modification of the sequence charts shown in FIGS. 12 and 13 and FIGS. 24 and 25 and thus, a portion of the description common to those of FIGS. 12 and 13 and FIGS. 24 and 25 is omitted. In FIGS. 26 and 27, an example in which synchronous data of the transfer source is transmitted separately without being included in transfer confirmation information will be described.

Each process (761 to 774) shown in FIG. 26 corresponds to each process (641 to 654) shown in FIG. 12. However, the present example is different in that transfer confirmation information is transmitted without including synchronous data (771) (651).

When the RO 200 receives the transfer confirmation information (774), the control unit 210 transmits transfer approval information indicating that the transfer has been approved to the wireless communication apparatus (the second wireless communication apparatus 130) that has transmitted the transfer request of MCIM (775, 776).

Each process (777 to 784) shown in FIG. 27 corresponds to each process (656 to 663) shown in FIG. 13.

In this example, the transfer confirmation information is transmitted without including synchronous data (771) and thus, the synchronous data held by the first wireless communication apparatus 300 needs to be transmitted to the RO 200 separately from the transfer confirmation information. Thus, after an invalidation process of the MCIM ends in the first wireless communication apparatus 300 and the first wireless communication apparatus 300 is in a connected state (782) to the RO 200, the control unit 330 of the first wireless communication apparatus 300 transmits the synchronous data to the RO 200 (785, 786). In this case, terminal identification information of the first wireless communication apparatus 300 is transmitted to the RO 200 together with the synchronous data.

Each process (785 to 799) shown in FIG. 27 corresponds to each process (741 to 755) shown in FIG. 25.

[Communication Example when a Transfer Request is Made from a Wireless Communication Apparatus Other and the Transfer Source and the Transfer Destination of Use Rights Over MCIM]

Figure 28:
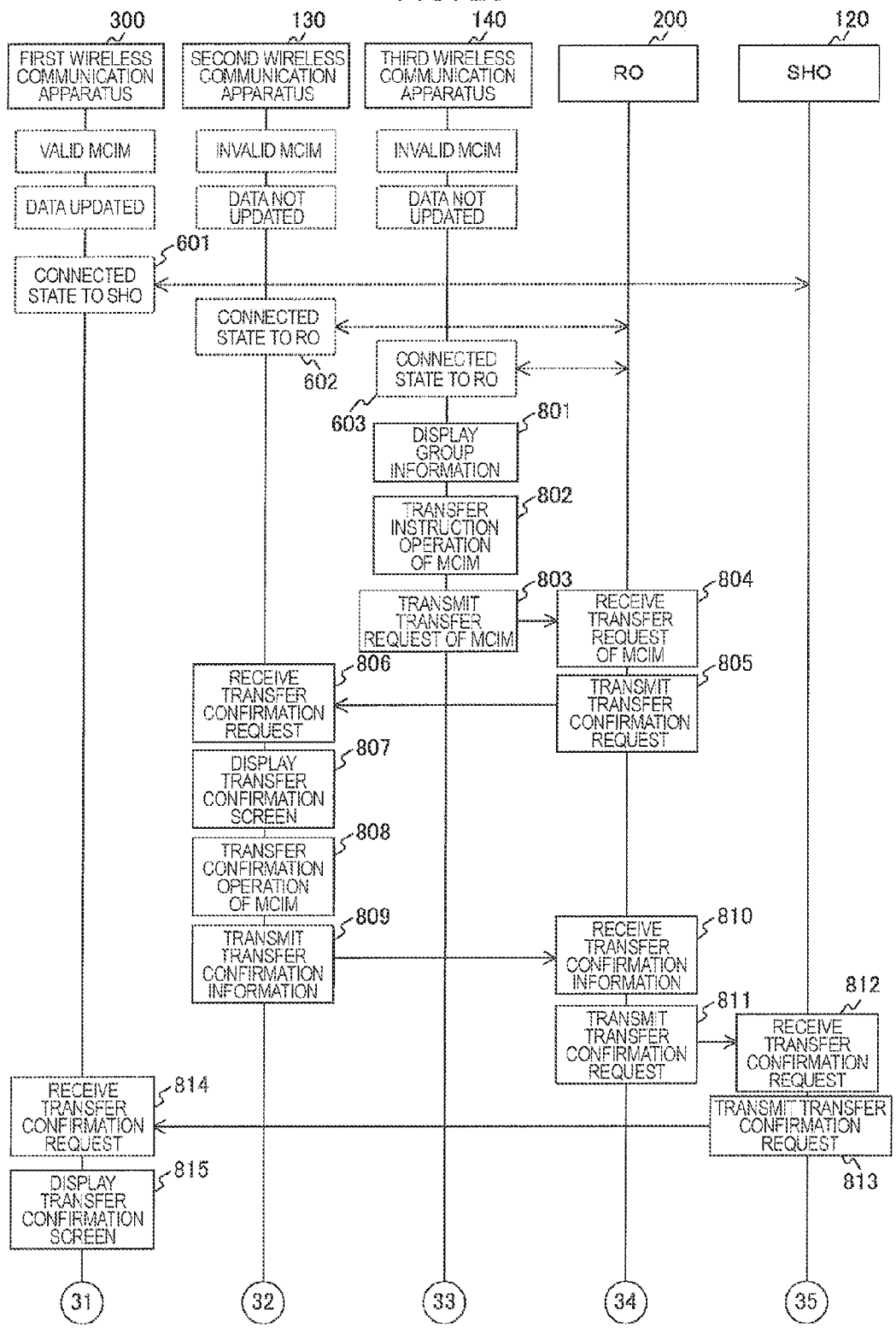
FIG. 28 is a sequence chart of an exemplary communication process performed by various apparatuses of the communication system 100, according to the second exemplary embodiment.
Figure 29:
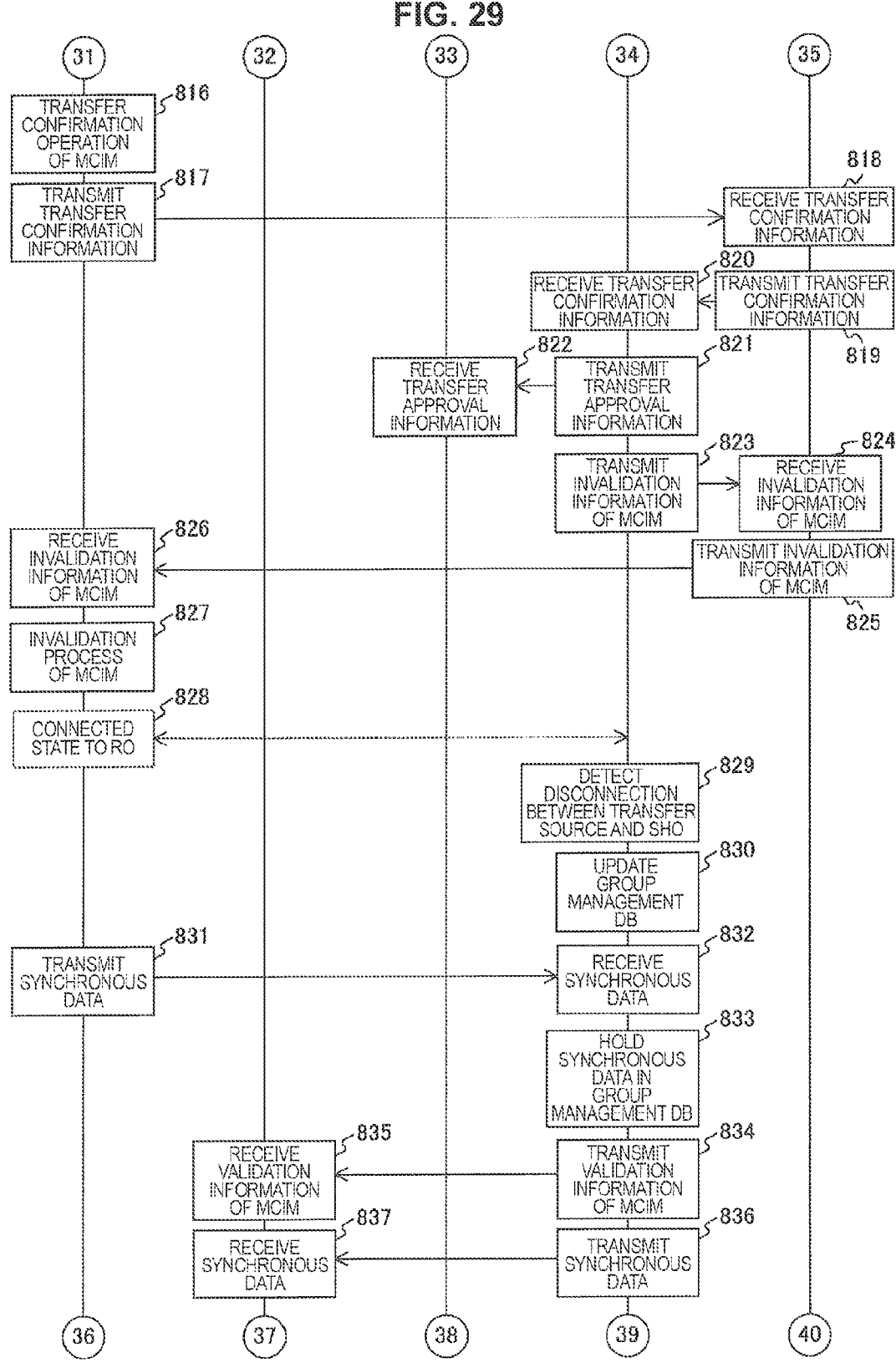
FIG. 29 is a sequence chart of an exemplary communication process performed by various apparatuses of the communication system 100, according to the second exemplary embodiment.
Figure 30:
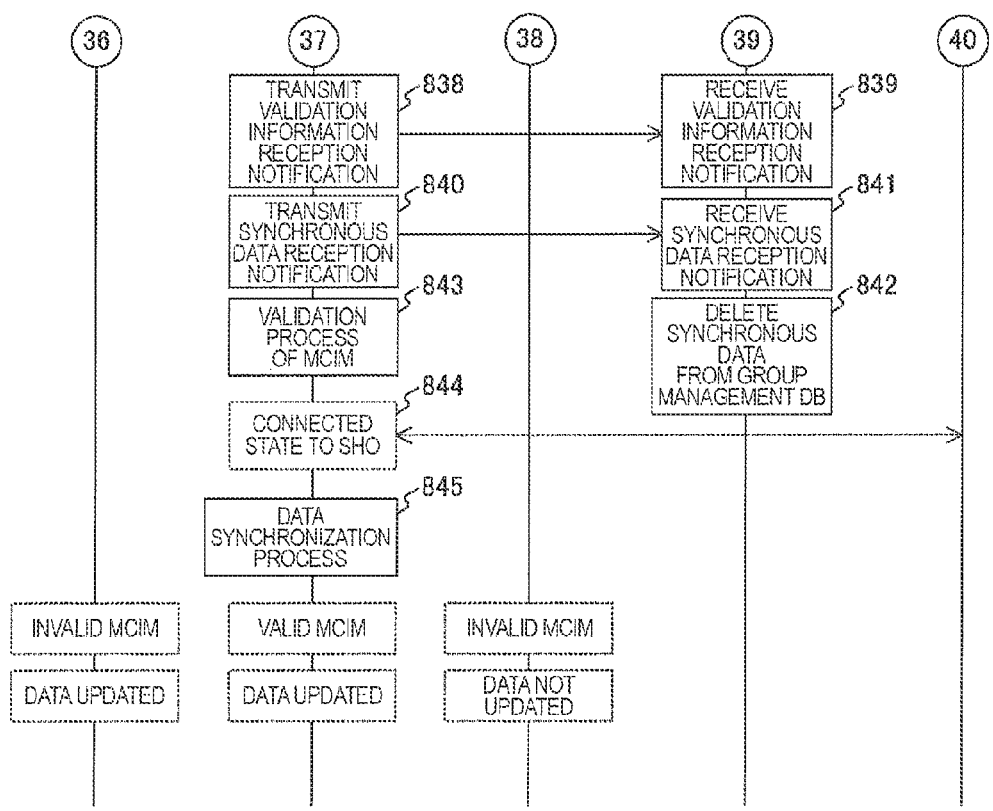
FIG. 30 is a sequence chart of an exemplary communication process performed by various apparatuses of the communication system 100, according to the second exemplary embodiment.

FIGS. 28 to 30 are a sequence chart showing an exemplary communication process between each apparatus constituting the communication system 100 according to the second embodiment of the present technology.

The sequence chart shown in FIGS. 28 to 30 is a modification of the sequence charts shown in FIGS. 14 to 16 and FIGS. 26 and 27 and thus, a portion of the description common to those of FIGS. 14 to 16 and FIGS. 26 and 27 is omitted. In FIGS. 28 to 30, an example in which synchronous data of the transfer source is transmitted separately without being included in transfer confirmation information will be described.

Each process (801 to 820) shown in FIGS. 28 and 29 corresponds to each process (675 to 694) shown in FIGS. 14 and 15. However, the present example is different in that transfer confirmation information is transmitted without including synchronous data (817) (691).

Each process (821 to 830) shown in FIG. 29 corresponds to each process (696 to 705) shown in FIG. 15.

In this example, the transfer confirmation information is transmitted without including synchronous data (817) and thus, the synchronous data held by the first wireless communication apparatus 300 needs to be transmitted to the RO 200 separately from the transfer confirmation information. Thus, after an invalidation process of the MCIM ends in the first wireless communication apparatus 300 and the first wireless communication apparatus 300 is in a connected state (828) to the RO 200, the control unit 330 of the first wireless communication apparatus 300 transmits the synchronous data to the RO 200 (831, 832). In this case, terminal identification information of the first wireless communication apparatus 300 is transmitted to the RO 200 together with the synchronous data.

Each process (833 to 845) shown in FIGS. 29 and 30 corresponds to each process (787 to 799) shown in FIG. 27.

[Operation Example of the Communication System]

Next, the operation of the communication system 100 according to the second embodiment of the present technology will be described with reference to drawings.

[Operation Example of the Wireless Communication Apparatus (Transfer Source) (Example in which a Transfer Operation is Performed in the Transfer Source)]

Figure 31:
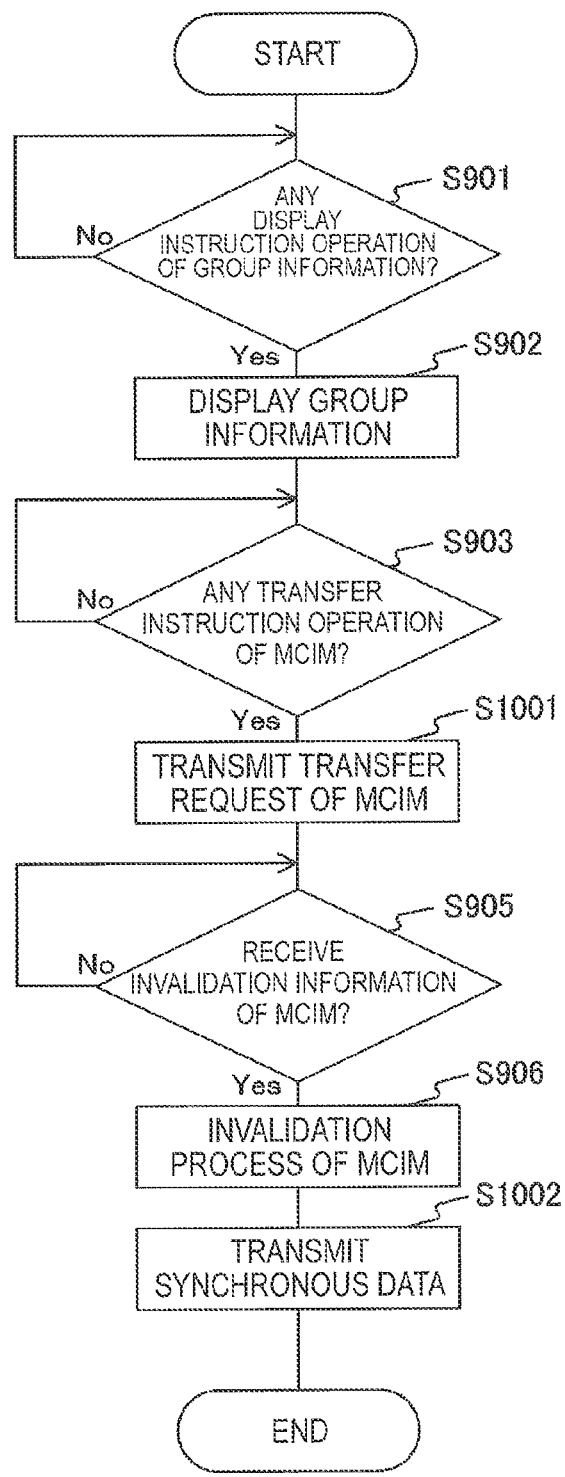
FIG. 31 is a flowchart of an exemplary communication process performed by the first wireless communication apparatus 300, according to the second exemplary embodiment.

FIG. 31 is a flowchart of an exemplary communication process by the first wireless communication apparatus 300 according to the second embodiment of the present technology. FIG. 31 shows an operation example of the transfer source (the first wireless communication apparatus 300) when the first wireless communication apparatus 300 holding use rights over MCIM makes a transfer request of use rights over MCIM. FIG. 31 is a modification of FIG. 17 and thus, a portion of the description common to that of FIG. 17 is omitted by attaching the same reference signs.

If a transfer instruction operation of MCIM is performed (step S903), the control unit 330 transmits a transfer request of MCIM (including terminal identification information of the transfer source and transfer destination) to the RO 200 (step S1001). That is, a transfer request of MCIM that does not include synchronous data is transmitted to the RO 200.

In addition, after an invalidation process of MCIM is performed (step S906), the control unit 330 transmits the synchronous data to the RO 200 (step S1002).

[Operation Example of the Wireless Communication Apparatus (Transfer Destination) (Example in which a Transfer Operation is Performed in the Transfer Source)]

Figure 32:
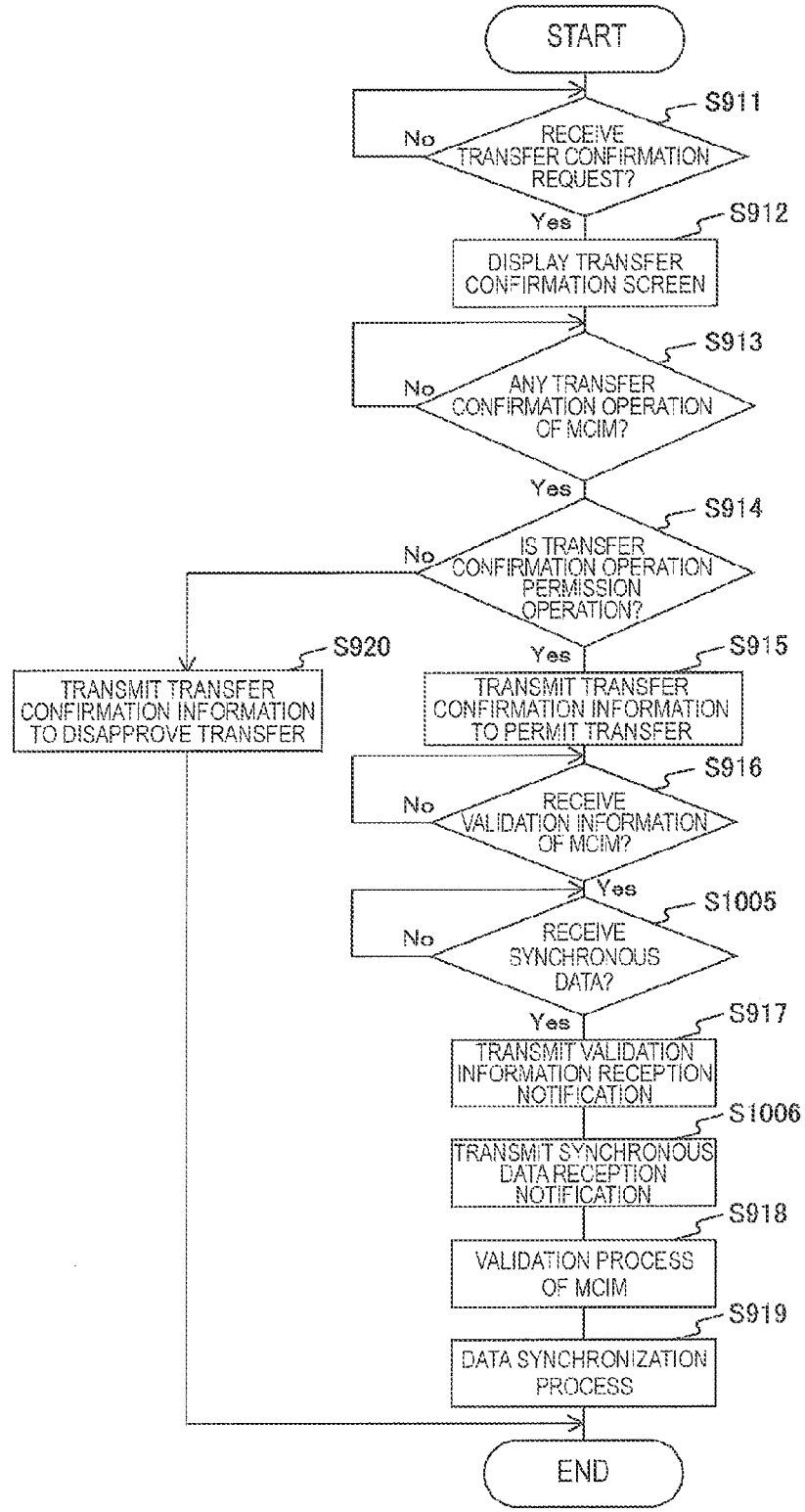
FIG. 32 is a flowchart of an exemplary communication process performed by the second wireless communication apparatus 130, according to the second exemplary embodiment.

FIG. 32 is a flowchart of an exemplary communication process by the second wireless communication apparatus 130 according to the second embodiment of the present technology. FIG. 32 shows an operation example of the transfer destination (the second wireless communication apparatus 130) when the first wireless communication apparatus 300 holding use rights over MCIM makes a transfer request of use rights over MCIM. FIG. 32 is a modification of FIG. 18 and thus, a portion of the description common to that of FIG. 18 is omitted by attaching the same reference signs.

If the validation information of MCIM has been received (step S916), the control unit 330 of the second wireless communication apparatus 130 determines whether synchronous data is received (step S1005) and if no synchronous data is received, monitoring continues.

If the synchronous data is received (step S1005), the control unit 330 of the second wireless communication apparatus 130 transmits a validation information reception notification to the RO 200 (step S917). Subsequently, the control unit 330 of the second wireless communication apparatus 130 transmits a synchronous data reception notification to notify that synchronous data has been received to the RO 200 (step S1006).

[Operation Example of the Wireless Communication Apparatus (Transfer Source) (Example in which a Transfer Operation is Performed in the Transfer Destination)]

Figure 33:
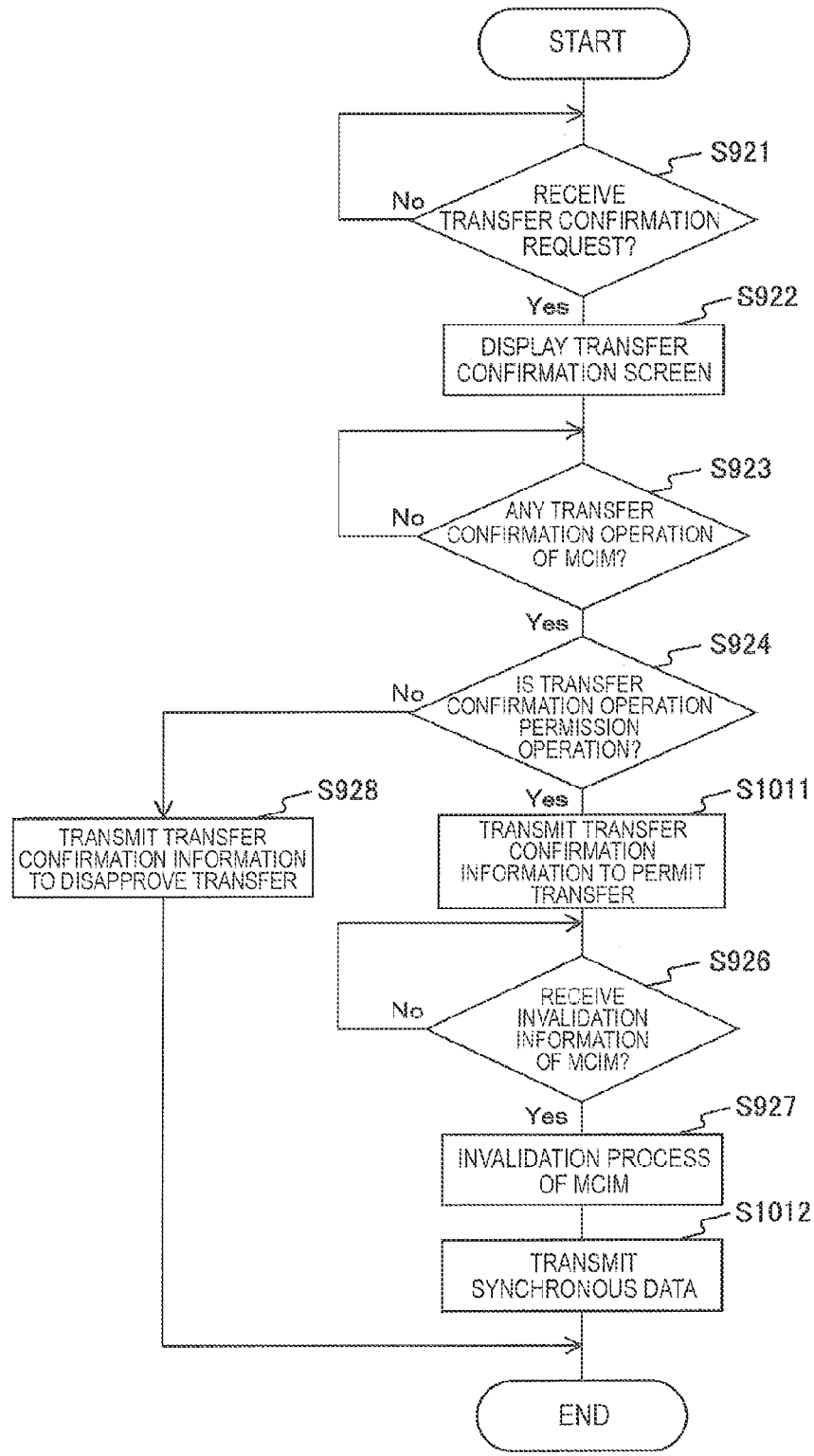
FIG. 33 is a flowchart of an exemplary communication process performed by the first wireless communication apparatus 300, according to the second exemplary embodiment.

FIG. 33 is a flowchart of an exemplary communication process by the first wireless communication apparatus 300 according to the second embodiment of the present technology. FIG. 33 shows an operation example of the transfer source (the first wireless communication apparatus 300) when the second wireless communication apparatus 130 holding no use rights over MCIM makes a transfer request of use rights over MCIM. FIG. 33 is a modification of FIG. 19 and thus, a portion of the description common to that of FIG. 19 is omitted by attaching the same reference signs.

If the transfer confirmation operation of MCIM is an operation to permit the transfer of use rights over MCIM (step S924), the control unit 330 transmits transfer confirmation information permitting the transfer of MCIM use rights to the RO 200 (step S1011). That is, transfer confirmation information that does not include synchronous data is transmitted to the RO 200.

In addition, after an invalidation process of MCIM is performed (step S927), the control unit 330 transmits the synchronous data to the RO 200 (step S1012).

[Operation Example of the Wireless Communication Apparatus (Transfer Destination) (Example in which a Transfer Operation is Performed in the Transfer Destination)]

Figure 34:
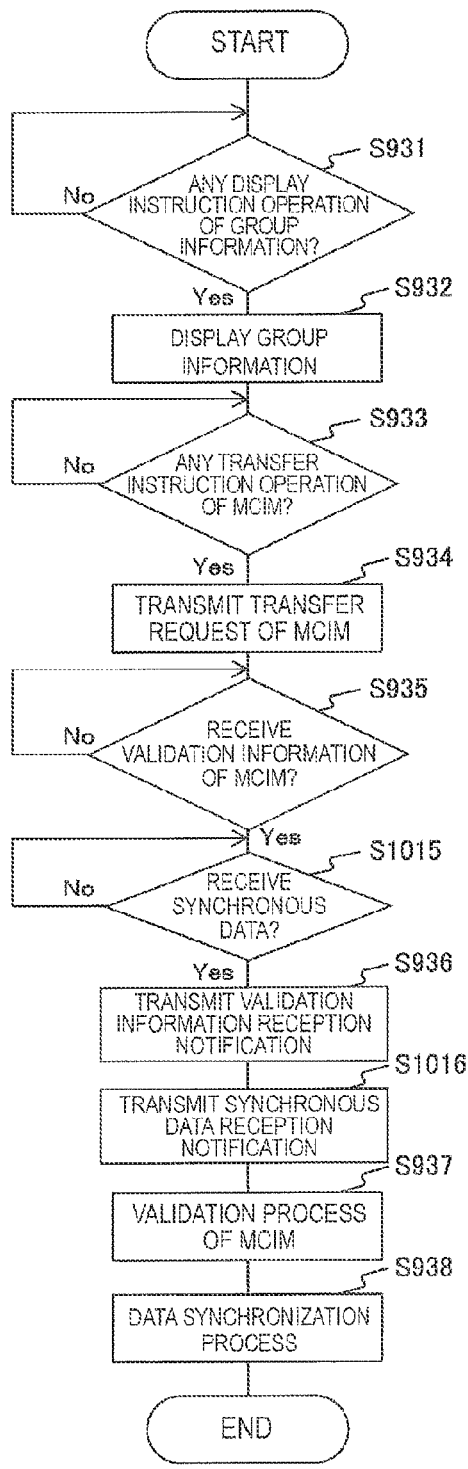
FIG. 34 is a flowchart of an exemplary communication process performed by the second wireless communication apparatus 130, according to the second exemplary embodiment.

FIG. 34 is a flowchart of an exemplary communication process by the second wireless communication apparatus 130 according to the second embodiment of the present technology. FIG. 34 shows an operation example of the transfer destination (the second wireless communication apparatus 130) when the second wireless communication apparatus 130 holding no use rights over MCIM makes a transfer request of use rights over MCIM. FIG. 34 is a modification of FIG. 20 and thus, a portion of the description common to that of FIG. 20 is omitted by attaching the same reference signs.

If the validation information of MCIM has been received (step S935), the control unit 330 of the second wireless communication apparatus 130 determines whether synchronous data is received (step S1015) and if no synchronous data is received, monitoring continues.

If the synchronous data has been received (step S1015), the control unit 330 of the second wireless communication apparatus 130 transmits a validation information reception notification to the RO 200 (step S936). Subsequently, the control unit 330 of the second wireless communication apparatus 130 transmits a synchronous data reception notification to notify that synchronous data has been received to the RO 200 (step S1016).

[Operation Example of RO (Example in which a Transfer Operation is Performed in the Transfer Source or Transfer Destination)]

Figure 35:
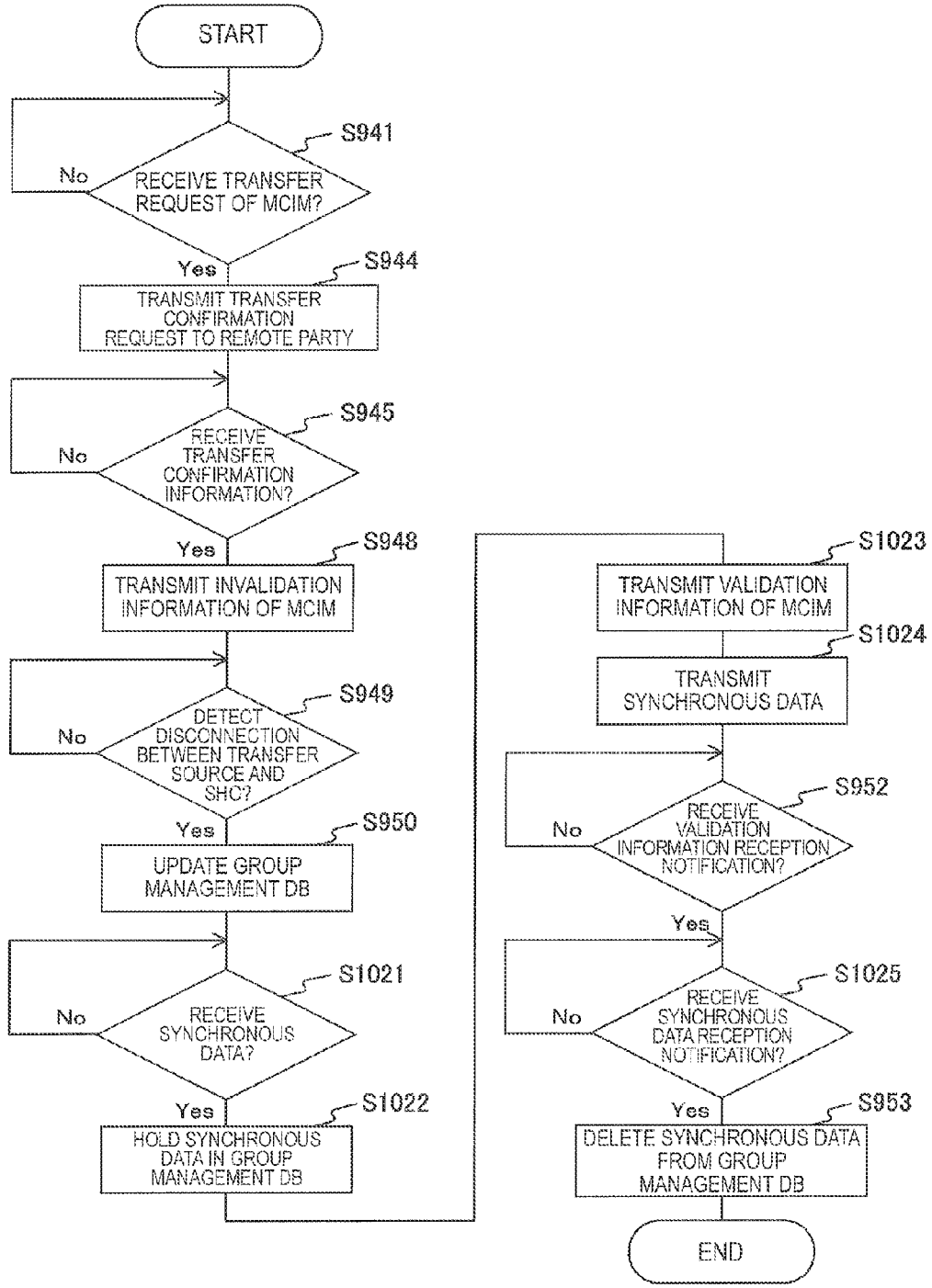
FIG. 35 is a flowchart of an exemplary communication process performed by a RO 200, according to the second exemplary embodiment.

FIG. 35 is a flowchart of an exemplary communication process by the RO 200 according to the second embodiment of the present technology. In FIG. 35, an operation example of the RO 200 when a wireless communication apparatus (the transfer source or transfer destination) belonging to a group makes a transfer request of use rights over MCIM is shown. FIG. 35 is a modification of FIG. 21 and thus, a portion of the description common to that of FIG. 21 is omitted by attaching the same reference signs.

When a transfer request of MCIM is received (step S941), the control unit 210 transmits a transfer confirmation request to the wireless communication apparatus identified based on terminal identification information of the remote party (the transfer source transfer destination) included in the received transfer request of MCIM (step S944).

When transfer confirmation information is received (step S945), the control unit 210 transmits invalidation information of MCIM to invalidate the MCIM of the transfer source (wireless communication apparatus) to the transfer source (step S948).

After content of the group management database 220 is updated (step S950), the control unit 210 determines whether synchronous data is received (step S1021) and if no synchronous data is received, monitoring continues.

If the synchronous data has been received (step S1021), the control unit 210 causes the group management database 220 to hold the synchronous data in association with the group to which the wireless communication apparatus that has transmitted the synchronous data belongs (step S1022).

Subsequently, the control unit 210 transmits validation information of MCIM to the wireless communication apparatus of the transfer destination (step S1023). Subsequently, the control unit 210 transmits the synchronous data held in the group management database 220 to the wireless communication apparatus of the transfer destination (step S1024).

If the validation information reception notification has been received (step S952), the control unit 210 determines whether any synchronous data reception notification is received (step S1025) and if no synchronous data reception notification is received, monitoring continues.

If the synchronous data reception notification has been received (step S1025), the control unit 210 deletes the synchronous data transmitted to the wireless communication apparatus of the transfer destination from the group management database 220 (step S953).

[Operation Example of the Wireless Communication Apparatus (the Transfer Source or Transfer Destination) (Example in which a Transfer Operation is Performed in a Wireless Communication Apparatus Other than the Transfer Source and Transfer Destination)]

Figure 36:
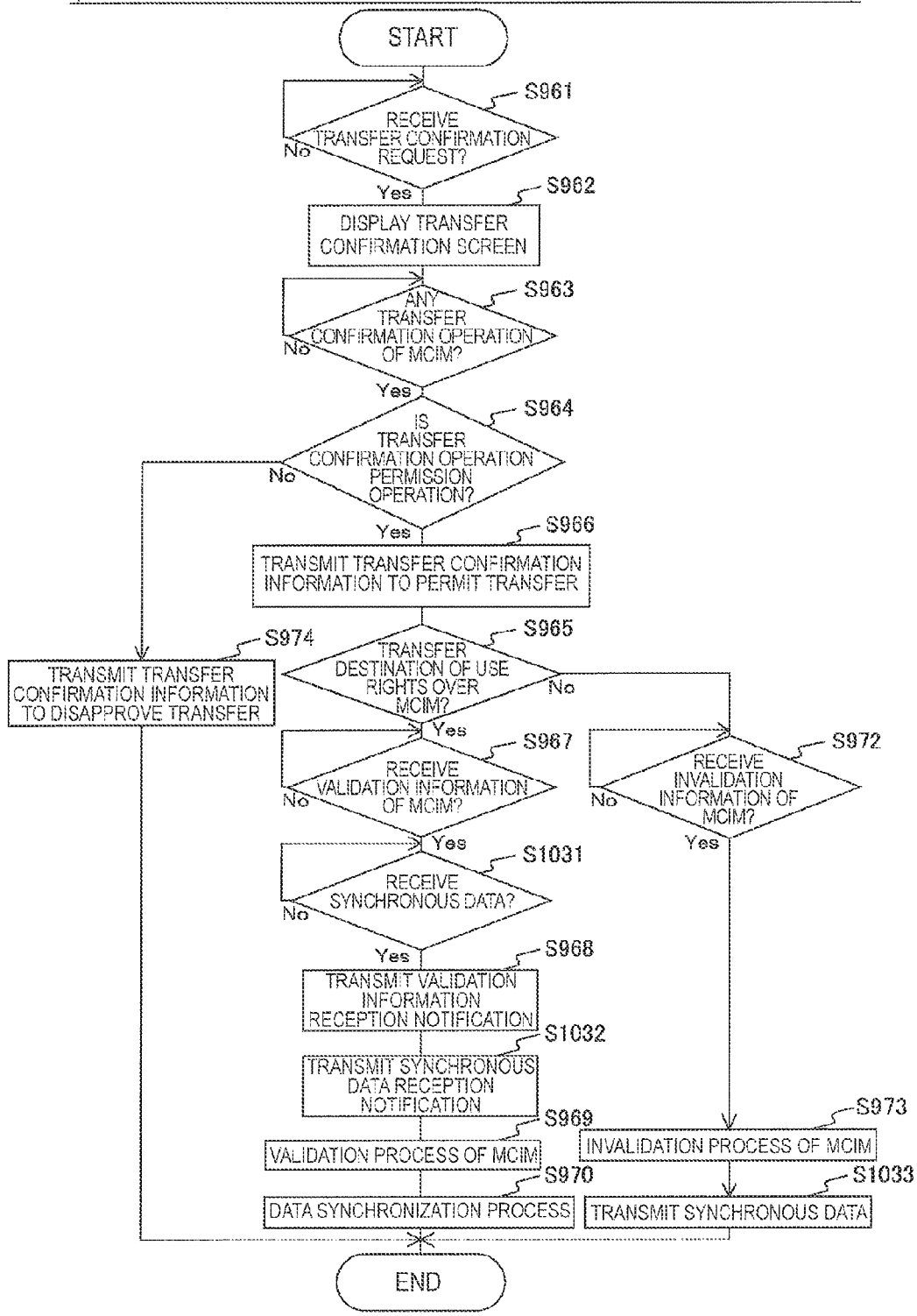
FIG. 36 is a flowchart of an exemplary communication process performed by a wireless communication apparatus, according to the second exemplary embodiment.

FIG. 36 is a flowchart of an exemplary communication process by a wireless communication apparatus according to the second embodiment of the present technology. FIG. 36 shows an operation example of a wireless communication apparatus when a transfer operation is performed by the wireless communication apparatus other than the transfer source and transfer destination. FIG. 36 is a modification of FIG. 22 and thus, a portion of the description common to that of FIG. 22 is omitted by attaching the same reference signs.

If the transfer confirmation operation of MCIM is an operation to permit the transfer of use rights over MCIM (step S964), the control unit 330 transmits transfer confirmation information permitting the transfer of MCIM use rights to the RO 200 (step S966).

Subsequently, the control unit 330 determines whether the local machine is the transfer destination of use rights over MCIM (step S965). If the local machine is the transfer destination of use rights over MCIM (step S965), the control unit 330 determines whether validation information of MCIM is received (step S967) and if no validation information of MCIM is received, monitoring continues. If the validation information of MCIM has been received (step S967), the control unit 330 determines whether synchronous data is received (step S1031) and if no synchronous data is received, monitoring continues. If the synchronous data is received (step S1031), the control unit 330 transmits a validation information reception notification to the RO 200 (step S968).

Subsequently, the control unit 330 transmits a synchronous data reception notification to notify that synchronous data has been received to the RO 200 (step S 1032).

In addition, after an invalidation process of MCIM is performed (step S973), the control unit 330 transmits the synchronous data to the RO 200 (step S1033).

[Operation Example of RO (Example in which a Transfer Operation is Performed in a Wireless Communication Apparatus Other than the Transfer Source and the Transfer Destination)]

Figure 37:
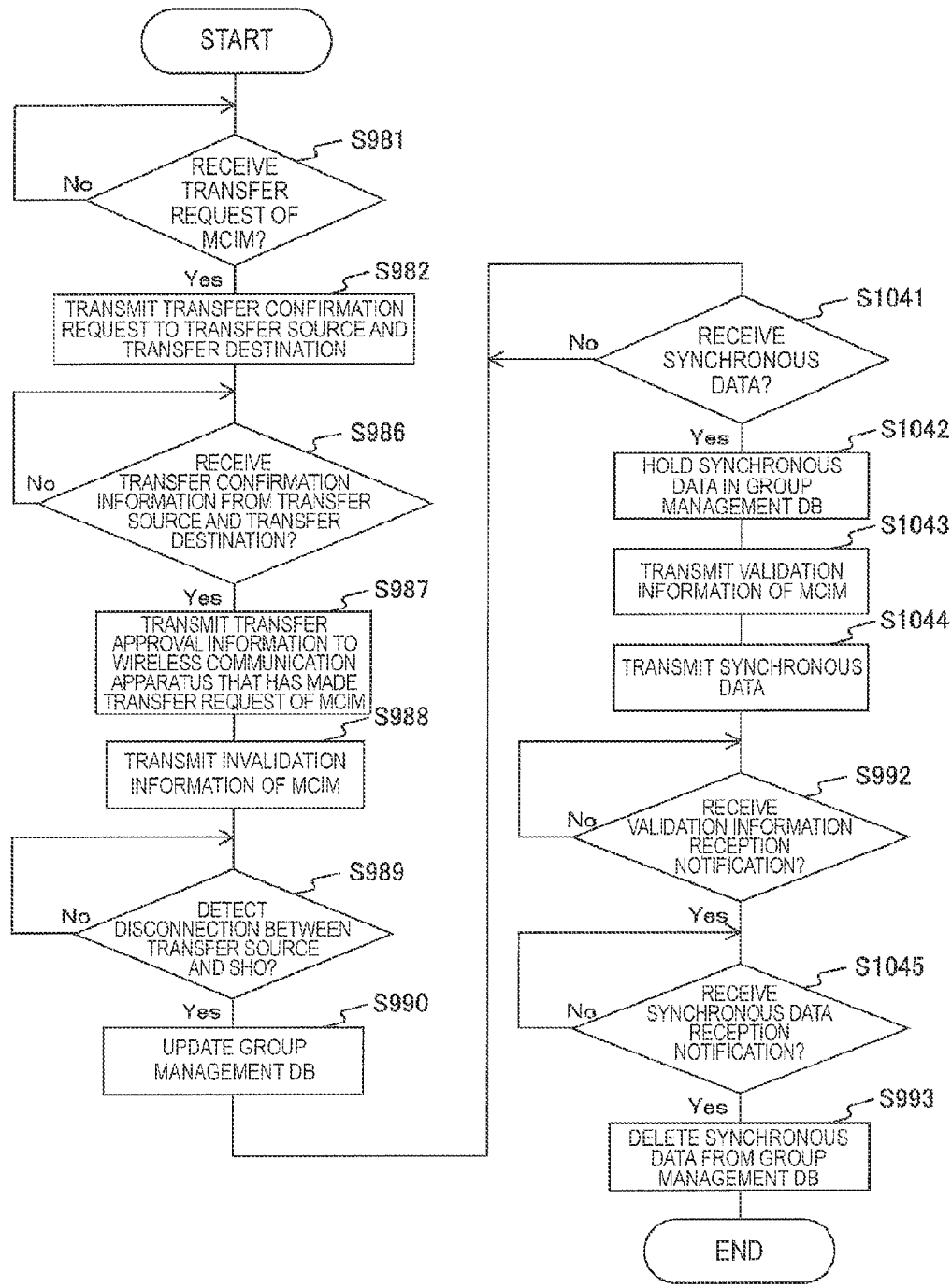
FIG. 37 is a flowchart of an exemplary communication process performed by the RO 200, according to the second exemplary embodiment.

FIG. 37 is a Flowchart of an Exemplary Communication Process by the RO 200 according to the second embodiment of the present technology. In FIG. 37, an operation example of the RO 200 when a wireless communication apparatus (other than the transfer source and transfer destination) belonging to a group makes a transfer request of use rights over MCIM is shown. FIG. 37 is a modification of FIG. 23 and thus, a portion of the description common to that of FIG. 23 is omitted by attaching the same reference signs.

After a transfer confirmation request is transmitted to both of the transfer source and transfer destination (step S982), the control unit 210 determines whether transfer confirmation information is received from both of the transfer source and transfer destination (step S986).

Each process (step S1041 to step S1045) shown in FIG. 37 corresponds to each process (step S1022 to step S1025) shown in FIG. 35. Thus, the description thereof is omitted here.

In the second embodiment of the present technology, an example in which after an invalidation process of the MCIM of the first wireless communication apparatus 300 is performed, synchronous data is transmitted from the first wireless communication apparatus 300 to the RO 200 is transmitted is shown. In this case, the synchronous data can directly be transmitted from the first wireless communication apparatus 300 to the RO 200. However, before the invalidation process of the MCIM, synchronous data may be transmitted from the first wireless communication apparatus 300 to the RO 200. In this case, synchronous data is transmitted from the first wireless communication apparatus 300 to the RO 200 via the SHO 120.

Thus, in the second embodiment of the present technology, when use rights over MCIM are transferred, synchronous data can be transmitted from the transfer source to the transfer destination separately from a transfer request thereof. Therefore, the data synchronization process can appropriately be performed in accordance with the communication function of the wireless communication apparatus.

3. Modification

In the first and second embodiments of the present technology, examples in which a data synchronization process is performed by transmitting synchronous data from the transfer source to the transfer destination for a transfer process of use rights over MCIM have been described. However, it is assumed that there are some users who wish to perform a data synchronization process for processes other than a transfer process of use rights over MCIM. Thus, in this modification, examples in which a data synchronization process is performed for a process other than a transfer process of use rights over MCIM are shown.

[Communication Example when a Data Synchronization Process is Performed for a Process Other than a Transfer Process of Use Rights Over MCIM]

Figure 38:
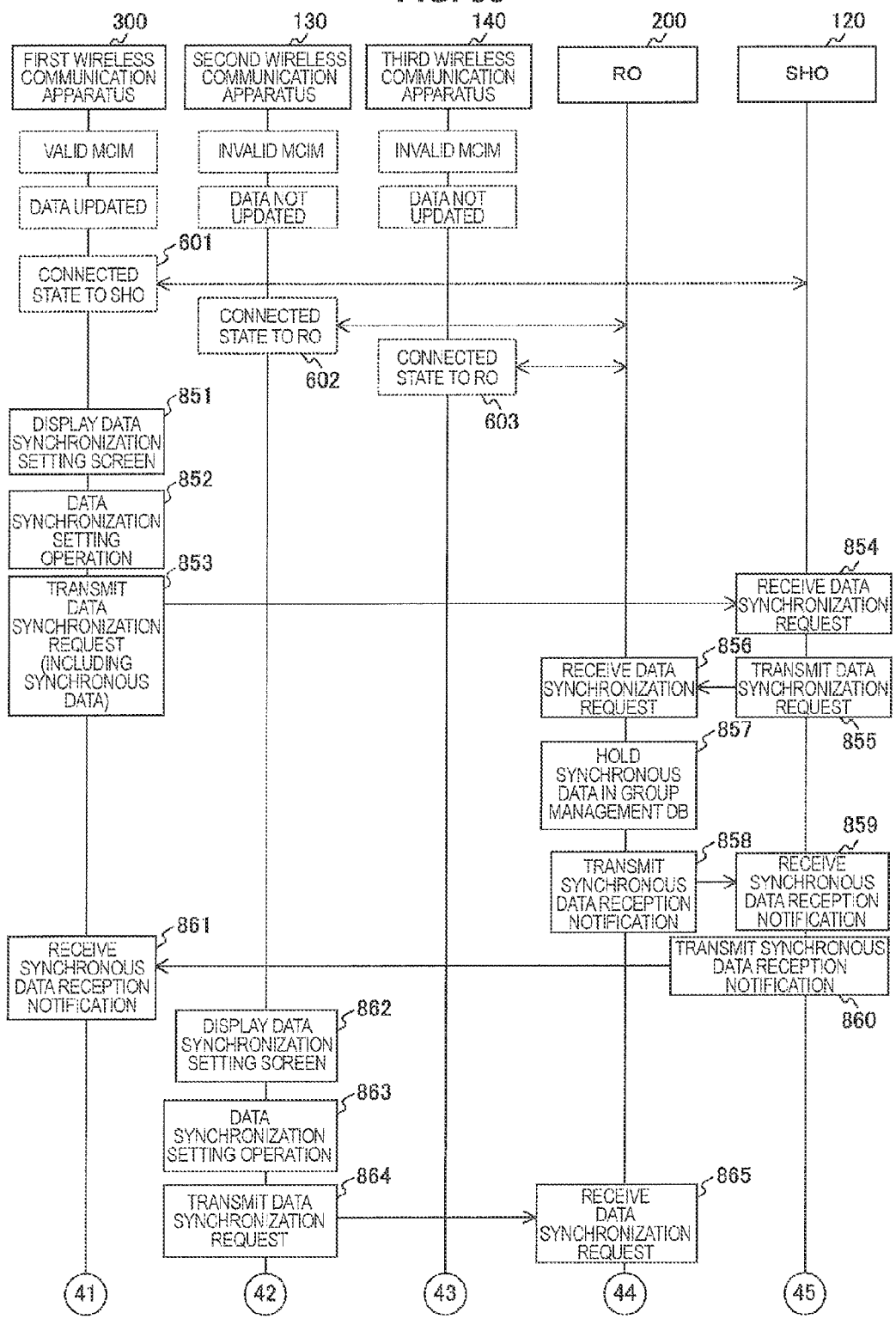
FIG. 38 is a sequence chart showing an exemplary communication process between each apparatus constituting the communication system 100, according to a modification of an exemplary embodiment.
Figure 39:
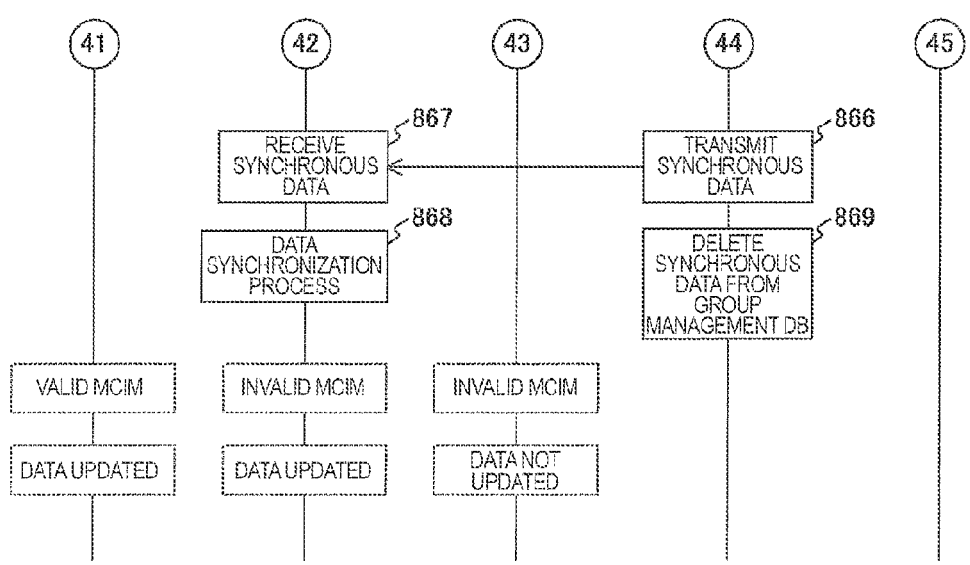
FIG. 39 is a sequence chart showing an exemplary communication process between each apparatus constituting the communication system 100, according to a modification of an exemplary embodiment.

FIGS. 38 and 39 are a sequence chart showing an exemplary communication process between each apparatus constituting the communication system 100 according to a modification of an embodiment of the present technology.

In FIGS. 38 and 39, it is assumed that the first wireless communication apparatus 300 holds use rights over MCIM when the group AB is constituted of the first wireless communication apparatus 300, the second wireless communication apparatus 130, and the third wireless communication apparatus 140. FIGS. 38 and 39 show a communication process example when a data synchronization process of data between the first wireless communication apparatus 300 and the second wireless communication apparatus 130 is performed by operating the first wireless communication apparatus 300. It is assumed in FIGS. 38 and 39 that the first wireless communication apparatus 300 is in a connected state (601) to the SHO 120 and the second wireless communication apparatus 130 and the third wireless communication apparatus 140 are in connected states (602, 603) to the RO 200.

First, the display unit 370 of the first wireless communication apparatus 300 is caused to display a data synchronization setting screen for performing a data synchronization process by a user operation (851). The data synchronization setting screen is a screen, for example, the group list display screen 500 shown in FIG. 7 in which a synchronous data transmission source selection area is displayed without the transfer destination selection area 501 being displayed. In the synchronous data transmission source selection area, a check box to select the transfer source of synchronous data is displayed when a data synchronization process is performed.

While the data synchronization setting screen is displayed in the display unit 370 as described above (851), a "✓" mark is attached to the check box (corresponding to the presence/absence selection area 502 of data synchronization shown in FIG. 7) of the remote party of the data synchronization process (852). In addition, a "✓" mark is attached to the check box (synchronous data transmission source selection area) of the transmission source of synchronous data (852).

After a "–V" mark is attached to the check box of the remote party and a "Ai" mark is attached to the check box of the transmission source of synchronous data as described above, a confirm button (corresponding to the confirm button 506 shown in FIG. 7) is pressed (852). If a data synchronization setting operation is accepted by the first wireless communication apparatus 300 as described above (852), a data synchronization request is transmitted from the first wireless communication apparatus 300 to the RO 200 (853 to 856). In this case, the first wireless communication apparatus 300 and the SHO 120 are in a connected state (601) and thus, the data synchronization request is transmitted from the first wireless communication apparatus 300 to the RO 200 via the SHO 120 (853 to 856). The data synchronization request includes terminal identification information (PCID#1, PCID#2) of wireless communication apparatuses intended for the data synchronization process and synchronous data.

When the RO 200 receives the data synchronization request (856), the control unit 210 extracts the group to which the wireless communication apparatus that has transmitted the data synchronization request belongs based on the terminal identification information included in the received data synchronization request. That is, terminal identification information matching the terminal identification information included in the received data synchronization request is extracted from the group management database 220 and the group related to the extracted terminal identification information is extracted. Then, the control unit 210 causes the group management database 220 to hold the synchronous data included in the received data synchronization request in association with the extracted group (857).

Subsequently, the control unit 210 transmits a synchronous data reception notification to notify that the data synchronization request has been received to the wireless communication apparatus (the first wireless communication apparatus 300) identified based on terminal identification information of the transmission source included in the received data synchronization request (858 to 861). When the synchronous data reception notification is received (861), the first wireless communication apparatus 300 may cause the display unit 370 to display the reception.

The display unit 370 of the second wireless communication apparatus 130 is caused to display a data synchronization setting screen to perform a data synchronization process (862). While the data synchronization setting screen is displayed in the display unit 370 as described above (862), a "✓" mark is attached to the check box of the transmission source (the first wireless communication apparatus 300) of the synchronous data (863). In addition, a "✓" mark is attached to the check box of the transmission destination (the second wireless communication apparatus 130) of the synchronous data (863).

After a "Ai" mark is attached to the check boxes of the transmission source and transmission destination of the synchronous data as described above, a confirm button (corresponding to the confirm button 506 shown in FIG. 7) is pressed (863). If a data synchronization setting operation is accepted by the second wireless communication apparatus 130 as described above (863), a data synchronization request is transmitted from the second wireless communication apparatus 130 to the RO 200 (864, 865). In this case, the second wireless communication apparatus 130 and the RO 200 are in a connected state (602), the data synchronization request is directly transmitted from the second wireless communication apparatus 130 to the RO 200 (864, 865). The data synchronization request includes terminal identification information (PCID#1, PCID#2) of wireless communication apparatuses intended for the data synchronization process, but does not include synchronous data.

When the RO 200 receives the data synchronization request (865), the control unit 210 extracts the group to which the wireless communication apparatus that has transmitted the data synchronization request belongs based on the terminal identification information included in the received data synchronization request. That is, terminal identification information matching the terminal identification information included in the received data synchronization request is extracted from the group management database 220 and the group related to the extracted terminal identification information is extracted. Then, the control unit 210 acquires synchronous data the group management database 220 is caused to hold in association with the extracted group and transmits the acquired synchronous data to the wireless communication apparatus that has transmitted the data synchronization request (866, 867).

When the second wireless communication apparatus 130 receives the synchronous data (867), the control unit 330 of the second wireless communication apparatus 130 performs a data synchronization process to synchronize data in the second wireless communication apparatus 130 with data in the first wireless communication apparatus 300 (868).

When the synchronous data is transmitted to the second wireless communication apparatus 130 (866), the control unit 210 of the RO 200 deletes the synchronous data transmitted to the second wireless communication apparatus 130 from the group management database 220 (869).

In FIGS. 38 and 39, an example in which the first wireless communication apparatus 300 holding use rights over MCIM is the transfer source of synchronous data is shown, but can also be applied to a case when a wireless communication apparatus holding no use rights over MCIM is the transfer source of synchronous data.

FIGS. 38 and 39 also shows an example in which synchronous data is deleted from the group management database 220 on condition that synchronous data should be transmitted in response to a synchronous data request from the second wireless communication apparatus 130. However, a case in which after performing a data synchronization setting operation using the first wireless communication apparatus 300, the user does not perform a data synchronization setting operation on the second wireless communication apparatus 130 for some reason (for example, simply forgotten to operate or due to an urgent task) can also be assumed. In such a case, synchronous data may not be deletable from the group management database 220. When, for example, a relatively large number of users use the data synchronization process shown in FIGS. 38 and 39, there is a possibility that the amount of data (amount of synchronous data) held by the RO 200 becomes huge. In such a case, an increase in cost to operate the RO 200 can be assumed.

Thus, making the valid time of synchronous data settable when the synchronous data is transmitted from the first wireless communication apparatus 300 can be considered. For example, a fixed value (for example, 10 min) can be set as the valid time. For example, the second wireless communication apparatus 130 can acquire synchronous data from the RO 200 by a data synchronization setting operation being performed by the user on the second wireless communication apparatus 130 within 10 min after the synchronous data is transmitted from the first wireless communication apparatus 300. However, if no data synchronization setting operation is performed on the second wireless communication apparatus 130 when 10 min pass after synchronous data being transmitted from the first wireless communication apparatus 300, the RO 200 can delete the synchronous data from the group management database 220. That is, if no data synchronization request is received from the second wireless communication apparatus 130 when 10 min pass after synchronous data is received from the first wireless communication apparatus 300, the RO 200 can delete the synchronous data from the group management database 220. By setting the valid time in this manner, the cost of operating the RO 200 can be reduced. The valid time may be made changeable by the user.

FIGS. 38 and 39 show an example in which the user successively performs a data synchronization setting operation on two wireless communication apparatuses intended for a data synchronization process. However, for example, when synchronous data is received from the first wireless communication apparatus 300, the RO 200 may notify the second wireless communication apparatus 130 of the reception. By making the notification in this manner, the user can be prompted to perform a data synchronization setting operation using the second wireless communication apparatus 130. In addition, with the reception of the notification, the user can promptly perform a data synchronization setting operation using the second wireless communication apparatus 130. An example thereof is shown in FIGS. 40 and 41.

[Communication Example when a Data Synchronization Process is Performed for a Process Other than a Transfer Process of Use Rights Over MCIM]

Figure 40:
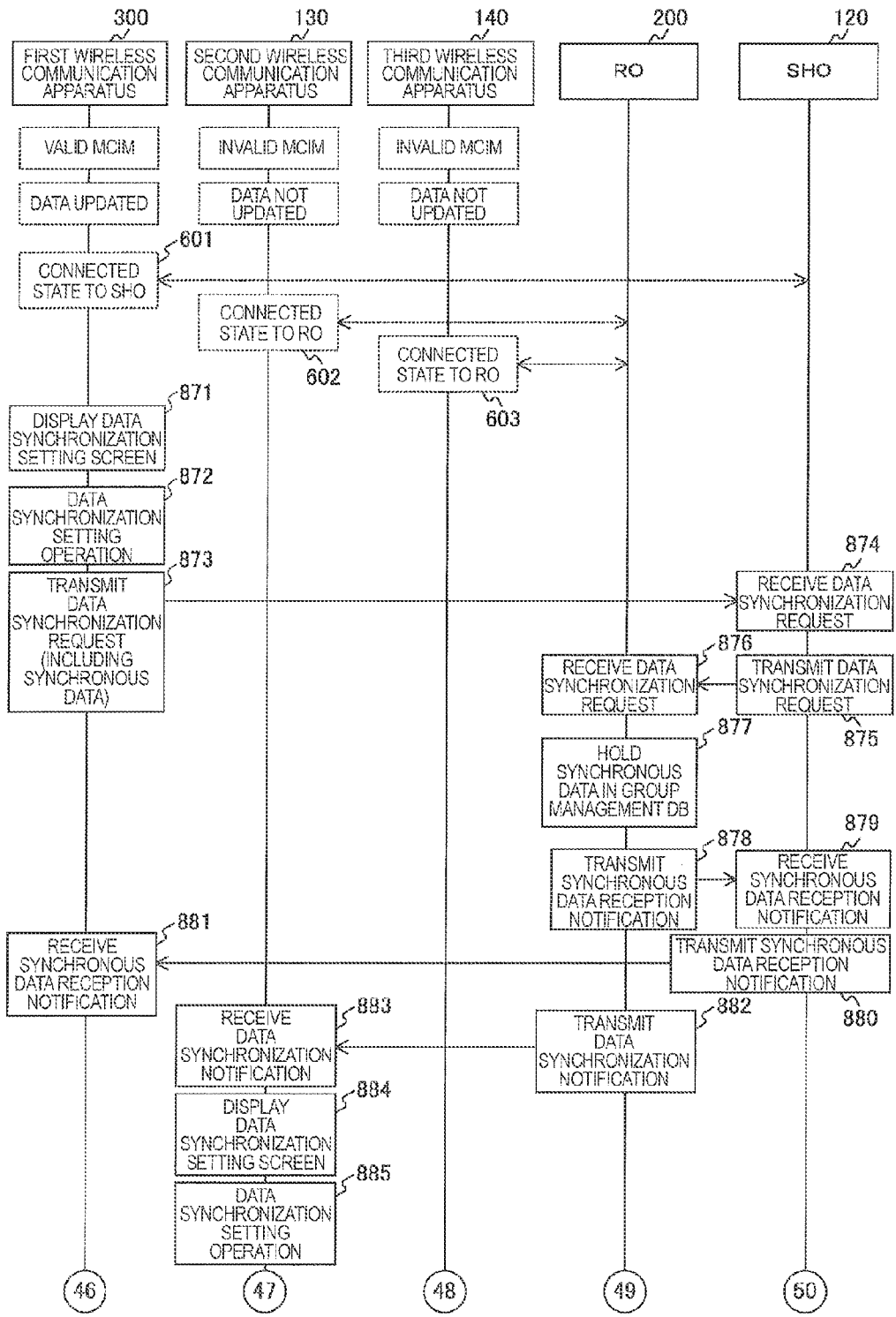
FIG. 40 is a sequence chart showing an exemplary communication process between each apparatus constituting the communication system 100, according to a modification of an exemplary embodiment.
Figure 41:
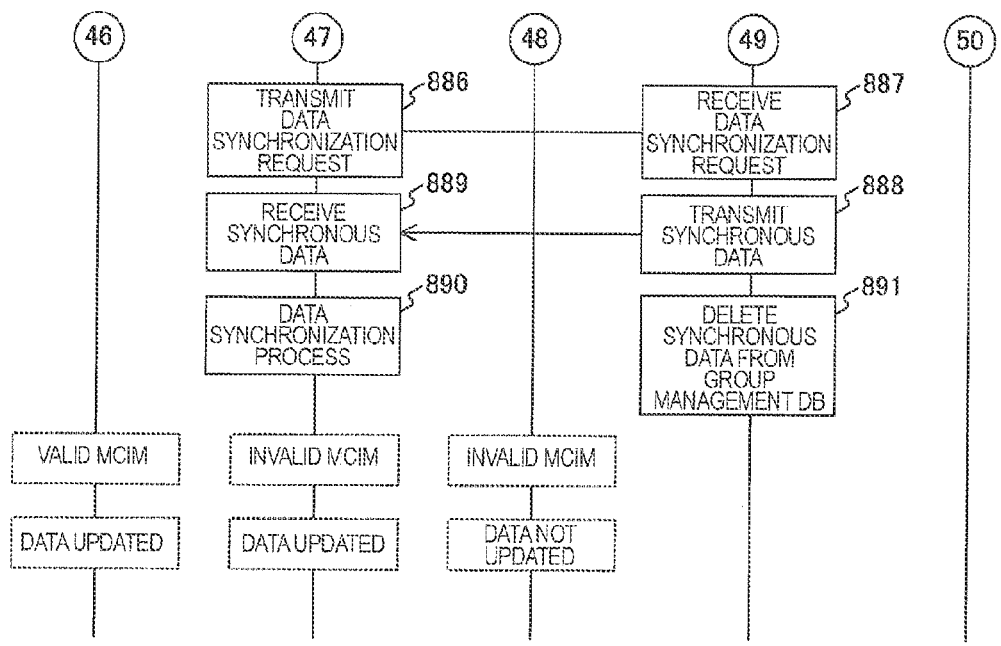
FIG. 41 is a sequence chart showing an exemplary communication process between each apparatus constituting the communication system 100, according to a modification of an exemplary embodiment.

FIGS. 40 and 41 are a sequence chart showing an exemplary communication process between each apparatus constituting the communication system 100 according to a modification of an embodiment of the present technology. The sequence chart shown in FIGS. 40 to 41 is a modification of the sequence chart shown in FIGS. 38 and 39 and thus, a portion of the description common to that of FIGS. 38 and 39 is omitted.

Each process (871 to 881) shown in FIG. 40 corresponds to each process (851 to 861) shown in FIG. 38.

The control unit 210 of the RO 200 transmits a synchronous data notification to the wireless communication apparatus (the second wireless communication apparatus 130) identified based on terminal identification information of the transmission destination included in the received data synchronization request (882, 883). When the synchronous data notification (883), the second wireless communication apparatus 130 causes the display unit 370 of the second wireless communication apparatus 130 to display a data synchronization setting screen to perform a data synchronization process (884).

Each process (884 to 891) shown in FIGS. 40 and 41 corresponds to each process (862 to 869) shown in FIGS. 38 and 39.

In FIGS. 38 to 41, as described above, examples in which the user performs a data synchronization setting operation on two wireless communication apparatuses intended for a data synchronization process are shown. However, for example, the user may perform a data synchronization setting operation on the wireless communication apparatus as the transmission source of synchronous data of the two wireless communication apparatuses intended for a data synchronization process so that a data synchronization process is automatically performed on the wireless communication apparatus as the transmission destination of the synchronous data. When a data synchronization process is automatically performed as described above, it is assumed that, for example, settings for the automatic operation are made by a user operation. Accordingly, when, for example, a synchronous data notification is received by the wireless communication apparatus (the second wireless communication 130) of the transmission destination (883), the control unit 330 of the second wireless communication 130 can automatically transmit a data synchronization request to the RO 200.

Thus, according to the modification of an embodiment of the present technology, a data synchronization process can be performed without transferring MCIM (contract authentication information) use rights. Thus, the load on the network side can be reduced.

In the embodiments of the present technology, as data intended for a data synchronization process, content of an address book or a schedule book is taken as an example. However, the embodiments of the present technology can be applied when a data synchronization process is performed on content other than the address book and schedule book (for example, a play list (music, photos and the like) and ID information). The ID information is, for example, a login account of a blog, HP (home page) or the like or ID information for using services on the Internet. The blog includes, for example, a communication service (so-called mini-blog (for example, twittering)) in which a short sentence can be posted and browsed.

The embodiments of the present technology have been described by taking integrally configured information processing apparatuses (the SHO 120, the RO 200 and the like) as an example. However, the embodiments of the present technology can also be applied to an information processing system in which each unit (for example, the control unit 210 or the group management database 220) included in these information processing apparatuses is constituted of a plurality of apparatuses. While the embodiments of the present technology have been described by taking the group AB constituted of three wireless communication apparatuses as an example, the embodiments of the present technology can also be applied to a group constituted of two or four or more wireless communication apparatuses. The embodiments of the present technology have been described by taking a case when a data synchronization process is performed between a plurality of wireless communication apparatuses constituting a group as an example. However, the embodiments of the present technology can also be applied when a data synchronization process is performed between a plurality of wireless communication apparatuses that do not constitute a group. In such a case, for example, the remote party to perform a data synchronization process with can be set by a user operation (for example, an input operation to identify the remote wireless communication apparatus).

In addition, the embodiments of the present technology can be applied to mobile wireless communication apparatuses (for example, terminal apparatuses dedicated to data communication) and fixed wireless communication apparatuses. For example, the embodiments of the present technology can be applied to wireless communication apparatuses for the purpose of collecting data of vending machines and wireless communication apparatuses mounted on elevators, automobiles, and electronic devices (for example, home appliances, game machines, and digital photo-frames).

Examples where use rights over an MCIM are used as network connection rights are described above in the embodiments of the present disclosure. However, it is also possible to apply the embodiments of the present disclosure to connection rights for connecting to a specified network based on other information (for example, a USIM (UNIVERSAL SUBSCRIBER IDENTITY MODULE).

Note that the embodiments given above describe examples used to embody the present disclosure and that elements in the embodiments correspond to elements in the patent claims. In the same way, elements in the patent claims correspond to elements in the embodiments of the present disclosure that have been given the same names. However, it should be understood by those skilled in the art that various modifications, combinations, sub-combinations and alterations may occur depending on design requirements and other factors insofar as they are within the scope of the appended claims or the equivalents thereof.

The processing procedures described in the embodiments given above may take the form of a method including a series of such procedures and may also take the form of a program for causing a computer to execute a series of such procedures or a recording medium storing such a program. As examples, it is possible to use a CD (Compact Disc), an MD (MiniDisc), a DVD (Digital Versatile Disc), a memory card, a Blu-ray Disc (registered trademark) or the like as the recording medium.

Additionally, the present technology may also be configured as below.

(1) A wireless communication apparatus including:

an accepting unit that accepts a transfer operation to transfer a connection right from a first wireless communication apparatus to which the connection right to connect to a predetermined network using wireless communication is set to a second wireless communication apparatus to which the connection right is not set; and a control unit that, when the transfer operation is accepted, transmits a transfer request that requests the connection right to be transferred from the first wireless communication apparatus to the second wireless communication apparatus with information included in the transfer request, the information being used for synchronizing data in the second wireless communication apparatus with predetermined data in the first wireless communication apparatus.

(2) The wireless communication apparatus according to (1), wherein the wireless communication apparatus is the first wireless communication apparatus, wherein a group sharing the connection right is constituted of a plurality of wireless communication apparatuses including the first wireless communication apparatus and the second wireless communication apparatus, wherein, when the transfer operation is accepted, the control unit transmits the transfer request and the predetermined data to a management system that manages the group, and wherein, when the transfer request and the predetermined data are received, the management system transmits setting information to set the connection right to the second wireless communication apparatus to cause the second wireless communication apparatus to set the connection right and transmits the predetermined data to the second wireless communication apparatus to exercise control to synchronize the data in the second wireless communication apparatus with the predetermined data.

(3) The wireless communication apparatus according to (2), wherein the control unit transmits the transfer request including the predetermined data to the management system as the information for synchronization, and wherein the management system transmits the setting information to the second wireless communication apparatus with the predetermined data included in the setting information.

(4) The wireless communication apparatus according to (2) or (3), wherein the management system is an RO (Registration Operator), and wherein, when the predetermined data is received from the first wireless communication apparatus, the RO holds the predetermined data and transmits the held predetermined data to the second wireless communication apparatus.

(5) The wireless communication apparatus according to (4), wherein, when the predetermined data is held, the RO notifies the second wireless communication apparatus that the predetermined data is held.

(6) The wireless communication apparatus according to (4) or (5), wherein the RO deletes the held predetermined data after the held predetermined data is transmitted to the second wireless communication apparatus.

(7) The wireless communication apparatus according to any one of (4) to (6), wherein, when the predetermined data is not transmitted to the second wireless communication apparatus for a predetermined time or longer after the predetermined data is held, the RO deletes the predetermined data and does not transmit the predetermined data to the second wireless communication apparatus.

(8) The wireless communication apparatus according to (7), wherein the accepting unit accepts a specifying operation to specify the predetermined time, wherein, when the specifying operation is accepted, the control unit transmits, to the RO, time information about the specified predetermined time in association with the predetermined data, and wherein the RO deletes the predetermined data using the predetermined time related to the time information transmitted in association with the predetermined data.

(9) The wireless communication apparatus according to any one of (2) to (9), wherein the wireless communication apparatus to which the connection right is set among the plurality of wireless communication apparatuses constituting the group is connectable to an SHO (Selected Home Operator) based on the connection right, and wherein the wireless communication apparatus to which the connection right is not set among the plurality of wireless communication apparatuses constituting the group is connectable only to the RO.

(10) The wireless communication apparatus according to (1),
wherein the wireless communication apparatus is the second wireless communication apparatus,
wherein a group sharing the connection right is constituted of a plurality of wireless communication apparatuses including the first wireless communication apparatus and the second wireless communication apparatus,
wherein, when the transfer operation is accepted, the control unit transmits the transfer request to a management system that manages the group, and
wherein, when the transfer request is received, the management system transmits a transfer confirmation request to request permission of transfer concerning the transfer request to the first wireless communication apparatus, and when transfer confirmation information permitting the transfer concerning the transfer confirmation request and the predetermined data are transmitted from the first wireless communication apparatus, the management system transmits setting information to set the connection right to the second wireless communication apparatus to cause the second wireless communication apparatus to set the connection right and transmits the predetermined data to the second wireless communication apparatus to exercise control to synchronize the data in the second wireless communication apparatus with the predetermined data.

(11) The wireless communication apparatus according to (10),
wherein the first wireless communication apparatus transmits the transfer
confirmation information to the management system with the predetermined data included in the transfer confirmation information, and
wherein the management system transmits the setting information to the second wireless communication apparatus with the predetermined data included in the setting information.

(12) The wireless communication apparatus according to any one of (1) to (11), wherein the predetermined data is content intended for a data synchronization process between the first wireless communication apparatus and the second wireless communication apparatus.

(13) The wireless communication apparatus according to (12), wherein the control unit transmits the transfer request including the information to synchronize the content in the second wireless communication apparatus with newly updated content in the first wireless communication apparatus.

(14) The wireless communication apparatus according to any one of (1) to (13),
wherein the accepting unit accepts the transfer operation and a synchronization instruction operation to synchronize the data in the second wireless communication apparatus with the predetermined data, and
wherein the control unit transmits the transfer request when the transfer operation and the synchronization instruction operation are accepted, and the control unit transmits the transfer request without including the information for synchronization in the transfer request when only the transfer operation is accepted.

(15) The wireless communication apparatus according to any one of (1) to (14), wherein the connection right is a right to connect to a base station based on contract authentication information to connect to the base station operated by a communication operator.

(16) An information processing apparatus including:
a receiving unit that receives a transfer request that requests a connection right to be transferred from a first wireless communication apparatus to which the connection right to connect to a predetermined network using wireless communication is set to a second wireless communication apparatus to which the connection right is not set, the transfer request including information used for synchronizing data in the second wireless communication apparatus with predetermined data in the first wireless communication apparatus; and
a control unit that, when the transfer request is received, transmits setting information to set the connection right to the second wireless communication apparatus to cause the second wireless communication apparatus to set the connection right and transmits the predetermined data to the second wireless communication apparatus to exercise control to synchronize the data in the second wireless communication apparatus with the predetermined data.

(17) A communication system including:
a wireless communication apparatus including an accepting unit that accepts a transfer operation to transfer a connection right from a first wireless communication apparatus to which the connection right to connect to a predetermined network using wireless communication is set to a second wireless communication apparatus to which the connection right is not set and a control unit that, when the transfer operation is accepted, transmits a transfer request that requests the connection right to be transferred from the first wireless communication apparatus to the second wireless communication apparatus with information included in the transfer request, the information being used for synchronizing data in the second wireless communication apparatus with predetermined data in the first wireless communication apparatus; and
an information processing apparatus that, when the transfer request is received, transmits setting information to set the connection right to the second wireless communication apparatus to cause the second wireless communication apparatus to set the connection right and transmits the predetermined data to the second wireless communication apparatus to exercise control to synchronize the data in the second wireless communication apparatus with the predetermined data.

(18) A method of controlling a wireless communication apparatus including:
an acceptance procedure of accepting a transfer operation to transfer a connection right from a first wireless communication apparatus to which the connection right to connect to a predetermined network using wireless communication is set to a second wireless communication apparatus to which the connection right is not set; and
a transmission procedure of transmitting, when the transfer operation is accepted, a transfer request that requests the connection right to be transferred from the first wireless communication apparatus to the second wireless communication apparatus with information included in the transfer request, the information being used for synchronizing data in the second wireless communication apparatus with predetermined data in the first wireless communication apparatus.

REFERENCE SIGNS LIST 100 communication system
110 public network
120 SHO
121, 122, 206 base station
125, 210 control unit
126-129, 207 wireless line
130 second wireless communication apparatus
140 third wireless communication apparatus
200 RO
205 communication unit
220 group management database
300 first wireless communication apparatus
311 antenna
312 antenna sharing unit
321 modulating unit
322 demodulating unit
330 control unit
331 bus
340 memory
350 MCIM information storage unit
360 operation unit
370 display unit
380 position information acquiring unit
391 microphone
392 speaker

The invention claimed is:

1. A first wireless communication apparatus, comprising:
one or more processors configured to:
generate composite information, based on an update operation on first data in a first application of the first wireless communication apparatus,
wherein the composite information comprises the first data and update data;
receive a transfer operation to transfer, a connection right to connect to a network, from the first wireless communication apparatus to a second wireless communication apparatus, based on the update operation,
transmit, based on the reception of the transfer operation, a transfer request to a management system,
wherein the transfer request includes:
a request to transfer the connection right from the first wireless communication apparatus to the second wireless communication apparatus; and
the composite information to synchronize second data of a second application in the second wireless communication apparatus, and
wherein the first application and the second application are same.

2. The first wireless communication apparatus according to claim 1, wherein the one or more processors are further configured to change a state of the connection right of the first wireless communication apparatus from an enabled state to a disabled state.

3. The first wireless communication apparatus according to claim 1,
wherein the management system:
temporarily stores the composite information in a storage device, and
notifies the second wireless communication apparatus that the composite information is available.

4. The first wireless communication apparatus according to claim 3, wherein the management system transmits the composite information to the second wireless communication apparatus and deletes the composite information from the storage device, based on the transmission.

5. The first wireless communication apparatus according to claim 1, wherein one or more processors are further configured to:
connect to a Selected Home Operator (SHO); and
transfer the connection right to the second wireless communication apparatus,
wherein prior to the transfer of the connection right, the second wireless communication apparatus connects with a Registration Operator (RO).

6. The first wireless communication apparatus according to claim 1,
wherein the management system manages a group of a plurality of wireless communication apparatus that share the connection right, and
wherein the group includes the first wireless communication apparatus and the second wireless communication apparatus.

7. The first wireless communication apparatus according to claim 1, wherein the one or more processors are further configured to:
accept a specify operation to specify time information for the composite information, and
transmit the transfer request, to the management system, with the time information.

8. A wireless communication method, comprising:
in a first wireless communication apparatus:
generating composite information, based on an update operation on first data in a first application of the first wireless communication apparatus,
wherein the composite information comprises the first data and update data;
receiving a transfer operation to transfer a connection right to connect to a network, from the first wireless communication apparatus to a second wireless communication apparatus, based on the update operation,
transmitting, based on the reception of the transfer operation, a transfer request to a management system,
wherein the transfer request includes:
a request to transfer the connection right from the first wireless communication apparatus to the second wireless communication apparatus; and
the composite information to synchronize the first second data of a second application in the second wireless communication apparatus, and
wherein the first application and the second application are same.

* * * * *